United States Patent [19]

Miura et al.

[11] Patent Number: 5,470,193

[45] Date of Patent: Nov. 28, 1995

[54] PALLET SUPPLY APPARATUS AND CONTROL METHOD THEREOF

[75] Inventors: Toshihiko Miura; Yusaku Azuma, both of Yokohama, Japan

[73] Assignee: Canon Kabushiki Kaisha, Tokyo, Japan

[21] Appl. No.: 71,003

[22] Filed: Jun. 4, 1993

[30] Foreign Application Priority Data

| Jun. 8, 1992 | [JP] | Japan | 4-173909 |
| Nov. 2, 1992 | [JP] | Japan | 4-294246 |
| Mar. 26, 1993 | [JP] | Japan | 5-067206 |

[51] Int. Cl.$^6$ ................................. B65G 1/18
[52] U.S. Cl. .............. 414/774; 414/795.6; 414/411; 414/799; 414/331
[58] Field of Search ..................... 414/331, 411, 414/754, 774, 783, 787, 781, 795.6, 799

[56] References Cited

U.S. PATENT DOCUMENTS

| 4,255,077 | 3/1981 | Smith | 414/787 |
| 4,588,349 | 5/1988 | Reuter | 414/411 |
| 4,790,584 | 12/1988 | Prentakis | 414/781 |
| 4,844,680 | 7/1989 | Kawata et al. | 414/331 |
| 4,932,828 | 6/1990 | Katae et al. | 414/286 |
| 4,984,953 | 1/1991 | Nakazato et al. | 414/411 |
| 5,096,369 | 3/1992 | Ouellette | 414/783 |
| 5,133,256 | 7/1992 | Keaton | 414/781 |
| 5,190,434 | 3/1993 | Miura et al. | 414/609 |
| 5,203,661 | 4/1993 | Tanita et al. | 414/331 |
| 5,232,331 | 8/1993 | Kasai et al. | 414/411 |

OTHER PUBLICATIONS

"Self–Aligning Positioning System", Mar. 1969, IBM Technical Disclosure Bulletin, vol. 11 No. 12, p. 1656.

*Primary Examiner*—Michael S. Huppert
*Assistant Examiner*—Gregory A. Morse
*Attorney, Agent, or Firm*—Fitzpatrick, Cella, Harper & Scinto

[57] ABSTRACT

In a pallet supply apparatus, pallets are stacked on a loaded pallet elevator and are conveyed by the elevator to the upper end position of a main body of the pallet supply apparatus. The uppermost pallet is separated from the remaining pallets by a shutter. A left side flange of the pallet is pushed by a left roller in a direction to approach rear and side reference surfaces, and a right side flange of the pallet is then pushed by a right roller in a direction to separate away from the side reference surface and to approach the rear reference surface, thus positioning the pallet. When all works are picked up, and the pallet becomes empty, the right and left rollers are escaped, and thereafter, the pallet is slidably moved toward an empty pallet elevator.

8 Claims, 38 Drawing Sheets

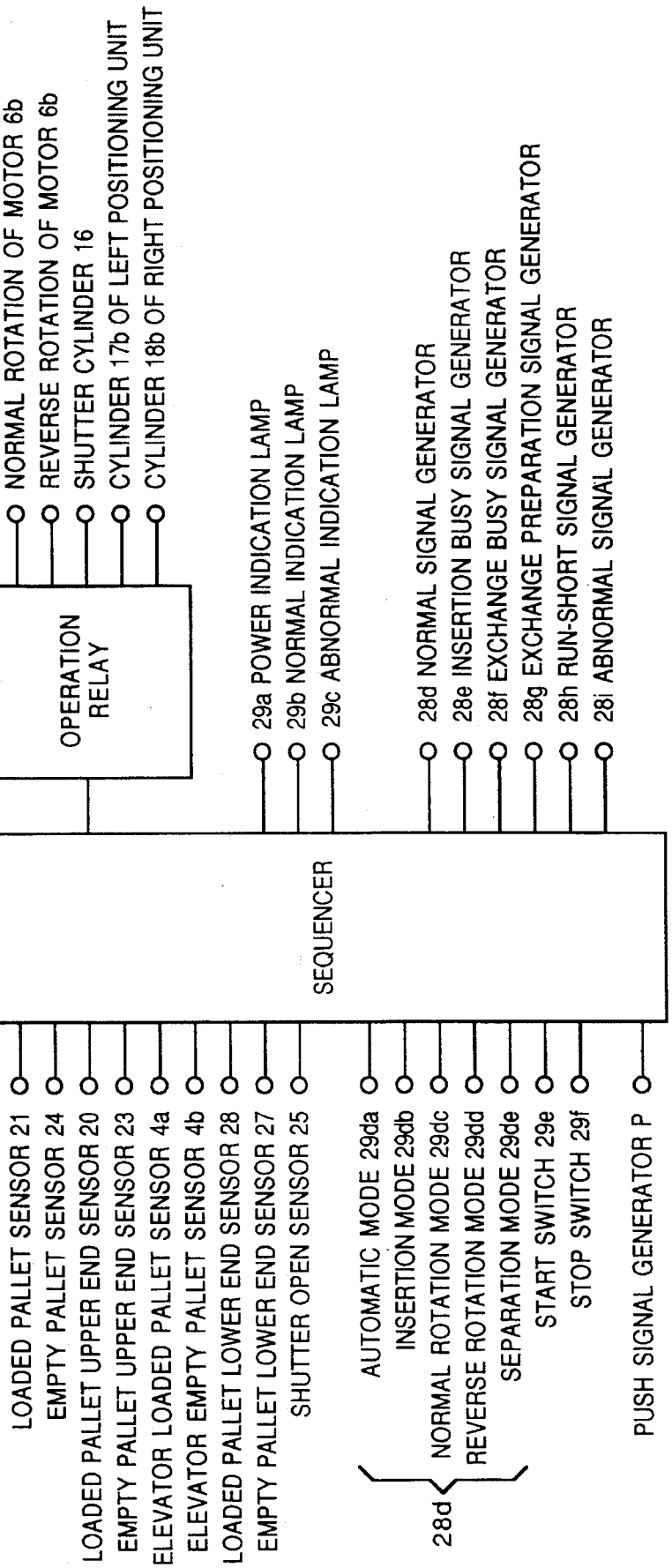

PALLET SUPPLY APPARATUS AND CONTROL METHOD THEREOF

BACKGROUND OF THE INVENTION

The present invention relates to a pallet supply apparatus for positioning a pallet such as a box (to be referred to as a "pallet" hereinafter) storing works such as assembling members or members to be processed in an automatic assembling system or an automatic processing system, and a control method thereof.

An automatic assembling apparatus or an automatic processing apparatus includes a pallet supply apparatus shown in prior art FIGS. 1A–4 for automatically conveying a pallet such as a box (to be referred to as a "pallet" hereinafter) storing works such as assembling members or members to be processed (to be referred to as "works" hereinafter) to a work supply position, and exchanging the pallet with a new pallet after all works in the pallet are picked up by a work supply robot of the automatic assembling system or the automatic processing system and the pallet becomes empty.

The pallet supply apparatus has a loaded pallet elevator 52a and an empty pallet elevator 52b, which are moved upward and downward by an equal distance in opposing direction via an endless chain 55, as shown in FIGS. 1A to 1F. The endless chain 55 is moved around a plurality of idler sprockets 57 in the clockwise direction indicated by an arrow CW or the counterclockwise direction indicated by an arrow CCW by a driving device including a motor 56a and a driving sprocket 56.

The loaded pallet elevator 52a is moved downward upon clockwise movement of the endless chain 55, and is moved upward upon counterclockwise movement of the endless chain 55. The empty pallet elevator 52b makes movements opposite to those of the elevator 52a. A pallet supply operation of this pallet supply apparatus is performed in the following cycle.

As shown in FIG. 1A, the loaded pallet elevator 52a is located at the lower end of its moving path, and the empty pallet elevator 52b is located at the upper end of its moving path. Pallets 130 to 133 each storing a predetermined number of works are inserted from the front surface of a main body 51 in the direction of an arrow Y, and are stacked on the loaded pallet elevator 52a. Then, the loaded pallet elevator 52a is moved upward so as to locate a left side flange (not shown) and a right side flange 130b of the uppermost pallet 130 above a shutter (not shown), which is arranged at the upper end of the main body 51, and stands by in an open state. After the shutter is closed, the elevator 52a is moved downward to separate the pallet 130 from the remaining pallets 131 to 133, as shown in FIG. 1B. In this manner, the pallet 130 separated on the shutter is positioned with reference to a predetermined reference surface by a positioning device (to be described later). As shown in FIG. 1C, every time a work is picked up by a work supply robot R of the automatic assembling system or the automatic processing system, the number of picked-up works is counted. When it is detected that all works in the pallet have been picked up, the empty pallet 130 is horizontally slid by the work supply robot R or a pusher (not shown), and is moved to a position above the empty pallet elevator 52b.

As shown in FIG. 1D, the empty pallet elevator 52b is moved upward to cause the left side flange and the right side flange 130b of the pallet 130 to float from the shutter, and the shutter is then opened to drop the pallet 130 onto the empty pallet elevator 52b. As shown in FIG. 1E, the loaded pallet elevator 52a is moved upward to locate a left side flange (not shown) and a right side flange 131b of the pallet 131 above the shutter in an open state. Then, as shown in FIG. 1F, the pallet 131 is separated from the remaining pallets 132 and 133, and is positioned at the work supply position. When the pallet 131 becomes empty, it is transferred onto the empty pallet elevator 52b, and the elevator 52b is moved downward. After the same steps are repeated for the pallets 132 and 133, the empty pallets stacked on the empty pallet elevator 52b are removed, and the empty pallet elevator 52b is moved to the lower end of its moving path. Thereafter, as shown in FIG. 1A, new pallets are inserted from the front surface of the main body 51. The above-mentioned cycle is automatically controlled by the following at least three different programs.

The pallet supply apparatus is automatically controlled on the basis of at least three different programs including an insertion mode program for inserting new pallets on the loaded pallet elevator 52a located at the lower end, as shown in FIG. 1A, after empty pallets are delivered from the main body 51, a separation mode program for separating the uppermost pallet on the loaded pallet elevator 52a from other pallets, as shown in FIG. 1B, and an automatic mode program for repeating the steps of recovering an empty pallet from which all works are picked up by the work supply robot onto the empty pallet elevator 52b by sliding the empty pallet to a position in front of the main body 51, and separating the uppermost one of the remaining pallets on the loaded pallet elevator 52a, as shown in FIGS. 1C to 1F. These programs are designed to prevent a decrease in automatic assembling or processing efficiency by minimizing the wait time of the work supply robot during an interval in which an empty pallet is exchanged with a pallet with works.

Conventionally, the pallet separated on the shutter is positioned by the positioning device shown in FIG. 2 or 3. The positioning device shown in FIG. 2 comprises an L-shaped arm 118 reciprocally moved by a cylinder 117, and rollers 119a and 119b supported by arms 118a and 118b of the L-shaped arm 118. A pallet 230 is moved by the rollers 119a and 119b toward a line N of intersection of two orthogonal reference surfaces 129 and 124.

The positioning device shown in FIG. 3 comprises rollers 128a, 128b, 129a, and 129b, each two of which are respectively supported by a pair of I-shaped arms 128 and 129. By driving cylinders 127a and 127b, the I-shaped arms 128 and 129 are moved toward orthogonal reference surfaces 229 and 224.

However, according to the above-mentioned prior art, when an empty pallet is slid along the shutter toward the empty pallet elevator, a long time is required for moving the positioning device backward. As a result, a time required for exchanging pallets is prolonged, and hence, an interrupt time of a work supply operation by the work supply robot is prolonged. More specifically, the positioning device shown in FIG. 2 requires a link device so as to prevent vibration of a pallet which is being positioned, and since the rollers contacting the two orthogonal side edges of the pallet are moved backward in the diagonal direction of the pallet, a long cylinder stroke is required until the two rollers are moved backward to positions where they do not interfere with the sliding pallet. For this reason, the time required for exchanging pallets is prolonged.

Also, the positioning device shown in FIG. 3 requires a large number of driving links since it must move at least one cylinder in the vertical direction together with the I-shaped arm and the two rollers supported by the arm. Therefore, the time required for driving these links is long.

Furthermore, automatic control as a combination of the above-mentioned insertion mode program, separation mode program, and automatic mode program starts the insertion mode program after all pallets become empty, and are recovered onto the empty pallet elevator 52b. During control of the insertion mode program, no pallet is present on the shutter, and the work supply robot must keep on waiting during this interval. In the automatic mode program, if a program is switched to the insertion mode program while the last pallet is positioned on the shutter, as indicated by a dotted line in FIG. 1A, and a work pick-up operation is being executed by the work supply robot, when the last pallet becomes empty, and is slid in the horizontal direction, it interferes with the empty pallet elevator located at the upper end, and the pallet or the empty pallet elevator may be damaged.

In addition to the above-mentioned problems, a pallet for supplying processing or assembling works normally has a cover so as to prevent dust or the like from becoming attached to these works. For this reason, when an assembling robot or the like picks up a work from the pallet, the cover must be detached from the pallet prior to the pick-up operation. FIG. 4 shows a conventional assembling system comprising a cover detaching device for detaching the cover.

In FIG. 4, a cover detaching device 200 comprises a chucking pad 204 for chucking a cover 202. The chucking pad 204 is attached to an arm 208, which is rotated about a rotational shaft 206, and is rotated by a rotary actuator 210. Therefore, the cover 202 chucked by the chucking pad 204 is detached from a pallet 212 upon operation of the rotary actuator 210, and in this state, the robot or the like is allowed to pick up works from the pallet 212. When all works are picked up from the pallet 212, the rotary actuator 210 is operated again to fit the cover 202 on the pallet 212. Thereafter, the empty pallet 212 is pushed by a robot finger 214 in the direction of an arrow A, and is slidably moved along the upper surface of a pallet stocker 216 from a robot accessible position to a delivery position.

However, in this prior art, during an interval from when the cover 202 is fitted on the pallet 212 until the empty pallet is delivered, the robot is occupied by the delivery operation of the empty pallet, and the operation efficiency of the entire assembling system is decreased. In order to solve this problem, the delivery operation of the empty pallet may be performed by an actuator other than the robot. However, when another actuator is added, cost of the entire assembling system is undesirably increased.

SUMMARY OF THE INVENTION

The present invention has been made in consideration of the above situation, and has as its principal object to provide a pallet supply apparatus and its control method, which can shorten a time required for positioning and releasing a pallet at a pallet supply position.

It is another object of the present invention to provide a pallet supply apparatus and its control method, which can shorten a time required for positioning and releasing a pallet, and can prevent a work supply robot from waiting for insertion of new pallets.

It is still another object of the present invention to provide a pallet supply apparatus and its control method, which can raise operation efficiency of the entire apparatus without increasing cost of the apparatus.

In order to achieve the above objects, according to the first aspect of the present invention, a control method of a pallet supply apparatus is characterized by the following arrangement.

More specifically, there is provided a method of controlling a pallet supply apparatus for positioning a pallet, which stores assembling or processing works, and is conveyed to a predetermined position of the pallet supply apparatus, by bringing the pallet into contact with two orthogonal reference surfaces of the pallet supply apparatus, comprising: the first step of applying a first pushing force to one side edge of the pallet in a direction to approach the two reference surfaces; and the second step of applying a second pushing force to the other side edge of the pallet in a direction to separate away from one of the two reference surfaces and to approach the other reference surface while maintaining the first pushing force.

According to the second aspect of the present invention, a control method of a pallet supply apparatus is characterized by the following arrangement.

More specifically, there is provided a method of controlling a pallet supply apparatus in which a first stage on which a stack of a plurality of loaded pallets storing assembling or processing works can be placed, and a second stage on which a stack of a plurality of empty pallets can be placed are arranged to be suspended from a supply apparatus main body, the loaded pallets stacked on the first stage are supplied to an access position, located on an upper portion of the supply apparatus main body and accessible by an external robot apparatus, in turn from an uppermost loaded pallet, and empty pallets from which the works are picked up are stacked in turn on the second stage, comprising: the first step of supplying a lowermost one of the plurality of loaded pallets to the access position; the second step of delivering a plurality of empty pallets stacked on the second stage while the lowermost loaded pallet is accessed by the external robot apparatus; the third step of moving the second stage upward and moving the first stage downward while the lowermost loaded pallet is accessed by the external robot apparatus; and the fourth step of replenishing a plurality of loaded pallets on the first stage located at a lower end position while the lowermost loaded pallet is accessed by the external robot apparatus.

According to the third aspect of the present invention, a control method of a pallet supply apparatus is characterized by the following arrangement.

More specifically, there is provided a method of controlling a pallet supply apparatus in which a first stage on which a stack of a plurality of loaded pallets storing assembling or processing works can be placed, and a second stage on which a stack of a plurality of empty pallets can be placed are arranged to be suspended from a supply apparatus main body, the loaded pallets stacked on the first stage are supplied to an access position, located on an upper portion of the supply apparatus main body and accessible by an external robot apparatus, in turn from an uppermost loaded pallet, and empty pallets from which the works are picked up are stacked in turn on the second stage, comprising: the first step of holding, on an upper surface of the second stage, an empty pallet placed on a shutter member, which can be opened/closed, and can hold a pallet at the access position in a closed state, by moving the second stage upward, so that the empty pallet floats from the shutter member; the second step of opening the shutter member to drop the empty pallet downward from the shutter member; the third step of moving the second stage downward and moving the first stage upward to cause an uppermost loaded pallet to project above the shutter member; and the fourth step of separating the uppermost loaded pallet from a second uppermost loaded pallet by closing the shutter member so as to hold the uppermost loaded pallet on the shutter member.

Since the control method of the pallet supply apparatus according to the present invention has the above-mentioned arrangement, a pallet pushed by the first pushing force approaches the two reference surfaces, and is pivoted toward one reference surface. Then, the pallet additionally applied with the second pushing force is brought into contact with the two reference surfaces while being pivoted in a direction opposite to that described above.

While the lowermost loaded pallet, i.e., the last loaded pallet stocked on an elevator is accessed by a robot, a replenishing operation of new loaded pallets on the elevator is allowed. Immediately after the last loaded pallet becomes empty, a new pallet can be supplied to an access position. Therefore, the stop time of the robot can be shortened, and productivity can be improved.

According to the first aspect of the present invention, a pallet supply apparatus is characterized by the following arrangement.

More specifically, there is provided a pallet supply apparatus comprising: two orthogonal reference surfaces used for positioning a pallet; a pair of rollers which are separately brought into contact with two side edges, parallel to one of the two reference surfaces, of the pallet; and positioning driving means for moving the rollers in a direction inclined toward the other reference surface.

According to the second aspect of the present invention, a pallet supply apparatus is characterized by the following arrangement.

More specifically, there is provided a pallet supply apparatus comprising: a first elevator for conveying a pallet inserted in a main body to an upper end position of the main body; detection means for detecting the pallet conveyed to the upper end position of the main body; a second elevator arranged parallel to the first elevator; driving means for vertically moving the first and second elevators at the same time by the same distance in opposite directions; and control means for, when the first elevator is located at a lower end position of a moving path thereof, driving the driving means on the basis of an output from the detection means to move the second elevator downward by a predetermined distance.

According to the third aspect of the present invention, a pallet supply apparatus is characterized by the following arrangement.

More specifically, there is provided a pallet supply apparatus in which a first stage on which a stack of a plurality of loaded pallets storing assembling or processing works can be placed, and a second stage on which a stack of a plurality of empty pallets can be placed are arranged to be suspended from a supply apparatus main body, the loaded pallets stacked on the first stage are supplied to an access position, located on an upper portion of the supply apparatus main body and accessible by an external robot apparatus, in turn from an uppermost loaded pallet, and empty pallets from which the works are picked up are stacked in turn on the second stage, comprising: chucking means for chucking a cover of a pallet; vertical moving means for vertically moving the chucking means; moving means for moving the chucking means between a position above the first stage and a position above the second stage; and locking means, arranged integrally with the chucking means, and engaged with the pallet when the chucking means is moved to a lower end position by the vertical moving means, for moving the pallet from the position above the first stage to the position above the second stage upon operation of the moving means.

Since the pallet supply apparatus of the present invention has the above-mentioned arrangement, a pallet pushed by one roller approaches the two reference surfaces, and is pivoted toward one reference surface. Then, the pallet pushed by the other roller is brought into contact with the two reference surfaces while being pivoted in a direction opposite to that described above.

Since the locking means for moving a pallet is provided integrally with the chucking means for opening/closing the cover of a pallet, an opening/closing operation of the pallet cover and a delivery operation of an empty pallet can be simultaneously performed by adding moving means for moving the chucking means to a pallet cover opening/closing device which is always required. For this reason, the robot can operate during the delivery operation of an empty pallet, and the operation efficiency of the entire apparatus can be improved.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 6A and 6B are respectively a front view and a diagram showing a controller;

DETAILED DESCRIPTION OF THE PREFERRED EMBODIMENTS

The preferred embodiments of the present invention will be described in detail hereinafter with reference to the accompanying drawings.

(First Embodiment)

Figure 1A:
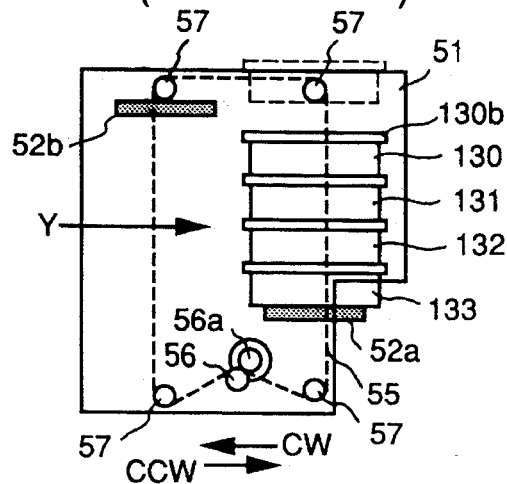
FIGS. 1A to 1F are views for explaining operations of a conventional pallet supply apparatus.
Figure 1B:
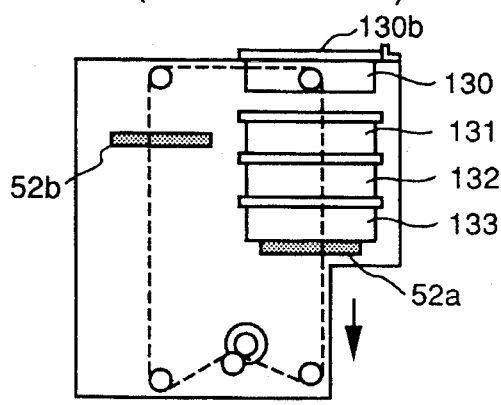
Figure 1C:
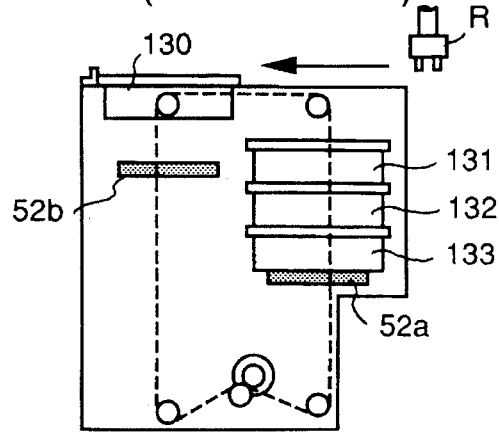
Figure 1D:
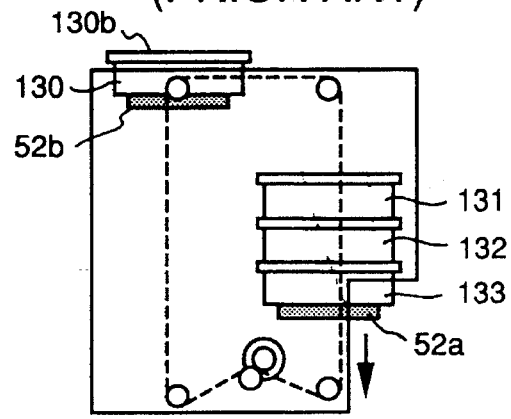
Figure 1E:
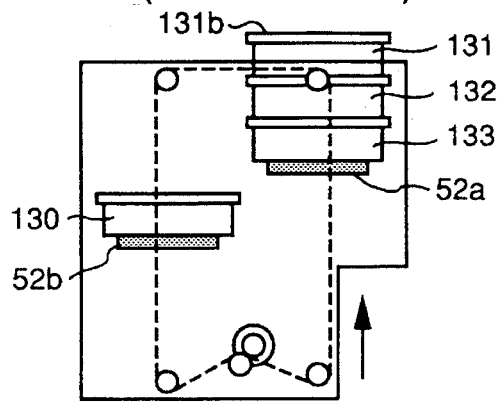
Figure 1F:
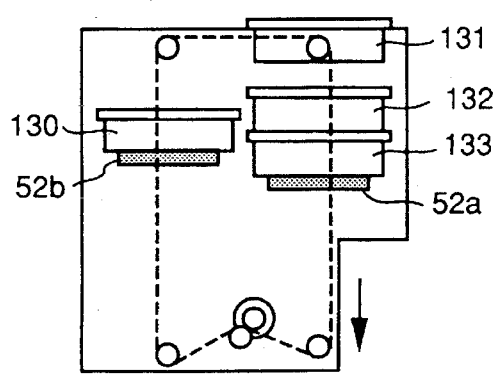
Figure 2:
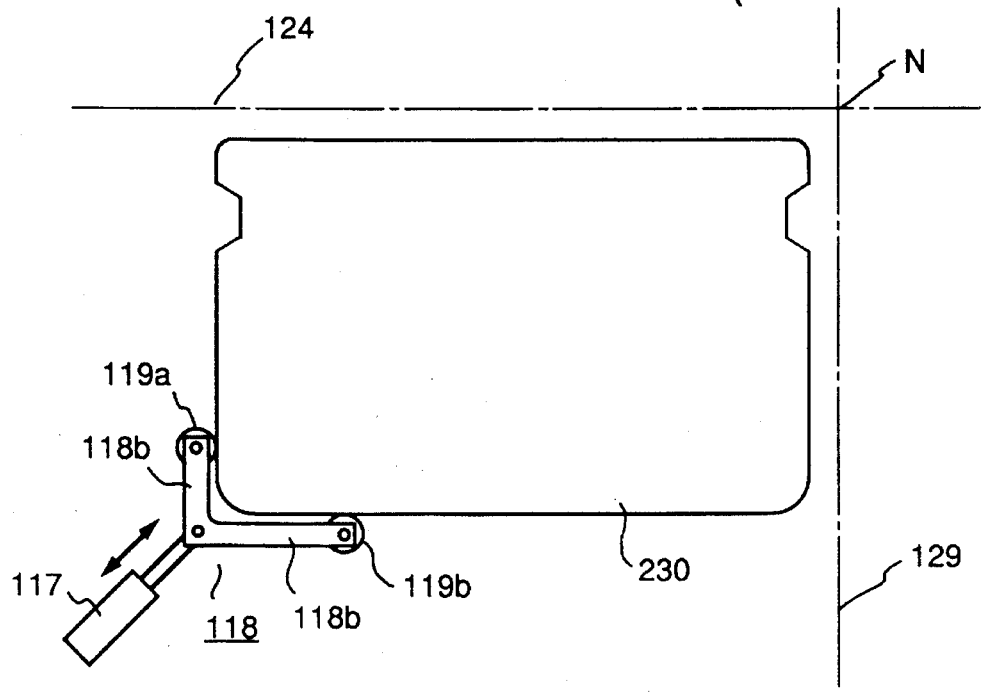
FIG. 2 is a schematic view for explaining a conventional pallet positioning device.
Figure 3:
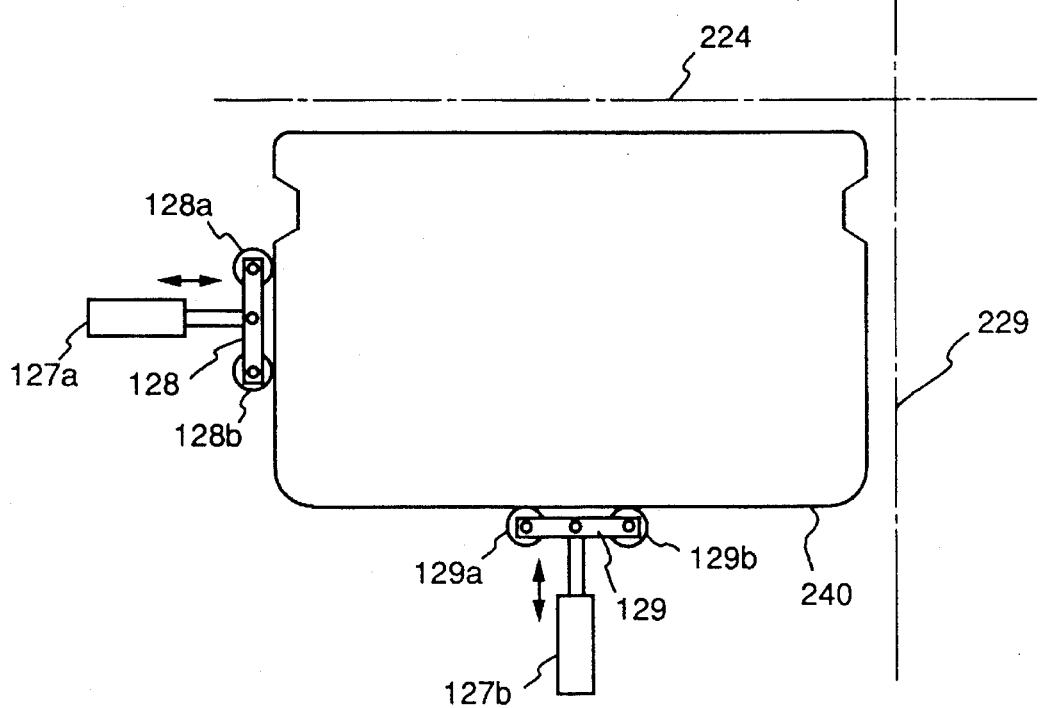
FIG. 3 is a schematic view for explaining another conventional pallet positioning device.
Figure 4:
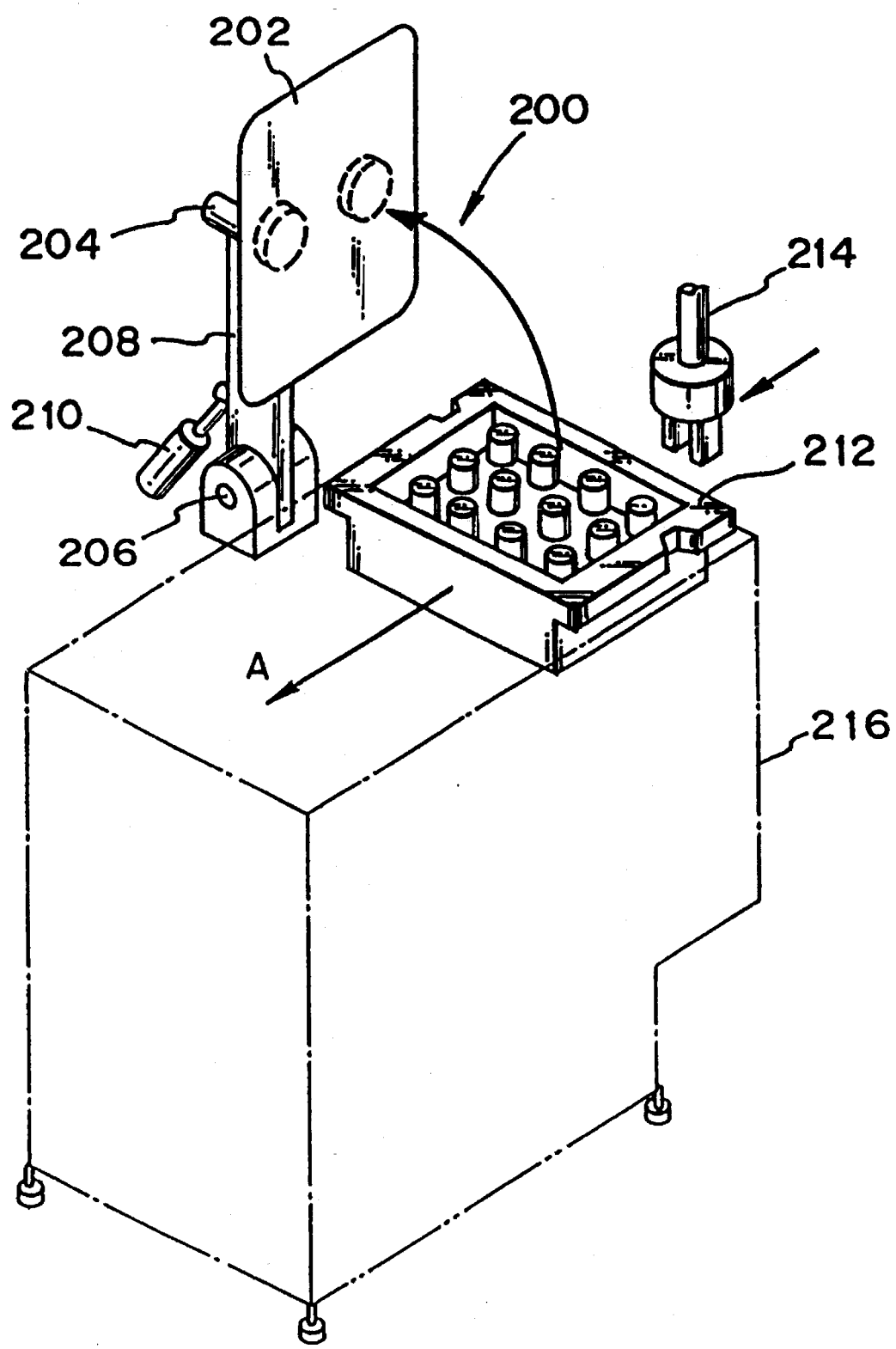
FIG. 4 is a perspective view showing a structure of another conventional pallet supply apparatus.
Figure 5:
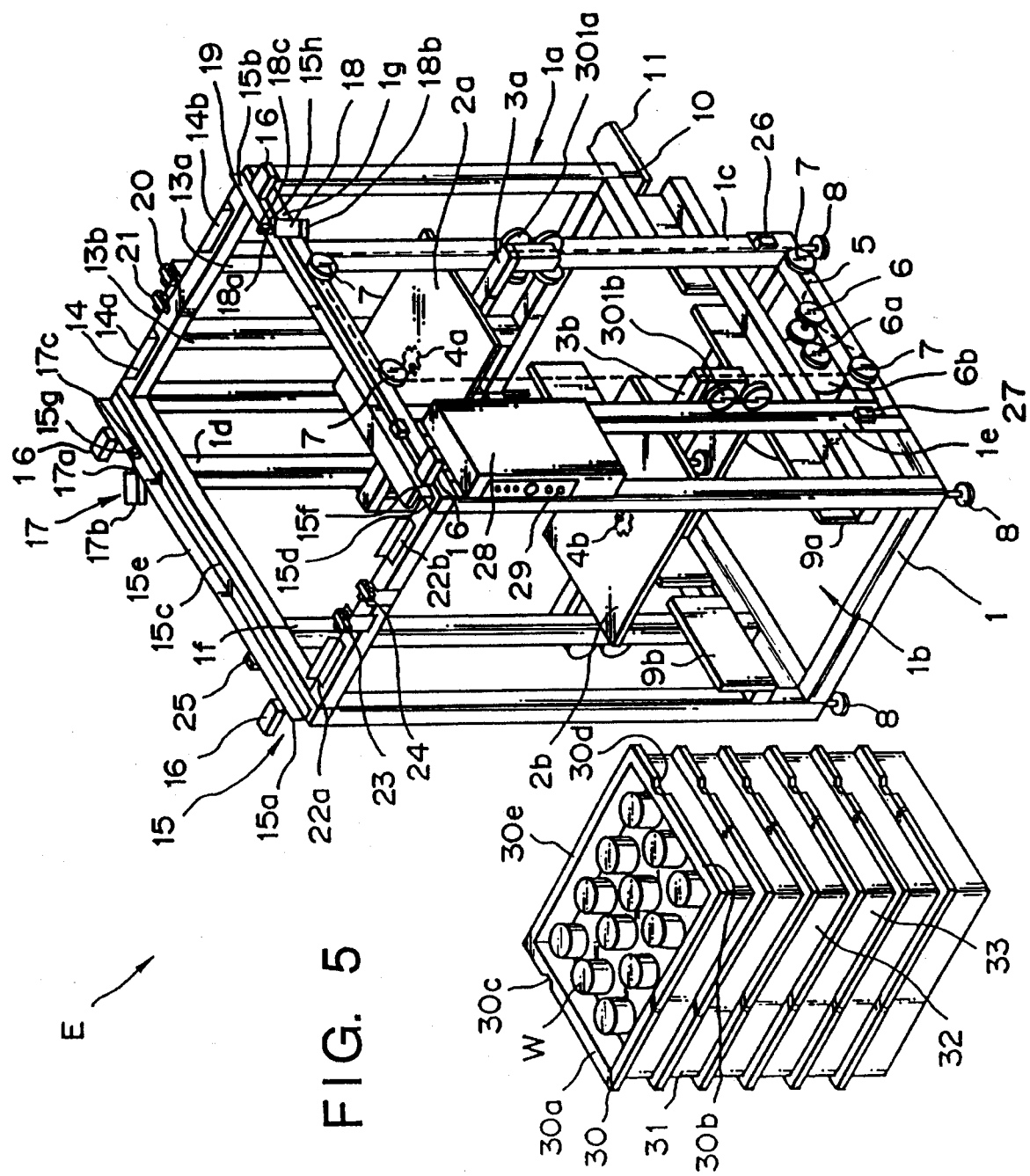
FIG. 5 is a perspective view showing stacked pallets before insertion according to an embodiment of the present invention.

FIG. 5 is a perspective view showing a pallet supply apparatus of the first embodiment. A pallet supply apparatus E conveys boxes 30 to 33 as pallets each storing a predetermined number of works W to its upper end one by one. Each of the boxes 30 to 33 has a left side flange 30a and a right side flange 30b as two side edges to be locked with a shutter (to be described later), and these flanges 30a and 30b respectively have notches 30c and 30d. The same applies to other boxes 31 to 33, and a detailed description thereof will be omitted.

[Overall Structure of Pallet Supply Apparatus]

A main body 1 of the pallet supply apparatus E is a box-shaped frame having a projecting portion 1a at its rear end, and is formed with an opening 1b used for inserting boxes 30 to 33 storing works W (to be referred to as "loaded pallets" hereinafter), and delivering empty boxes 30 to 33 (to be referred to as "empty pallets" hereinafter) at its front end. Loaded pallet elevator guide beams 1c and 1d and empty pallet elevator guide beams 1e and 1f, which beams extend in the vertical direction, are arranged on the side surfaces of the main body 1. In addition, a rectangular upper frame 1g is arranged on the upper end of the main body 1. The loaded pallet elevator guide beams 1c and 1d vertically guide a loaded pallet elevator guide 3a for supporting a loaded pallet elevator 2a as a first elevator, and a plurality of guide rollers 301a held at the two ends of the loaded pallet elevator guide 3a roll along the loaded pallet elevator guide beams 1c and 1d. Similarly, the empty pallet elevator guide beams 1e and 1f vertically guide an empty pallet elevator guide 3b for supporting an empty pallet elevator 2b as a second elevator, and a plurality of guide rollers 301b held at two ends of the empty pallet elevator guide 3b roll along the empty pallet elevator guide beams 1e and 1f. The loaded pallet elevator 2a and the empty pallet elevator 2b respectively have elevator loaded and empty pallet sensors 4a and 4b each for detecting whether or not loaded or empty pallets are placed on the corresponding elevator.

The loaded and empty pallet elevator guides 3a and 3b are vertically moved in opposite directions by an endless chain 5, which is moved clockwise or counterclockwise along the loaded and empty pallet elevator guide beams 1c and 1e, and a second endless chain (not shown), which is moved along the loaded and empty pallet elevator guide beams 1d and 1f. A driving sprocket 6 for moving the endless chain 5 clockwise or counterclockwise is driven by a motor 6b as a driving means via a transmission gear 6a. Idler sprockets 7 for supporting the endless chain 5 to be movable clockwise or counterclockwise are arranged at the upper and lower ends of the main body 1. The second endless chain, which is moved along the loaded and empty pallet elevator guide beams 1d and 1f, is also driven by a substantially duplicate set (unshown) of sprockets and gears on the opposite side of the frame. More specifically, the second endless chain is driven by a driving sprocket and transmission gear similar to the driving sprocket 6 and the transmission gear 6a, and is moved around the same idler sprockets as the idler sprockets 7.

The lower end of the main body 1 is supported on a floor surface via a plurality of level adjusters 8, and a pair of guide rails 9a and 9b for guiding loaded and empty pallets which are to be inserted or delivered via the opening 1b are arranged near the lower end of the main body 1. A fixing shaft 10 arranged at the rear end of the main body 1 is used for positioning the pallet supply apparatus E with respect to a frame 11 of an automatic processing system. Furthermore, a transmission shaft (unshown) arranged below the guide rails 9a and 9b transmits the rotation of the motor 6b to the driving sprocket of the second endless chain, which is moved along the loaded and empty pallet elevator guide beams 1d and 1f. Abutting beams 13a and 13b are arranged at the rear end of the main body 1. Loaded pallets (not shown) inserted from the opening 1b along the guide rails 9a and 9b abut against these abutting beams 13a and 13b, and are stopped on the loaded pallet elevator 2a.

The upper frame 1g of the main body 1 supports a pair of abutting angles 14a and 14b fixed to the rear end of the frame 1g, a shutter 15 for, when the loaded pallet elevator 2a is moved upward, separating the uppermost loaded pallet of those stacked on the elevator 2a from the remaining loaded pallets by a method to be described later, a cylinder 16 for driving the shutter 15, and a positioning device as a pallet positioning device consisting of right and left positioning units 18 and 17 for positioning the loaded pallet separated by the shutter 15. The shutter 15 is constituted by a stationary shutter plate 15b fixed to the upper frame 1g, and a movable shutter plate 15a which is movable in a direction to approach or separate from the stationary shutter plate 15b. The shutter 15 is opened/closed by moving the movable shutter plate 15a by the cylinder 16 in the above-mentioned direction. The movable and stationary shutter plates 15a and 15b are L-shaped beams respectively having horizontal webs 15c and 15d and vertical webs 15e and 15f. The horizontal web 15c of the movable shutter plate 15a is slidably placed on the upper frame 1g of the main body 1, and the horizontal web 15d of the stationary shutter plate 15b is fixed to the upper frame 1g.

A loaded pallet is separated by the shutter 15 as follows. The loaded pallet elevator 2a is moved upward in a state wherein the shutter 15 is open, and when the left side flange 30a and the right side flange 30b of the uppermost loaded pallet reach a predetermined level beyond the horizontal webs 15c and 15d, the cylinder 16 is driven. Thus, the movable shutter plate 15a approaches the stationary shutter plate 15b. In this process, the vertical web 15e of the movable shutter plate 15a is engaged with the left side flange 30a of the loaded pallet to move the loaded pallet toward the stationary shutter plate 15b. When the loaded pallet elevator 2a is moved downward, corresponding portions of the left side flange 30a and the right side flange 30b drop onto the horizontal web 15c of the movable shutter plate 15a and the horizontal web 15d of the stationary shutter plate 15b, and are supported by these webs.

The left positioning unit 17 is constituted by a cylinder 17b as a positioning driving means having a piston rod 17a, which extends through a hole 15g formed in the vertical web 15e of the movable shutter plate 15a, and is obliquely moved toward the rear end of the main body 1, and a left roller 17c as a roller provided to the distal end of the piston rod 17a. The right positioning unit 18 is constituted by a cylinder 18b as a positioning driving means having a piston rod 18a, which extends through a hole 15h formed in the vertical web 15f of the stationary shutter plate 15b, and is obliquely moved toward the rear end of the main body 1, and a right roller 18c as a roller provided to the distal end of the piston rod 18a. The left roller 17c and the right roller 18c are arranged near a rear reference surface 14 as the other positioning reference surface defined by the abutting angles 14a and 14b. Also, the side surface, facing the movable shutter plate 15a, of the stationary shutter plate 15b defines a side reference surface 19 as one positioning reference surface.

Furthermore, a loaded pallet upper end sensor 20 for detecting that a loaded pallet separated by the shutter 15 has been moved upward to the predetermined level, and a loaded pallet sensor 21 as a detection means for detecting the presence/absence of a loaded pallet dropped on the shutter 15 after the shutter 15 is closed are provided to the rear end of the upper frame 1g of the main body 1. Stopper angles 22a and 22b similar to the abutting angles 14a and 14b arranged at the rear end of the main body 1, an empty pallet upper end sensor 23 for detecting the upper end of an empty pallet moved upward to a predetermined level by the empty pallet elevator 2b before the shutter 15 is opened, and an empty pallet sensor 24 for detecting the presence/absence of an empty pallet which is slid from the rear end to the front end of the upper frame 1a when the shutter 15 is closed are provided to the front end of the upper frame 1g.

The movable shutter plate 15a is provided with a shutter opening sensor 25 for detecting that the shutter 15 is opened. Furthermore, a loaded pallet lower end sensor 26 for detecting that the loaded pallet elevator 2a is located at the lower end of its moving path is arranged near the lower end of the loaded pallet elevator guide beam 1c. Also, an empty pallet lower end sensor 27 for detecting that the empty pallet elevator 2b is located at the lower end of its moving path is provided near the lower end of the empty pallet elevator guide beam 1e. In addition, a controller 28 as a control means for automatically controlling the motor 6b, and the cylinders 16, 17b, and 18b on the basis of signals from the above-mentioned sensors is arranged near the upper end of the main body 1.

[Controller]

Figure 6A:
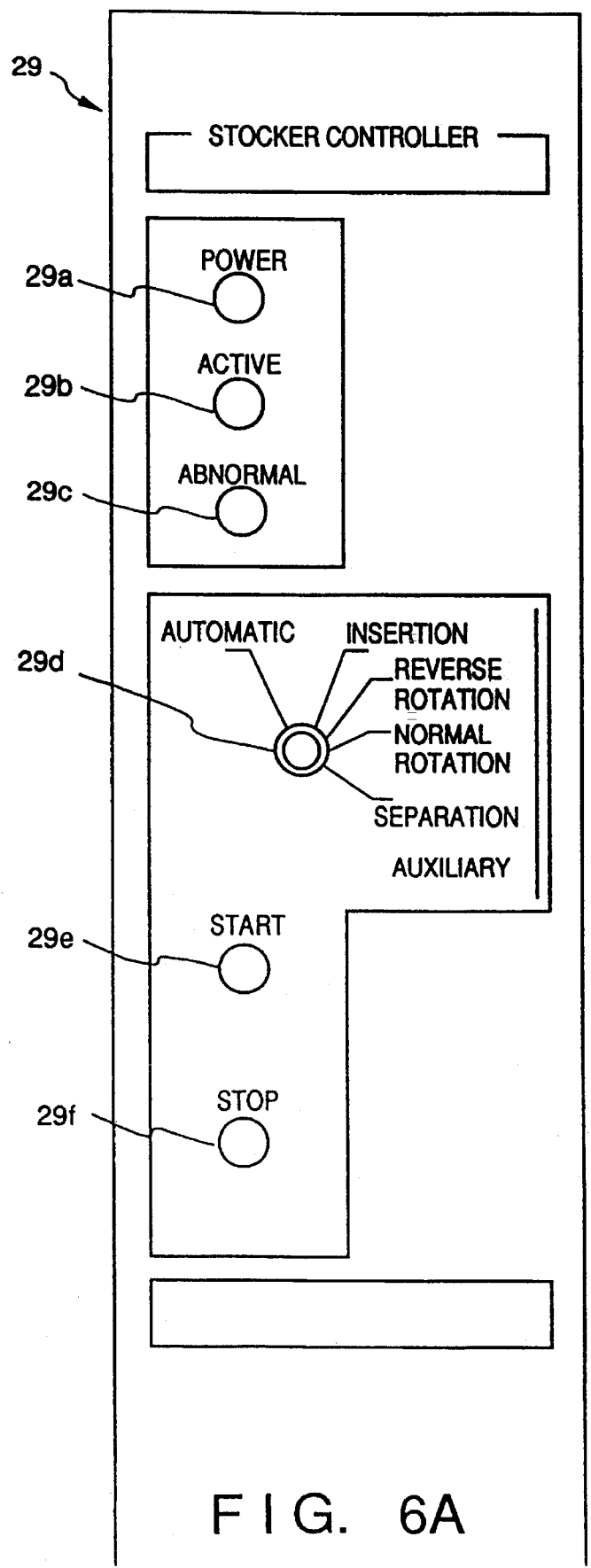

As shown in FIG. 6A, the controller 28 comprises an indication panel 29 having a power indication lamp 29a, a normal indication lamp 29b indicating that programs are being normally executed, an abnormal indication lamp 29c indicating an abnormal state, a selection switch 29d for setting a program mode, a start switch 29e for starting a selected program, a stop switch 29f for stopping a program in execution. As shown in FIG. 6B, the controller 28 comprises a power supply circuit 28a having a motor driving power supply of 100 V and a power supply of 24 V for driving the controller and the above-mentioned sensors, a sequencer 28b having input terminals connected to the sensors 21, 24, 20, 23, 4a, 4b, 26, 27, and 25, contacts 29da, 29db, 29dc, 29de, and 29df of the selection switch 29d, the start switch 29e, the stop switch 29f, and a push signal generator P (not shown), and an operation relay 28c for driving the motor 6b in the normal and reverse directions, driving a solenoid valve of the cylinder 16 of the shutter, and driving a solenoid valve of the cylinder 17b of the left positioning unit and a solenoid valve of the cylinder 18b of the right positioning unit in accordance with a command signal from the sequencer 28b. The output terminals of the sequencer 28b are connected to the power indication lamp 29a, the normal indication lamp 29b, the abnormal indication lamp 29c, and signal generators 28d to 28i for generating various signals required in control executed by the selected program.

The sequencer 28b includes a control circuit for controlling the operation relay, indication lamp, and signal generators connected to its output terminals on the basis of an insertion mode program (to be described later) for locating the loaded pallet elevator 2a at the lower end position after empty pallets stacked on the empty pallet elevator 2b are delivered from the main body 1, inserting a stack of a predetermined number of new loaded pallets from the opening 1b of the main body 1, and placing the stack of loaded pallets on the loaded pallet elevator 2a along the guide rails 9a and 9b, a separation mode program (to be described later) for moving the loaded pallet elevator 2a upward together with the inserted loaded pallets, closing the shutter 15 to separate the uppermost loaded pallet from the remaining loaded pallets, and positioning the separated loaded pallet with reference to the rear and side reference surfaces 14 and 19, an automatic mode program (to be described later) for automatically repeating a step of recovering an empty pallet from which all works have been picked up by a work supply robot onto the empty pallet elevator 2b by sliding it toward the front end of the main body 1 by a pusher (not shown), and a step of separating and positioning the uppermost one of the remaining loaded pallets on the loaded pallet elevator 2a in the same manner as described above, and the like.

[Positioning Device]

Figure 7A:
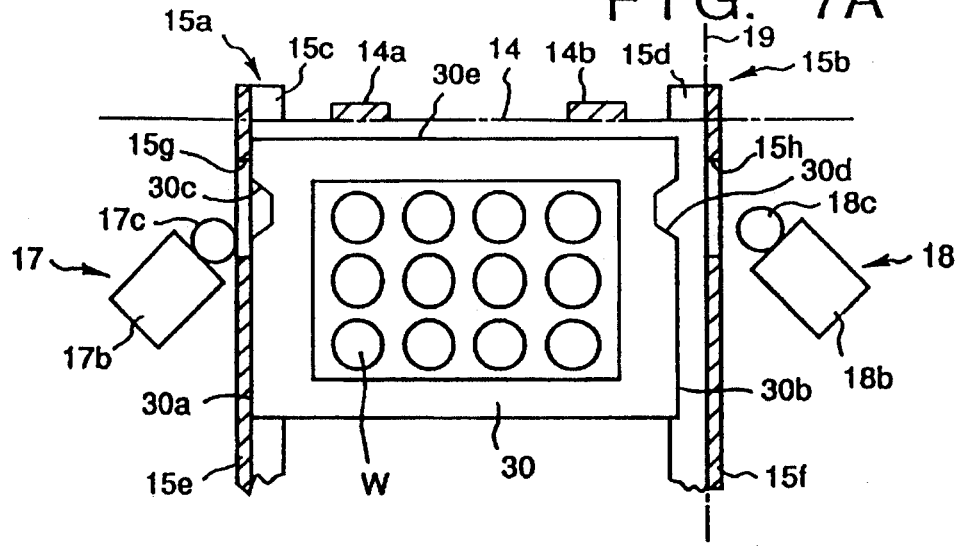
FIGS. 7A to 7C are plan views for explaining operations of a positioning device.
Figure 7B:
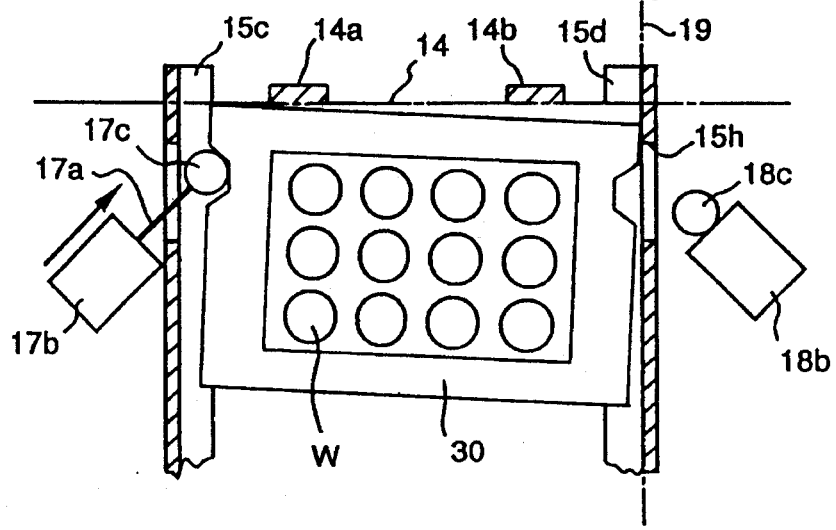

A pallet 30 separated on the shutter 15 by the above-mentioned method is in a state shown in FIG. 7A. More specifically, the left side flange 30a of the pallet 30 is supported by the horizontal web 15c of the movable shutter plate 15a, and the right side flange 30b is supported by the horizontal web 15d of the stationary shutter plate 15b. When the pallet 30 is to be positioned, the cylinder 17b of the left positioning unit 17 is driven, as shown in FIG. 7B. Thus, the left roller 17c is moved toward the rear reference plate 14 via the hole 15g of the vertical web 15e of the movable shutter plate 15a, and is engaged with the notch 30c of the left side flange 30a of the pallet 30. When the left roller 17c is continuously moved forward in the above-mentioned direction, a first pushing force acts on the left side flange 30a. Thus, the pallet 30 approaches the rear and side reference surfaces 14 and 19, and is inclined toward the side reference surface 19. As a result, the left end of a rear flange 30e of the pallet 30 contacts the rear reference surface 14, and the right end thereof contacts the side reference surface 19.

Figure 7C:
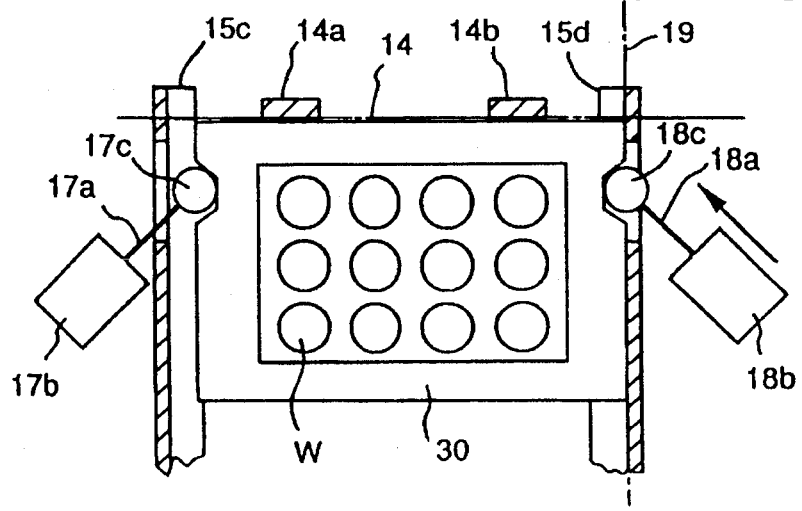

As shown in FIG. 7C, the cylinder 18b of the right positioning unit 18 is driven without stopping the driving operation of the cylinder 17b. Thus, the right roller 18c is moved toward the rear reference surface 14 via the hole 15h of the vertical web 15d of the stationary shutter plate 15b, and is engaged with the notch 30d of the right side flange 30b of the pallet 30. When the right roller 18c is continuously moved forward in the above-mentioned direction, a second pushing force acts. Thus, the right end of the rear flange 30e of the pallet 30 is slidably moved along the side reference surface 19, and reaches a corner where the side and rear reference surfaces 19 and 14 cross. More specifically, the pallet 30 is brought into contact with the side and rear reference surfaces 19 and 14 while being inclined in a direction to separate away from the side reference surface 19, i.e., in a direction opposite to the above-mentioned inclination direction, thus completing the positioning operation. After all works W in the pallet 30 are picked up by the work supply robot, the left roller 17c and the right roller 18c are simultaneously moved backward, thus releasing the positioning state. At this time, since the cylinders 17b and 18b are simultaneously driven, their driving times can be shortened. In addition, since the left roller 17c or the right roller 18c need not be escaped in the vertical direction, the rollers can be quickly moved backward to positions where they do not interfere with the pallet 30 when the pallet 30 is slid in the direction of the empty pallet elevator 2b.

Programs set in the sequencer 28b will be described below.

[Insertion Mode Program]

Figure 9:
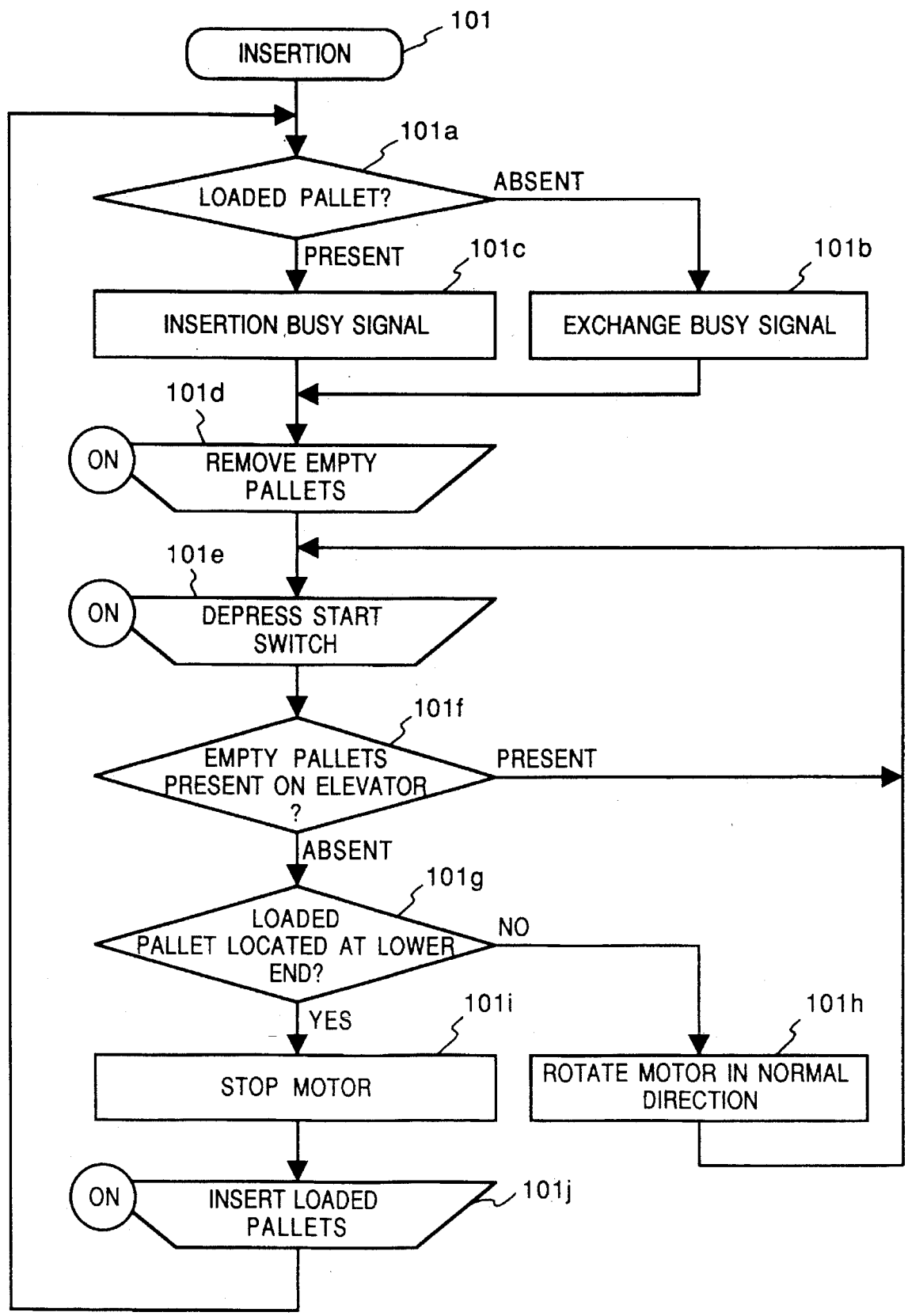
FIG. 9 is a flow chart for explaining control using an insertion mode program.

As shown in FIG. 9, the selection switch 29d of the controller 28 is turned to a position "insertion". In step 101a, the presence/absence of a loaded pallet on the shutter 15 is checked by the loaded pallet sensor 21. If it is determined in step 101a that no loaded pallet is present on the shutter 15, the flow advances to step 101b, and an insertion busy signal is output. In step 101d, empty pallets are removed. If the start switch 29e is depressed in step 101e, it is checked using the elevator empty pallet sensor 4b in step 101f if an empty pallet remains on the empty pallet elevator 2b. At this time, if it is determined in step 101f that an empty pallet remains on the elevator 2b, the flow returns to step 101e. This is to prevent damage to the main body 1 due to an operator's error occurring when an operator forgets to remove empty pallets in step 101d. In step 101g, the level position of the loaded pallet elevator 2a is checked. When the loaded pallet elevator 2a is located at the lower end position, i.e., when the loaded pallet lower end sensor 26 is ON, the motor 6b is not rotated, and the flow advances to step 101j. However, when the loaded pallet elevator 2a is not located at the lower end position, the motor 6b is rotated in the normal direction to move the loaded pallet elevator 2a downward until the loaded pallet lower end sensor 26 is turned on, and the motor 6b is stopped in step 101i. At this time, the empty pallet elevator 2b is moved upward to the upper end position.

Figure 8A:
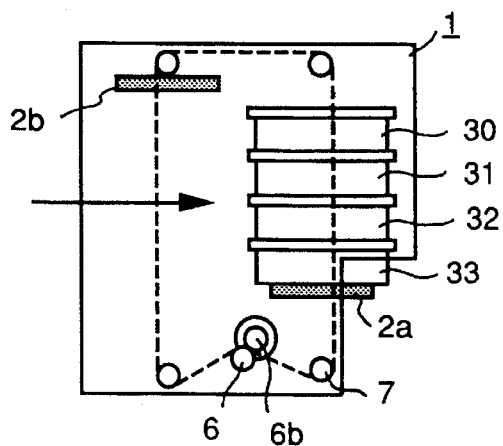
FIGS. 8A to 8F are views for explaining operations of a pallet supply apparatus.

In step 101j, manually stacked loaded pallets 30 to 33 are inserted into the main body 1. More specifically, the stacked loaded pallets 30 to 33 are placed on the guide rails 9a and 9b, and are pushed onto the loaded pallet elevator 2a. When the stacked loaded pallets 30 to 33 abut against the abutting beams 13a and 13b, the insertion mode program is ended (a state shown in FIG. 8A is attained).

[Separation Mode Program]

Figure 10:
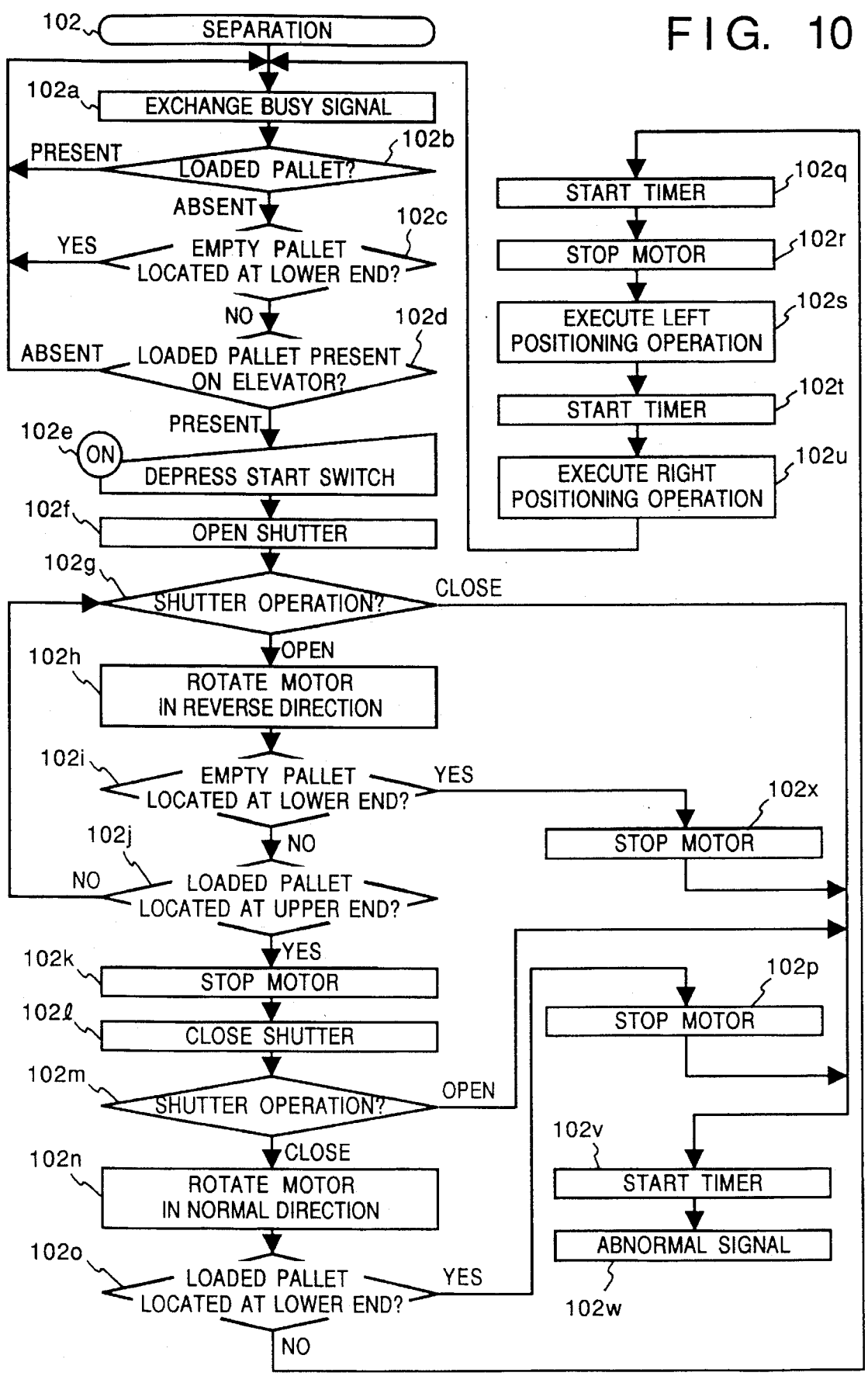
FIG. 10 is a flow chart for explaining control using a separation mode program.

As shown in FIG. 10, the selection switch 29d of the controller 28 is turned to a position "separation". In step 102a, an exchange busy signal is output. In step 102b, it is confirmed that no loaded pallet is present on the shutter 15. In step 102c, the level position of the loaded pallet elevator 2a is checked. More specifically, when the empty pallet lower end sensor 27 is ON, the motor 6b is not rotated, and the flow returns to step 102a. In the current state, since the loaded pallet elevator 2a is located at the lower end position, the flow advances to step 102d. In step 102d, it is checked using the elevator loaded pallet sensor 4a if loaded pallets are placed on the loaded pallet elevator 2a. If no loaded pallets are placed on the elevator 2a, the flow returns to step 102a. If stacked loaded pallets are present on the loaded pallet elevator 2a, the flow advances to step 102e. Then, an operator depresses the start switch 29e to start the separation operation (step 102e). In step 102f, the shutter 15 is opened, so that a loaded pallet can be moved upward between the movable and stationary shutter plates 15a and 15b. In step 102g, it is checked using the shutter open sensor 25 if the shutter 15 is open. Simultaneously with step 102g, a timer is started in step 102v, and when the shutter open sensor 25 does not generate any signal in several seconds, an abnormal signal is output in step 102w. Thus, the operation of the main body 1 is ended in this state.

In a normal operation state, the shutter 15 is opened, and the flow advances to step 102h.

In step 102h, the loaded pallet elevator 2a is moved upward by rotating the motor in the reverse (counterclockwise) direction.

In step 102i, when no loaded pallet is detected by the loaded pallet upper end sensor 20 during the upward movement of the loaded pallet elevator 2a, or when the loaded pallet elevator 2a is abnormally moved upward due to, e.g., a malfunction of the loaded pallet upper end sensor, such a state is detected by the empty pallet lower end sensor 27. In step 102x, the motor is stopped. After the timer is started in step 102v, an abnormal signal is output in step 102w, thus ending this mode.

In a normal state, since the uppermost loaded pallet 30 on the loaded pallet elevator 2a is detected by the loaded pallet upper end sensor 20 in step 102*j*, and the loaded pallet upper end sensor 20 is turned on, the flow advances to step 102*k* to stop the motor.

In step 102*l*, the shutter 15 is closed. In this state, the uppermost loaded pallet 30 is in a separable state. In step 102*m*, the operation state of the shutter 15 is checked using the shutter open sensor 25. If the shutter 15 is left opened, the timer is started in step 102*v*, and an abnormal signal is output in step 102*w*, thus ending this mode. If the shutter open sensor 25 detects that the shutter 15 is closed, the flow advances to step 102*n* to rotate the motor in the normal (clockwise) direction.

In step 102*o*, the state of the loaded pallet lower end sensor 26 is checked so as to prevent the loaded pallet elevator 2*a* from abnormally moving downward when pallets exceeding a predetermined number of pallets are inserted into the main body 1. When the loaded pallet lower end sensor 26 is ON, the motor is stopped in step 102*p*. After the timer is started in step 102*v*, an abnormal signal is output in step 102*w*, thus ending this mode.

When a predetermined number of pallets or less are normally inserted, the timer is started in step 102*q*, and thereafter, the motor is stopped in step 102*r*. In this state, the uppermost loaded pallet 30 is separated (FIG. 8B). Then, the control starts the positioning operation of the loaded pallet 30.

In step 102*s*, a left positioning operation is executed. That is, the cylinder 17*b* is driven.

In step 102*t*, the timer is started to wait for a time lag required for the left positioning operation in step 102*s*.

In step 102*u*, a right positioning operation is performed. That is, the cylinder 18*b* is driven. The separation mode is ended with this operation.

[Automatic Mode Program]

Figure 11:
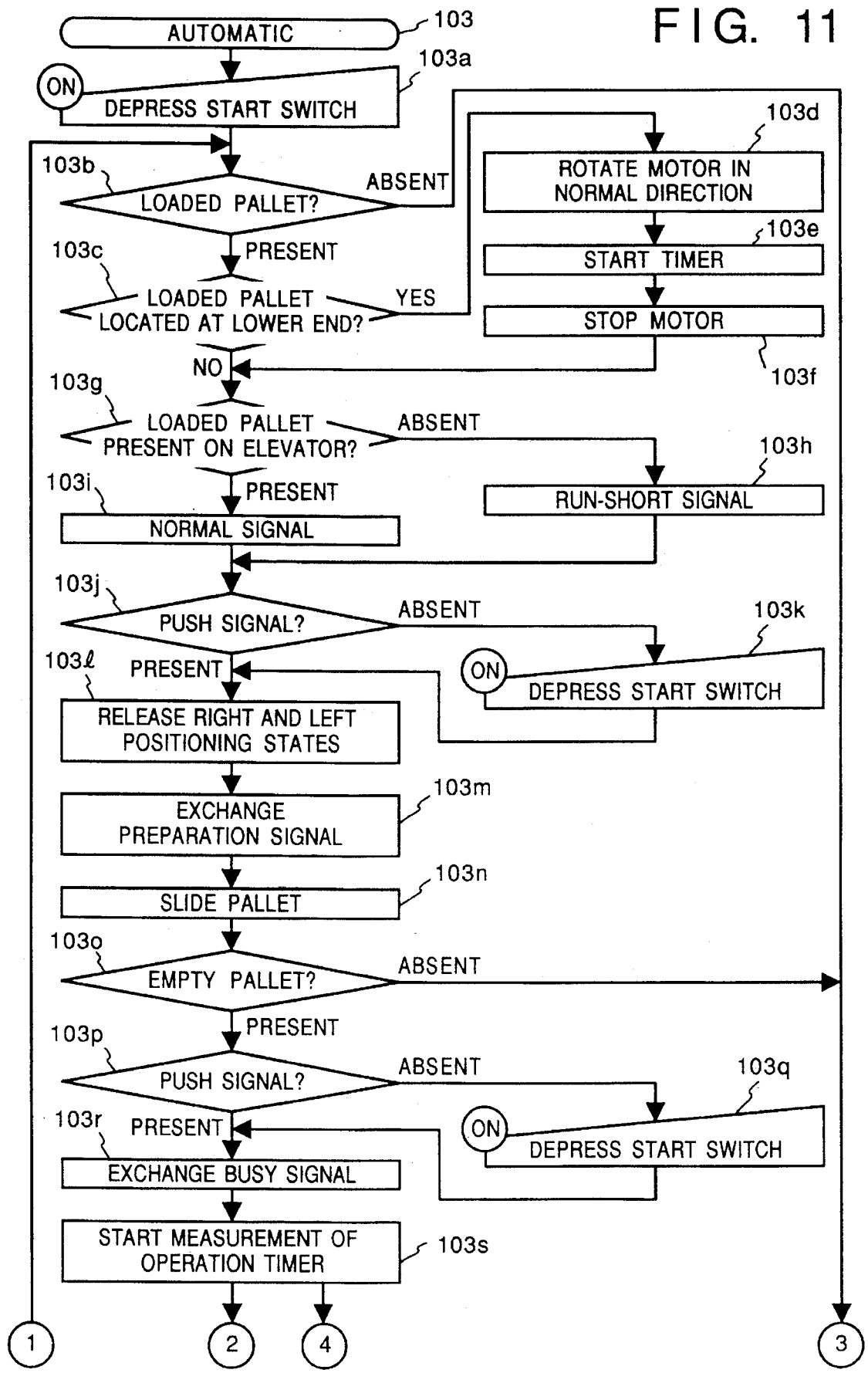
FIG. 11 is a flow chart for explaining control using the first half of an automatic mode program.

As shown in FIG. 11, the selection switch 29*d* of the controller 28 is turned to a position "automatic". In step 103*a*, the control waits for manual depression of the start switch 29*e* so as to confirm the start of the operation. When the start switch 29*e* is depressed, the flow advances to step 103*b* to check using the loaded pallet sensor 21 if a loaded pallet is set on the shutter 15. If no loaded pallet is set, the timer is started in step 103*an*, and an abnormal signal is output in step 103*ao*, thus ending this mode. If the loaded pallet 30 is separated and positioned in the above-mentioned separation mode, the flow advances to step 103*c*. If it is detected using the loaded pallet lower end sensor 26 in step 103*c* that the loaded pallet elevator 2*a* is located at the lower end position, the flow advances to step 103*d* (this case will be described later in the paragraph of "Insertion Executed When Loaded Pallets are Present in Main Body").

If the loaded pallet lower end sensor 26 does not detect the loaded pallet elevator 2*a* in step 103*c*, the presence/absence of loaded pallets on the loaded pallet elevator 2*a* is detected by the elevator loaded pallet sensor 4*a*. This is to urge an operator to insert new pallets into the main body 1 when no loaded pallet is present on the loaded pallet elevator 2*a*.

If at least one loaded pallet is present on the loaded pallet elevator 2*a*, a normal signal is output in step 103*i*; if no loaded pallet is present on the loaded pallet elevator 2*a*, a run-short signal is output in step 103*h* to urge an operator to insert new pallets.

If the normal signal is output in step 103*i*, the flow advances to step 103*j*. In step 103*j*, the control waits for input of a push signal. During this interval, works in the loaded pallet 30 are picked up by, e.g., a work supply robot, and at the same time, the number of picked-up works is counted. When the loaded pallet 30 on the shutter 15 becomes empty, the work supply robot supplies a push signal to the main body 1 (the flow may be manually caused to advance to step 103 by depressing the start switch 29*e* in step 103*k*). Upon reception of the push signal, the main body 1 releases the positioning state of the aright and left positioning units 18 and 17 in step 103 , and an exchange preparation signal is output in step 103*m*.

Figure 8D:
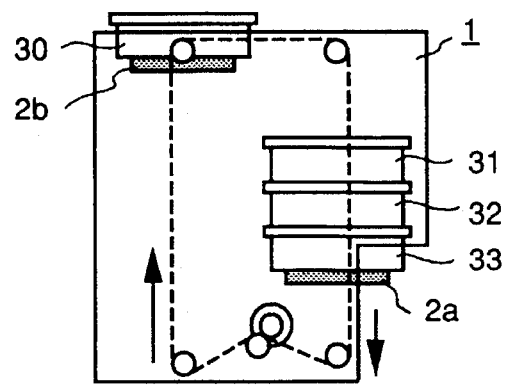
Figure 8B:
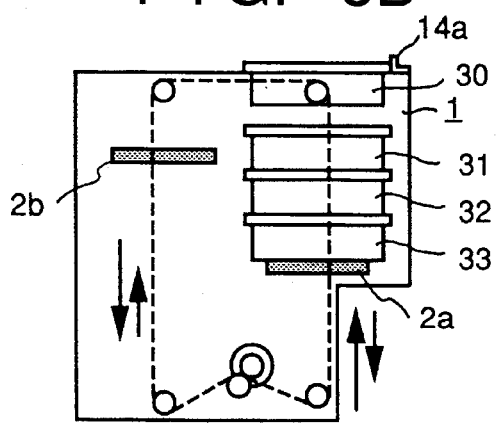
Figure 8E:
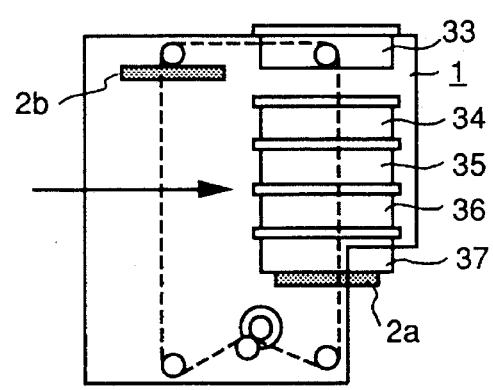
Figure 8C:
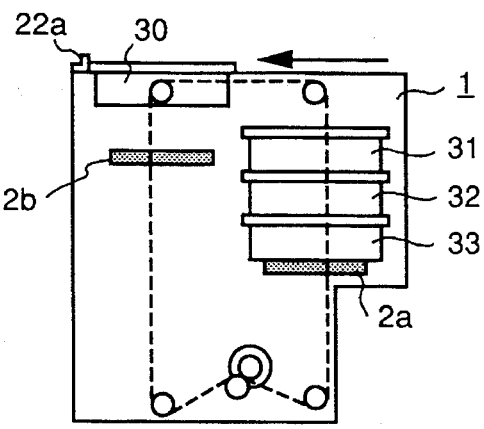

Upon reception of the exchange preparation signal, the work supply robot confirms that the positioning state of the right and left positioning units 18 and 17 of the main body 1 is released, and slides the empty pallet 30 on the shutter 15 until the pallet 30 abuts against the stopper angles 22*a* and 22*b* above the empty pallet elevator 2*b* in step 103*n* (a state shown in FIG. 8C is attained). Note that this operation may be performed by a pusher (not shown).

In step 103*o*, it is checked using the empty pallet sensor 24 if the empty pallet 30 slid on the shutter 15 normally abuts against the stopper angles 22*a* and 22*b* so as to prevent a stacking error upon stacking of empty pallets. After the exchange preparation signal is output in step 103*m*, if the empty pallet sensor 24 does not detect any pallet even after the timer operation is completed in step 103*an*, an abnormal signal is output in step 103*ao*, thus ending this mode.

When the empty pallet 30 on the shutter 15 is slid, and the work supply robot or pusher is moved backward, another push signal is supplied (the flow may be manually caused to advance to step 103*r* by depressing the start switch 29*e* in step 103*k*). Upon reception of the push signal, the main body 1 outputs an exchange busy signal in step 103*r*. In step 103*s*, the measurement of an operation timer is started. A pallet exchange time measured in advance is input to the controller 28 provided to the main body 1, and this operation timer is used for detecting an abnormality of the main body 1 due to an operation error during exchange of pallets. For example, when an abnormality occurs during the exchange operation which is reset in step 103*am* (to be described later), since the operation program is stopped in that step, the time measured by the timer exceeds the input exchange time. In this case, it is determined in step 103*v* that the measured time is larger than a setting value, and the motor 6*b* is stopped in step 103*ap*. After the timer operation is completed in step 103*an*, an abnormal signal is output in step 103*ao*, thus ending this mode.

Figure 12:
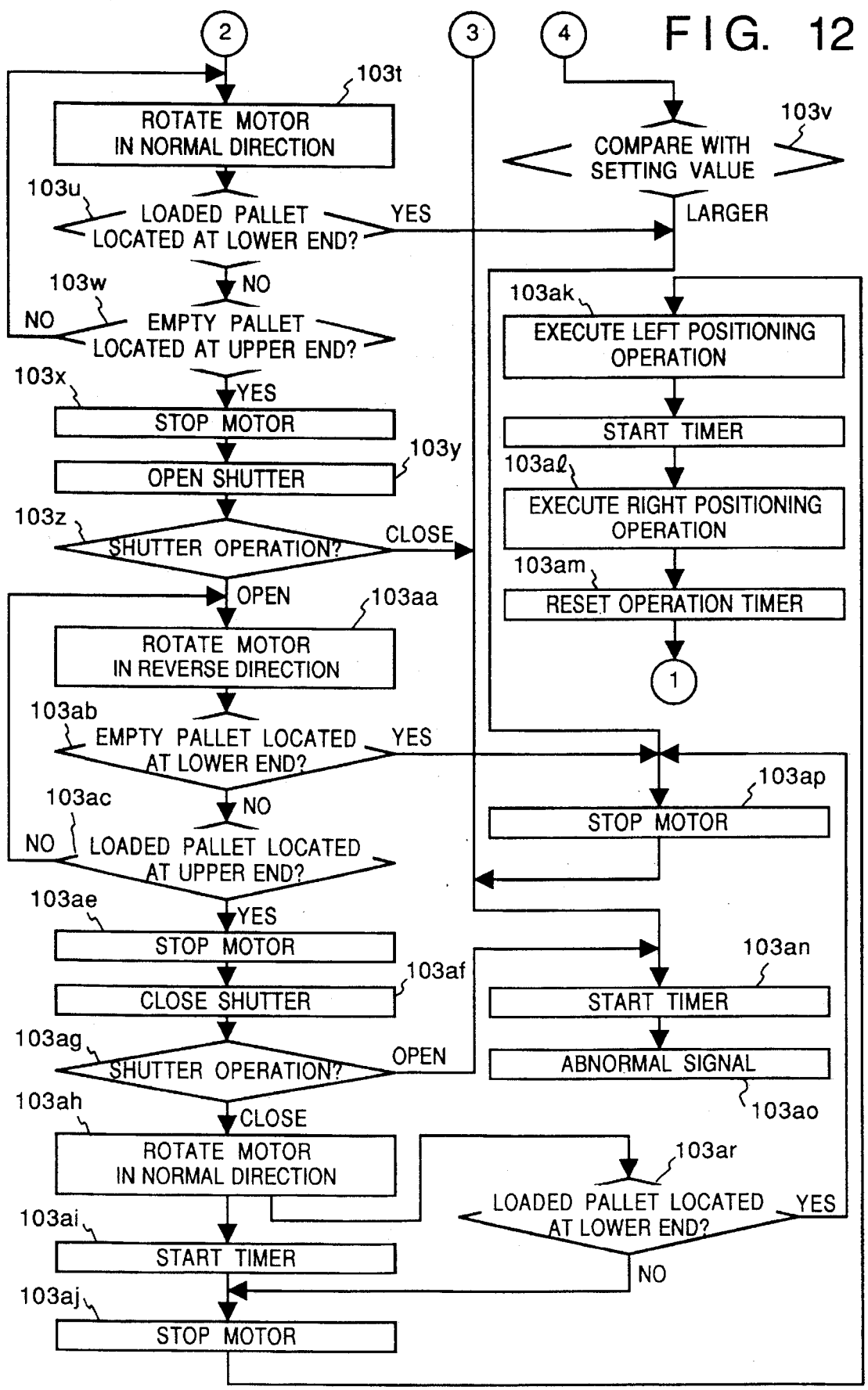
FIG. 12 is a flow chart for explaining control using the second half of the automatic mode program.

As shown in FIG. 12, the motor 6*b* is rotated in the normal (clockwise) direction in step 103*t* to move the empty pallet elevator 2*b* upward so as to recover the empty pallet on the shutter 15 (this state is shown in FIG. 8D). In step 103*u*, the state of the loaded pallet lower end sensor 26 is checked to prevent the loaded pallet elevator 2*a* from being abnormally moved downward during upward movement of the empty pallet elevator 2*b*.

If it is determined in step 103*u* that the loaded pallet lower end sensor 26 is turned on, the motor is stopped in step 103*ap*, and after the timer operation in step 103*an*, an abnormal signal is output in step 103*ao*, thus ending this mode. In step 103*w*, the empty pallet upper end sensor 23 detects a timing at which the empty pallet 30 on the shutter 15 is pushed up by the empty pallet elevator 2*b* upon normal (clockwise) rotation of the motor 6*b*, and is separated from the shutter 15. When the empty pallet upper end sensor 23 is turned on, the motor is stopped in step 103*x*. In this state, the empty pallet 30 is recovered on the empty pallet elevator 2*b*. In step 103*y*, the shutter 15 is opened to move the empty pallet 30 recovered on the empty pallet elevator 2*b* downward. If the shutter open sensor 25 detects in step 103*z* that the shutter 15 is opened, the flow advances to step 103*aa*. If the sensor 25 does not detect that the shutter 15 is opened, the timer operation is performed in step 103*an*, and thereafter, an abnormal signal is output in step 103*ao*, thus ending this mode.

In step 103*aa*, the motor 6*b* is rotated in the reverse (counterclockwise) direction to move the loaded pallet elevator 2*a* upward so as to separate the loaded pallet 31. In step 103*ab*, when no loaded pallet is detected by the loaded pallet upper end sensor 20 during the upward movement of the loaded pallet elevator 2*a*, or when the loaded pallet elevator 2*a* is abnormally moved upward, such a state is detected by the empty pallet lower end sensor 27. If the empty pallet lower end sensor 27 is turned on, the motor is stopped in step 103*ap*. After the timer operation is performed in step 103*an*, an abnormal signal is output in step 103*ao*, thus ending this mode. In a normal state, the loaded pallet 31 is detected by the loaded pallet upper end sensor 20 before the empty pallet elevator 2*b* reaches the lower end position, and the loaded pallet upper end sensor 20 is turned on in step 103*ac*. Then, the flow advances to step 103*ae* to stop the motor.

In step 103*af*, the shutter 15 is closed. In this state, the loaded pallet 31 is set in a separable state. In step 103*ag*, the operation state of the shutter 15 is checked using the shutter open sensor 25. If the shutter 15 is left opened, the timer operation is performed in step 103*an*, and thereafter, an abnormal signal is output in step 103*ao*, thus ending this mode. If the shutter open sensor 25 detects that the shutter is closed, the flow advances to step 103*ah* to rotate the motor in the normal (clockwise) direction.

In step 103*ar*, the state of the loaded pallet lower end sensor 26 is checked so as to prevent the loaded pallet elevator 2*a* from being abnormally moved downward upon normal (clockwise) rotation of the motor. If the loaded pallet lower end sensor 26 is turned on, the motor is stopped in step 103*ap*, the timer operation is performed in step 103*an*, and thereafter, an abnormal signal is output in step 103*ao*, thus ending this mode.

If abnormal downward movement of the loaded pallet elevator 2*a* is not detected, the timer operation is performed in step 103*ai*, and the motor is stopped in step 103*aj*. In this state, the loaded pallet 31 is separated. In steps 103*ak* to 103*a*, the separated loaded pallet on the shutter is positioned as in steps 102*a* to 102*u* in the separation mode 102.

In step 103*am*, the operation timer, which started its operation in step 103*s*, is reset. However, if any abnormal state occurs from step 103*s* to step 103*am*, the pallet exchange operation is not completed, and the timer is not reset. For this reason, the count value of the operation timer is increased, and it is determined in step 103*v* that the count value is larger than the setting value. Thus, the flow advances from step 103*ap* to step 103*an* and then to step 103*ao*, and an abnormal signal is output, thus ending this mode.

In a normal state, the flow returns to step 103*b* and then advances up to step 103*j* to allow supply of works to the work supply robot. Also, the main body 1 waits for input of a push signal.

Thereafter, steps 103*b* to 103*am* are repetitively executed to have step 103*j* as the start step. Upon repetition of this operation, when no more loaded pallets are present on the loaded pallet elevator 2*a*, the elevator loaded pallet sensor 4*a* generates an output indicating no pallet in step 103*g*, and a run-short signal is output in step 103*h*. In response to this signal, an operator inserts new loaded pallets into the main body 1 so as to continuously operate the pallet supply apparatus.

[Insertion Executed When Loaded Pallets are Present in Main Body]

A method of inserting new loaded pallets in a state wherein the last loaded pallet 33 is present on the shutter 15 in the automatic mode program will be described below.

At this time, the last loaded pallet 33 is positioned on the shutter 15. In this case, an operator turns the selection switch 29*d* of the controller 28 from the position "automatic" to the position "insertion". In step 101*a*, the presence/absence of a loaded pallet on the shutter 15 is checked using the loaded pallet sensor 21. In the current state, since the loaded pallet 33 is present on the shutter 15 of the main body 1, and empty pallets are stacked on the empty pallet elevator 2*b*, the flow advances to step 101*c*, and an insertion busy signal is output. In step 101*d*, the empty pallets are manually removed. When the start switch 29*e* is depressed in this state, it is checked using the elevator empty pallet sensor 4*b* if empty pallets are completely removed from the empty pallet elevator 2*b* (step 101*f*). At this time, if an empty pallet still remains, the flow returns to step 101*e*. This is to prevent damage to the main body 1 due to an operator's error occurring when an operator forgets to remove empty pallets in step 101*d*. If all empty pallets are removed, the flow advances to step 101*g*.

In step 101*g*, the level position of the loaded pallet elevator 2*a* is checked. If the loaded pallet elevator 2*a* is located at the lower end position, i.e., when the loaded pallet lower end sensor 26 is ON, the motor 6*b* is not rotated, and the flow advances to step 101*j*. However, when the loaded pallet elevator 2*a* is not located at the lower end position, the motor 6*b* is rotated in the normal direction to move the loaded pallet elevator 2*a* downward until the loaded pallet lower end sensor 26 is turned on. At this time, the empty pallet elevator 2*b* is moved upward to the upper end position.

In step 101*j*, manually stacked loaded pallets 34 to 37 are inserted (this state is shown in FIG. 8E).

An operator then turns the selection switch 29*d* of the controller 28 from the position "insertion" to the position "automatic" to select the automatic mode 103. In step 103*a*, the control waits for manual depression of the start switch 29*e* so as to confirm the start of the operation. When the start switch 29*e* is depressed, the flow advances to step 103*b* to check using the loaded pallet sensor 21 if the loaded pallet 33 is set on the shutter 15. In the current state, since the loaded pallet 33 is present on the shutter, the flow advances to step 103*c*.

Figure 8F:
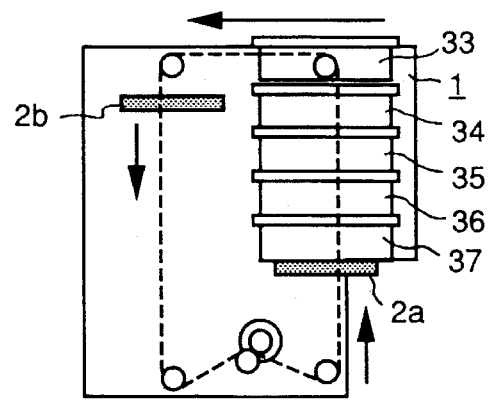

In step 103*c*, it is checked using the loaded pallet lower end sensor 26 if the loaded pallet elevator 2*a* is present at the lower end position. Since new pallets are inserted in a state wherein the loaded pallet 33 is present in the main body 1, and the loaded pallet elevator 2*a* which carries the loaded pallets 34 to 37 is located at the lower end position, the flow advances to step 103*d*. In step 103*d*, the empty pallet elevator 2*b* is moved downward by rotating the motor in the reverse (counterclockwise) direction. More specifically, immediately after the new pallets are inserted, since the loaded pallet elevator 2*a* is located at the lower end position, and hence, the empty pallet elevator 2*b* is located at the upper end position, if the loaded pallet 33 on the shutter is slid in this state, it interferes with the empty pallet elevator 2*b*. In order to prevent this, the empty pallet elevator 2*b* is moved downward (this state is shown in FIG. 8F).

In step 103*e*, the reverse (counterclockwise) rotation of the motor in step 103*d* is measured by the timer. After an elapse of a predetermined period of time, the motor is stopped in step 103*d*.

In step 103*g*, a normal signal is output based on the detection result of the elevator loaded pallet sensor 4*a*. In a normal state, the flow returns to step 103*b*, and then advances up to step 103*j* to allow supply of works to the work supply robot. In addition, the main body 1 waits for input of a push signal.

Thereafter, steps 103*b* to 103*am* are repetitively executed to have step 103*j* as the start step.

[Normal Rotation Mode Program]

Figure 13:
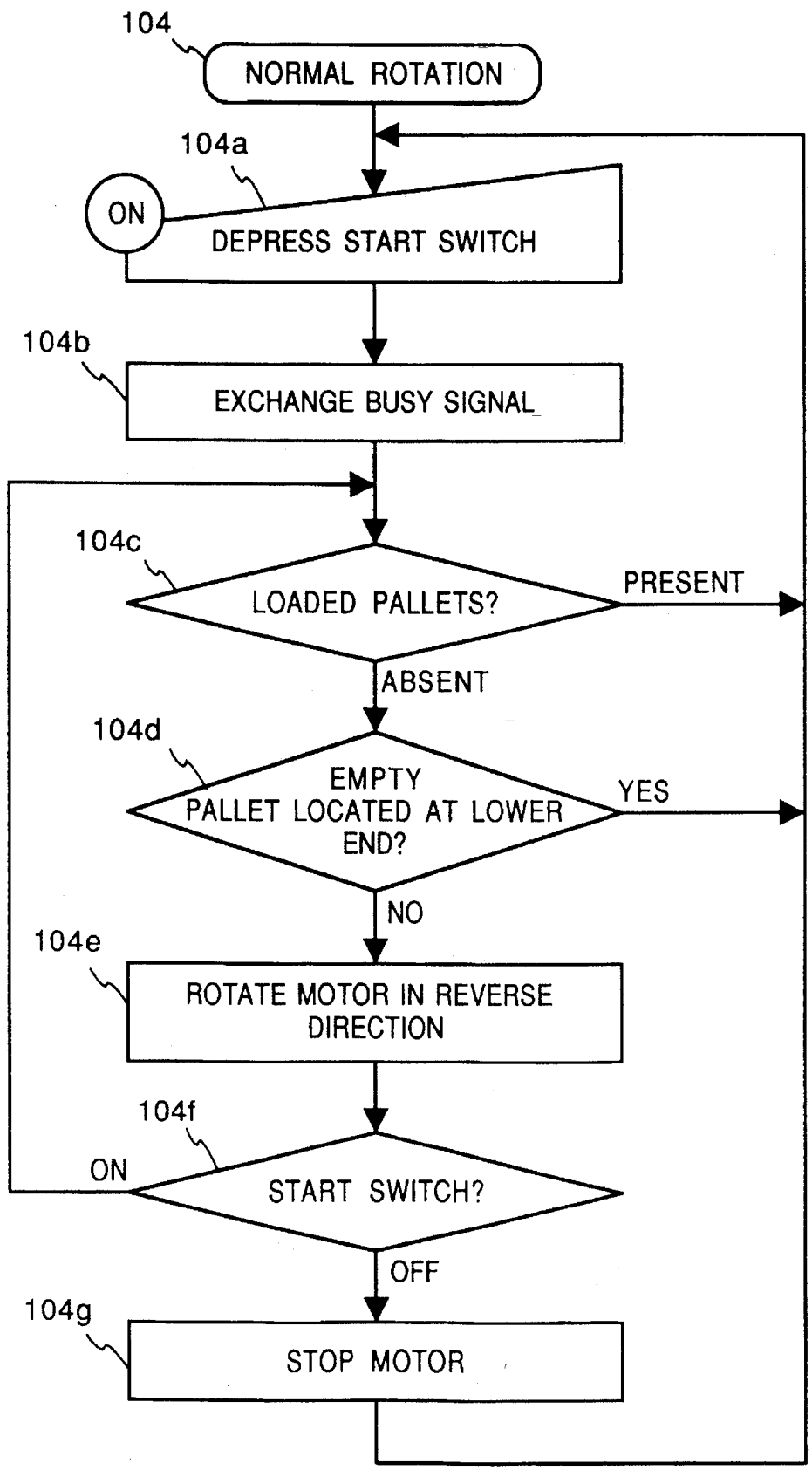
FIG. 13 is a flow chart for explaining control using a normal rotation mode program.

As shown in FIG. 13, the selection switch 29*d* of the controller 28 is turned to a position "normal rotation".

When the start switch 29*e* of the controller 28 is manually depressed in step 104*a*, an exchange busy signal is output in step 104*b*. If it is determined in step 104*c* that no loaded pallet is present on the-loaded pallet elevator 2*a* to be moved upward, and it is determined in step 104*d* that the empty pallet elevator 2*b* is not located at the lower end position, the motor 6*b* is rotated in the reverse (counterclockwise) direction. If it is determined in step 104*f* that the start switch 29*e* is depressed, the flow returns to step 104*c*, and the motor 6*b* is continuously rotated. If the start switch 29*e* is not depressed, the flow advances to step 104*g* to stop the motor.

[Reverse Rotation Mode Program]

Figure 14:
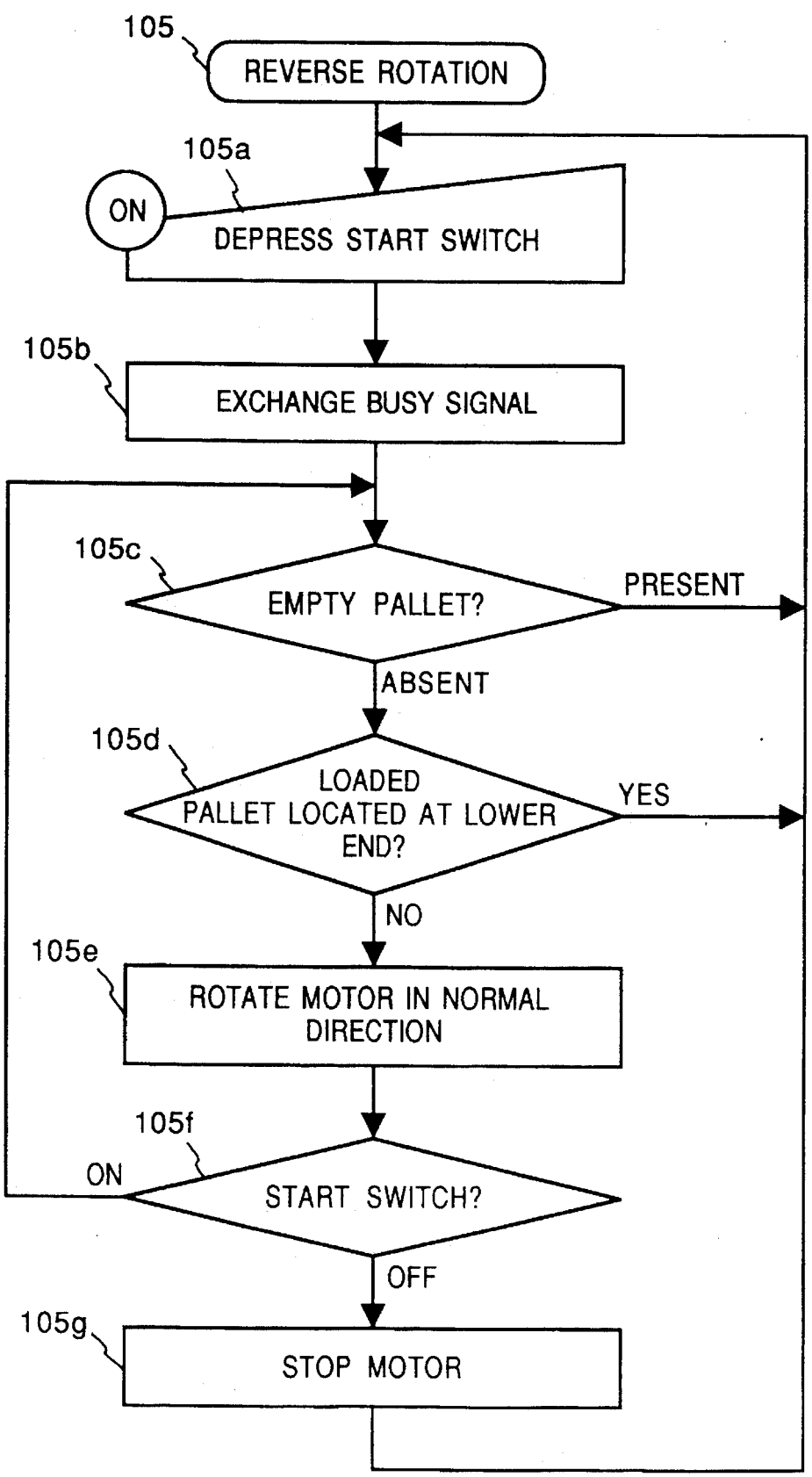
FIG. 14 is a flow chart for explaining control using a reverse rotation mode program.

As shown in FIG. 14, the selection switch 29*d* of the controller 28 is turned to a position "reverse rotation".

When the start switch 29*e* of the controller 28 is manually depressed in step 105*a*, an exchange busy signal is output in step 105*b*. If it is determined in step 105*c* that no empty pallet is present on the empty pallet elevator 2*b* to be moved upward, and it is determined in step 105*d* that the loaded pallet elevator 2*a* is not located at the lower end position, the motor 6*b* is rotated in the normal (clockwise) direction. If it is determined in step 105*f* that the start switch 29*e* is depressed, the flow returns to step 105*c*, and the motor 6*b* is continuously rotated. If the start switch 29*e* is not depressed, the flow advances to step 105*g* to stop the motor.

As described above, according to the first embodiment, a pallet conveyed to the predetermined position in the pallet supply apparatus can be quickly positioned. Since a pallet can be quickly moved away from the reference surfaces after the first and second pushing forces are released, a time required for releasing the positioning state of the pallet can be shortened. As a result, the wait time of the work supply robot can be shortened, and automatic assembling or processing efficiency can be improved. This leads to a decrease in manufacturing cost.

Since new pallets can be inserted while a pallet remains on the upper end of the main body, the work supply robot need not wait during insertion of pallets. As a result, the automatic assembling or processing efficiency can be further improved.

(Second Embodiment)

The reference numerals of the drawings in the second embodiment may denote different parts from those in the first embodiment even if they are the same as those in the first embodiment.

Figure 15:
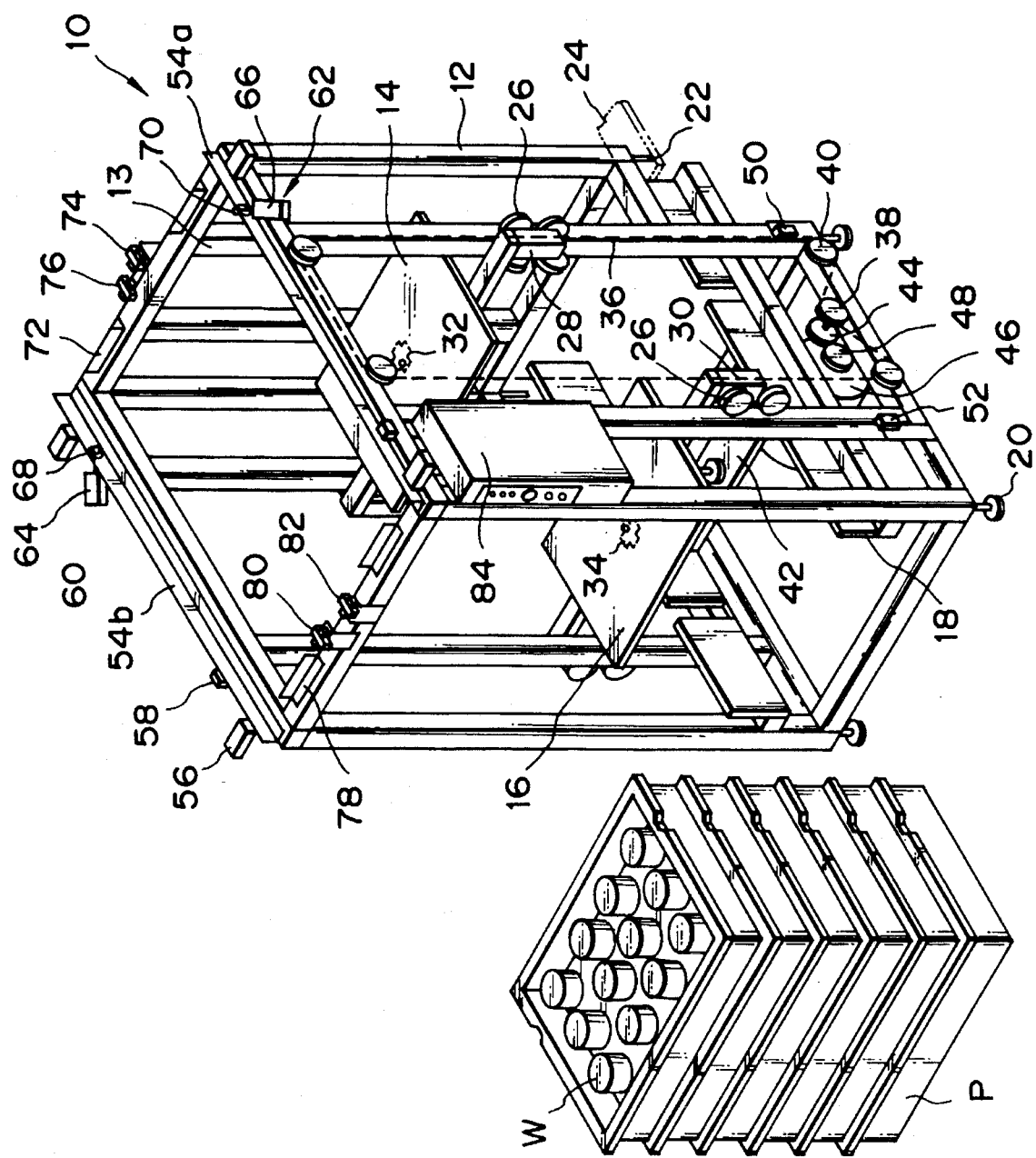
FIG. 15 is a perspective view showing the structure of a pallet supply apparatus to which a control method according to the present invention is applied.

FIG. 15 is a perspective view showing an outer appearance of a structure of a pallet supply apparatus to which a control method according to the present invention is applied.

In FIG. 15, a pallet supply apparatus 10 has a supply apparatus main body 12 fixed on the floor surface of, e.g., a factory, and first and second elevators (to be referred to as EVs hereinafter) 14 and 16 which are vertically moved with respect to the supply apparatus main body 12. On the first EV 14, a stack of a plurality of pallets P each of which stores assembling works to be assembled or non-processed works to be processed are placed. The first EV 14 supplies the uppermost pallet P to an access position located at the upper end of the supply apparatus main body 12 by its vertical movement. A robot arranged in a processing system or an assembling system picks up works from the pallet P supplied to the access position, and performs predetermined processing or assembling.

On the other hand, the second EV 16 detaches an empty pallet P' from which all works have been picked up from the position at the upper end of the supply apparatus main body by its vertical movement, and stocks the detached pallet.

As described above, a stack of one or more pallets P are placed on the first EV 14, and each pallet P stores assembling works or non-processed works W. A pallet which stores works W will be referred to as a loaded pallet P hereinafter, and a pallet which stores no works W will be referred to as an empty pallet P' hereinafter. Stacked pallets P are manually inserted onto the first EV 14 while being placed on a pallet guide plate 18 of the supply apparatus main body 12. The inserted loaded pallets P are pushed up to the access position located at the upper end portion of the supply apparatus main body 12 in turn from the uppermost one, thus allowing an access by a robot in the processing or assembling system.

[Arrangement of Supply Apparatus Main Body 12]

The supply apparatus main body 12 is placed on the floor surface of, e.g., a factory via level adjusters 20, and is fixed to a bracket 25 projecting from a frame of the processing or assembling system (not shown) by a supply apparatus fixing bolt 22.

The second EV 16 for placing empty pallets P' and the first EV 14 for placing stacked loaded pallets P are respectively arranged at the right and left sides of the supply apparatus main body 12. EV guides 28 and 30 attached with EV guide rollers 26 for vertically moving the EVs are respectively provided to the EVs 14 and 16. A loaded pallet sensor 32 for detecting the presence/absence of loaded pallets P is arranged on the first EV 14, and an empty pallet sensor 34 for detecting the presence/absence of empty pallets P' is arranged on the second EV 16.

An endless chain 36 is partially engaged with the EV guide 28 of the first EV 14 and the EV guide 30 of the second EV 16, and the first and second EVs 14 and 16 are held by the supply apparatus main body 12 to be suspended from the chain 36. The chain 36 is looped around a driving sprocket 38 for pivoting the chain 36, and a plurality of idler sprockets 40. The driving sprockets 38 are attached to two side surfaces of the supply apparatus main body 12, and are synchronously rotated by a rotation shaft 42 attached with an intermediate gear 44. The intermediate gear 44 is meshed with a driving gear 48 fixed to a shaft of a motor 46. Therefore, the driving sprockets 38 are rotated by the motor 46, and when the motor 46 is rotated in the normal or reverse direction, the first and second EVs 14 and 16 are vertically moved in a seesaw manner.

The supply apparatus main body 12 has lower end sensors 50 and 52 for respectively detecting the lower end positions of the first and second EVs 14 and 16.

Shutters 54*a* and 54*b* for locking a pallet P or releasing the locked pallet P are arranged on the upper surface of the supply apparatus main body 12, and are opened/closed by an air cylinder 56. An opening/closing sensor 58 for detecting the opening/closing state of these shutters is arranged at a position near the shutters 54*a* and 54*b*, and is used for checking the opening/closing operation of the shutters 54*a* and 54*b*. A left positioning unit 60 and a right positioning unit 62 for positioning a pallet P are arranged on the shutters 54*a* and 54*b*. These positioning units 60 and 62 are constituted by adding positioning rollers 68 and 70 to cylinders 64 and 66, respectively. A pallet P is positioned in such a manner that its reference surfaces are urged against an abutting angle 72 and the reference-side shutter 54a by the two positioning units 60 and 62.

A loaded pallet upper end sensor 74 for detecting a pallet P which is moved upward upon upward movement of the first EV 14 and a loaded pallet sensor 76 for detecting the presence/absence of a loaded pallet on the shutters 54a and 54b are arranged on the upper surface of the supply apparatus main body 12.

A stopper angle 78 serving as a stopper used when an empty pallet P' is slid from a position above the first EV 14 to a position above the second EV 16 is arranged at a position opposing the abutting angle 72, and an empty pallet upper end sensor 80 and an empty pallet sensor 82 for detecting an empty pallet on the shutters are arranged aside the stopper angle 78. A controller 84 for controlling the operation of the entire supply apparatus 10 is arranged on one side surface of the supply apparatus main body 12.

[Controller 84]

Figure 16:
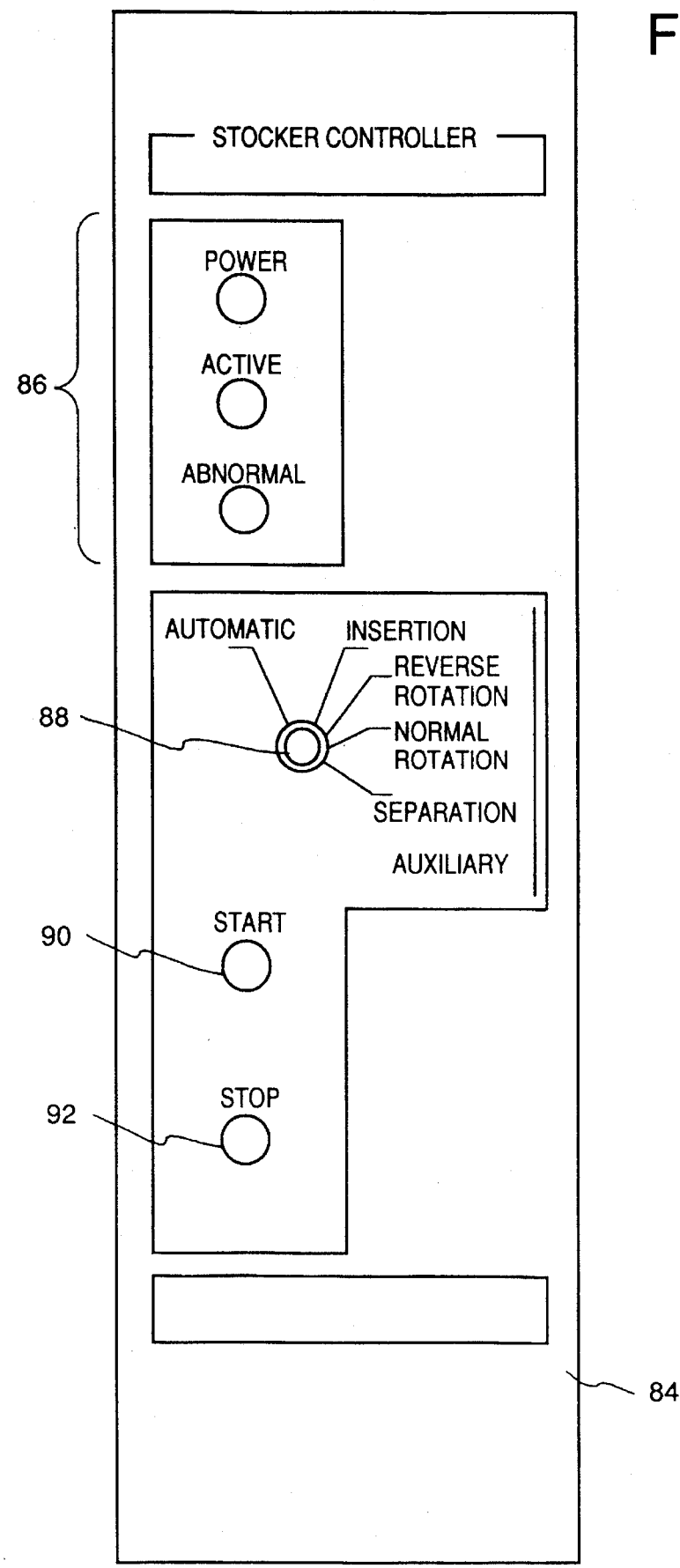
FIG. 16 is a front view showing an arrangement of a console panel arranged on the front surface of the controller.

FIG. 16 is a front view showing an arrangement of an operation console arranged on the front surface of the controller 84.

Indication lamps 86 indicating the operation state of the supply apparatus 10 include three kinds of lamps, i.e., a power lamp indicating a power supply state, an active lamp indicating an access enable state to a robot, and an abnormal indication lamp indicating an abnormal state. A mode selection switch 88 for selecting an operation to be executed by the supply apparatus 10 is arranged below the indication lamps 86, and has five modes, i.e., automatic, insertion, normal rotation, reverse rotation, and separation modes, as will be described in detail later. A start push switch 90 for starting a selected operation mode and a stop push button 92 for interrupting an operation are further arranged on the operation console.

Figure 17:
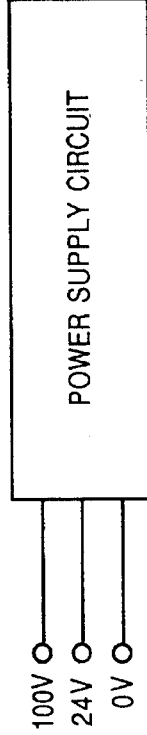
FIG. 17 is a block diagram showing a circuit arrangement of the controller.

FIG. 17 is a block diagram showing a circuit arrangement of the controller. A power supply 94 supplies a power supply voltage of 100 V for driving the motor, and a power supply voltage of 24 V for driving a sequencer 98 and the sensors.

The sequencer 98 has 17 input (IN) terminals and 14 output (OUT) terminals for operating the supply apparatus 10. At the IN side, input terminals for receiving signals from the sensors (32, 34, 74, 76, 80, 82, 58, 50, 52) for detecting the operation state of the supply apparatus 10, input terminals for receiving signals from operation switches (88, 90, 92), and an input terminal for receiving an externally input push end signal for allowing an access from a robot are arranged.

At the OUT side, output terminals connected to a relay for rotating the motor 46 in the normal/reverse direction, a relay of a solenoid valve for opening/closing the shutters 54a and 54b, a relay of a solenoid valve for driving the cylinder of the left positioning unit 60, and a relay of a solenoid valve for driving the cylinder of the right positioning unit 62, output terminals connected to the operation indication lamps 86, and output terminals used for informing the state of the supply apparatus 10 to, e.g., a robot are arranged.

FIGS. 18A to 26 are views for explaining the operation of the supply apparatus 10.

A description will be started from a state immediately after the power switch of the supply apparatus 10 is turned on, i.e., a state wherein neither loaded pallets P nor empty pallets P' are present on the first and second EVs 14 and 16.

[Insertion Mode ... When no Pallets P are present in Supply Apparatus 10]

Figure 21:
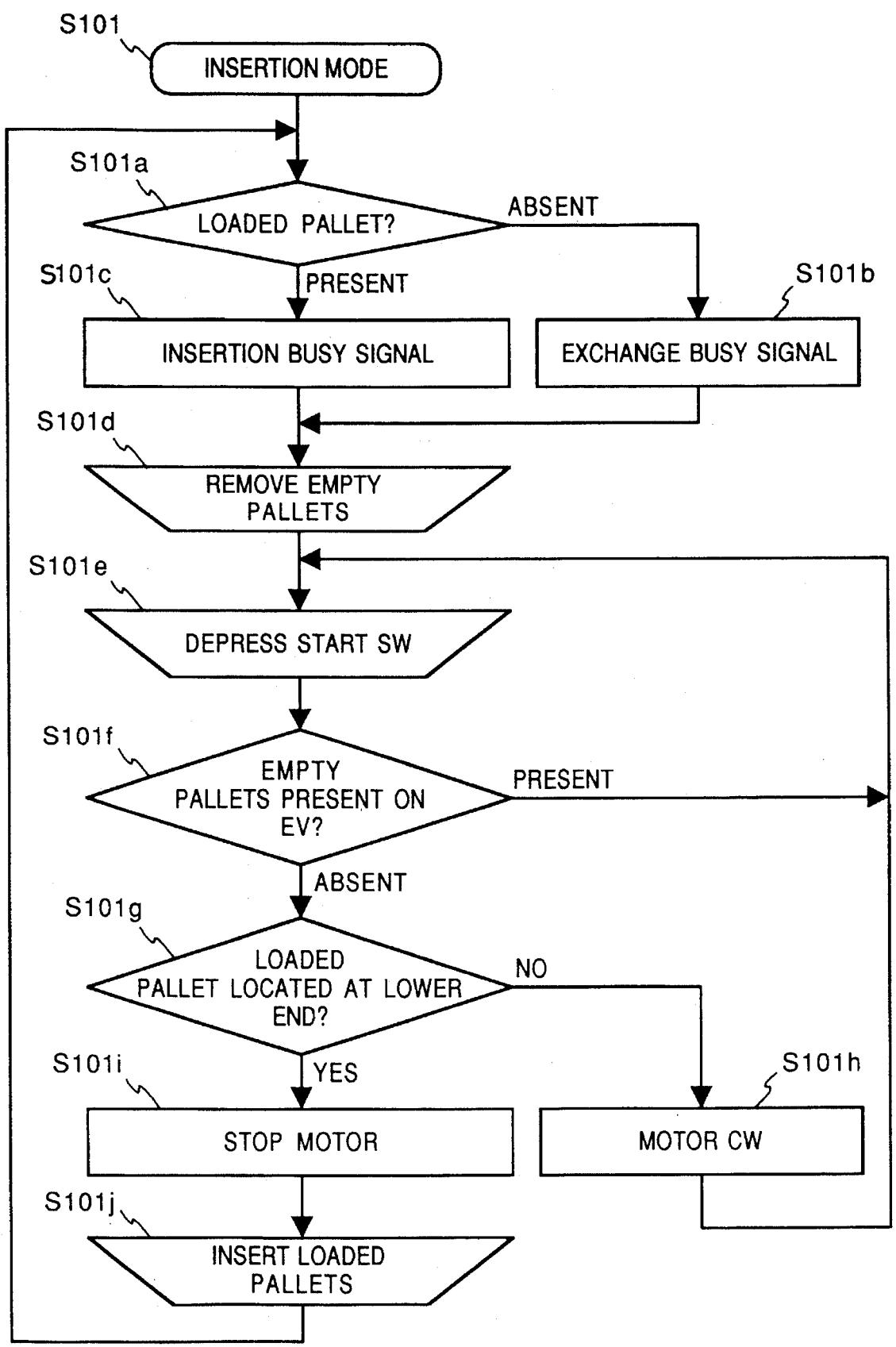
FIG. 21 is a flow chart showing an operation of the pallet supply apparatus in an insertion mode.
Figure 22:
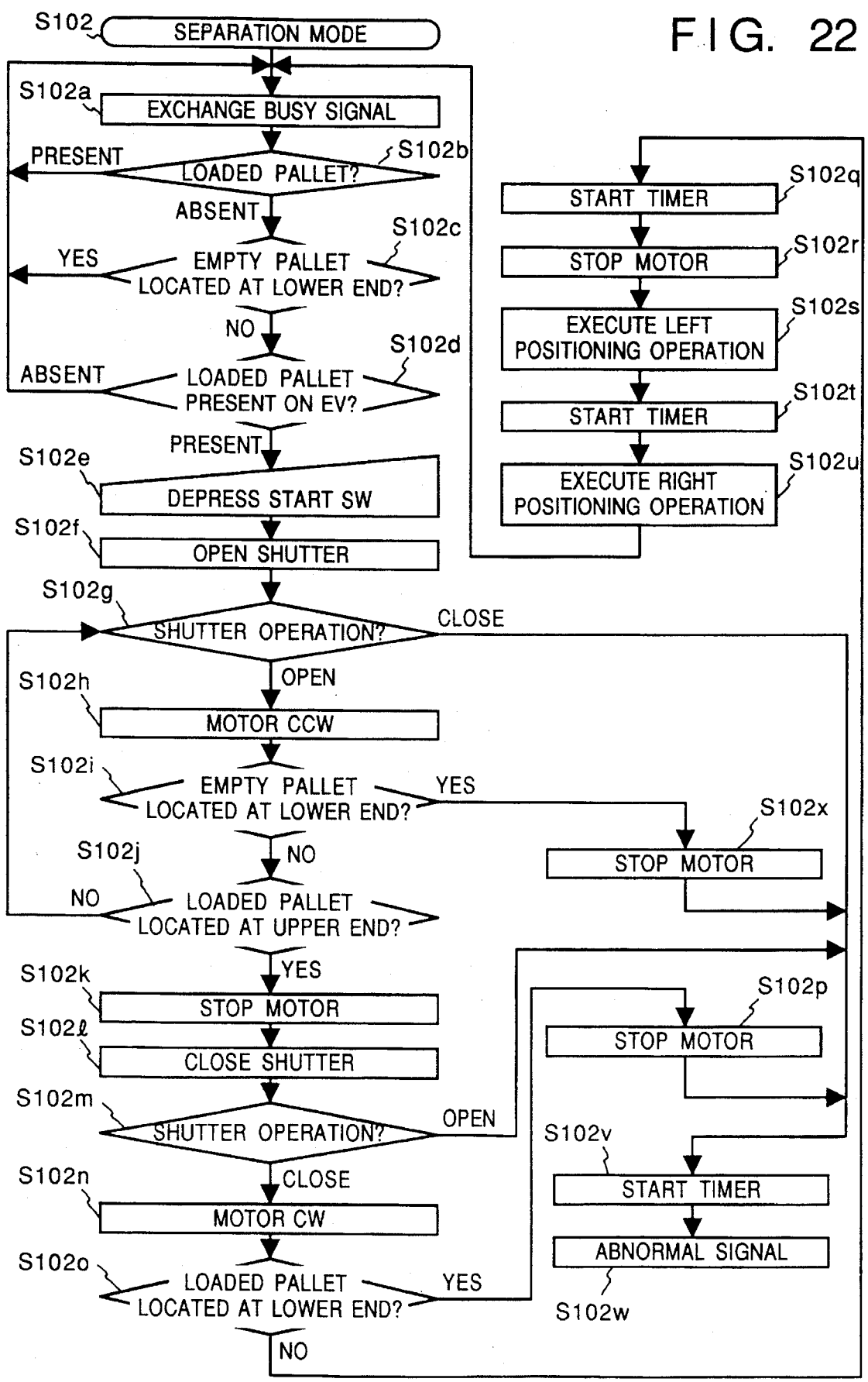
FIG. 22 is a flow chart showing an operation of the pallet supply apparatus in a separation mode.
Figure 23:
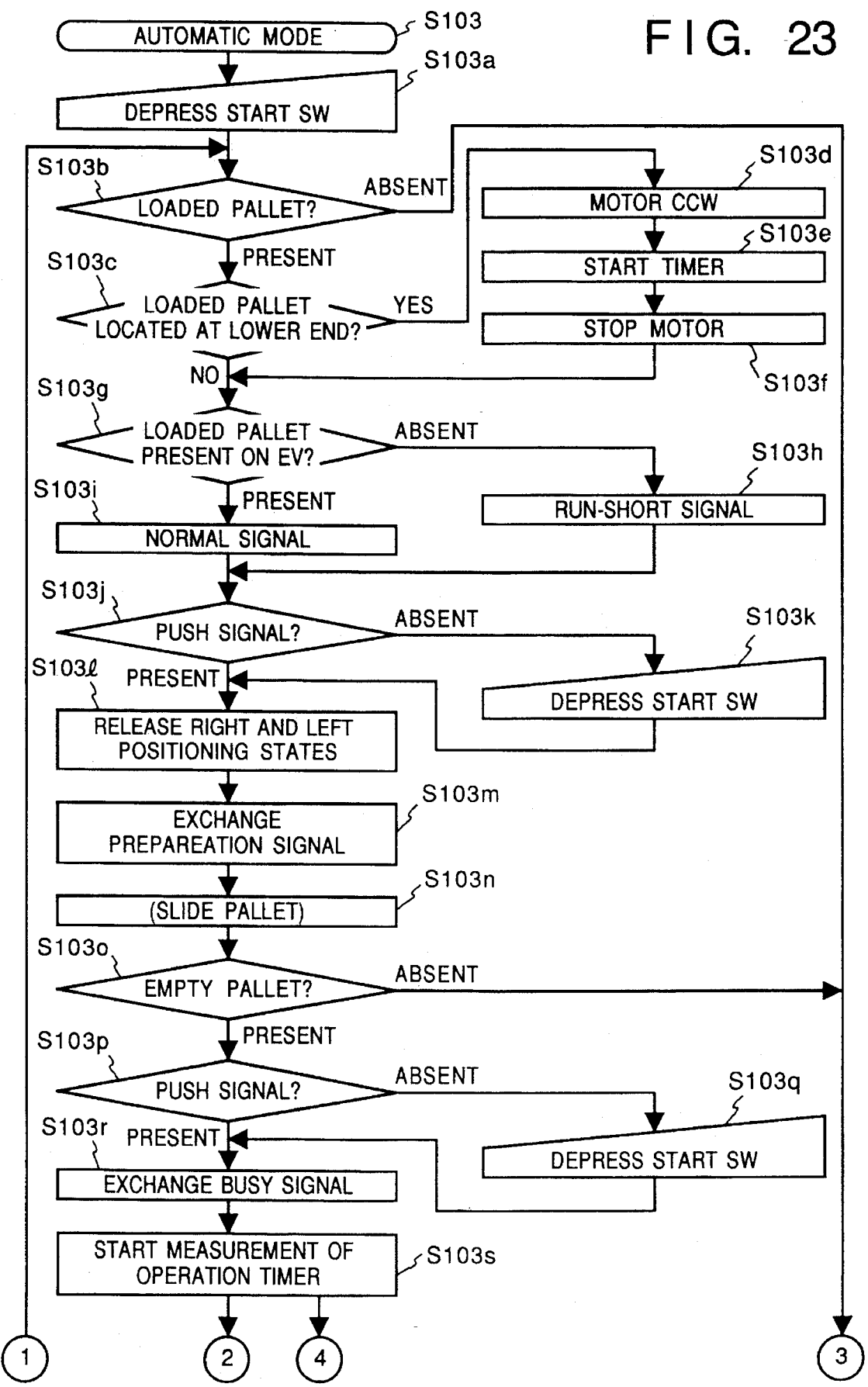
FIG. 23 is a flow chart showing an operation of the pallet supply apparatus in an automatic mode.
Figure 24:
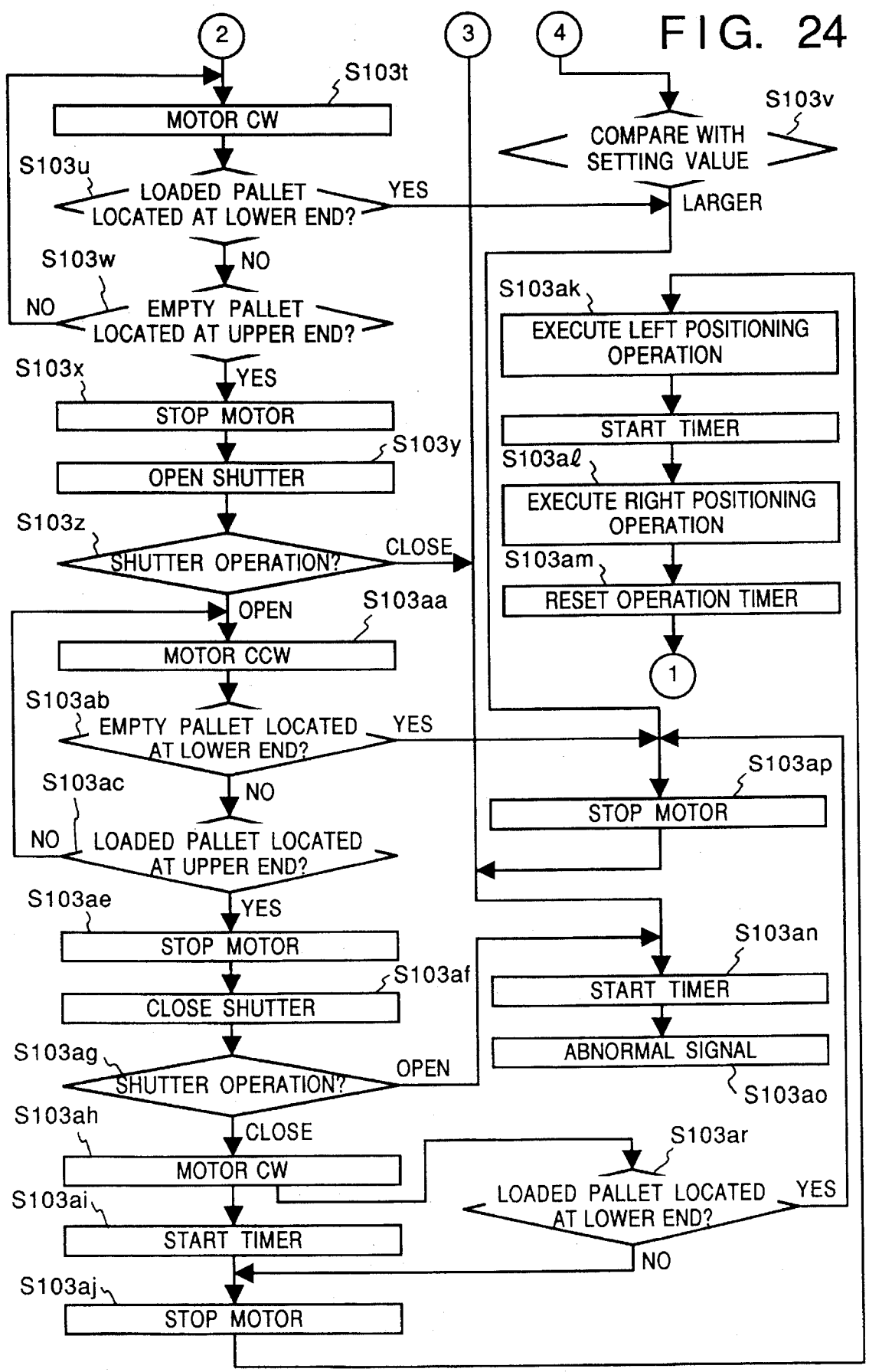
FIG. 24 is a flow chart showing an operation of the pallet supply apparatus in the automatic mode.
Figure 25:
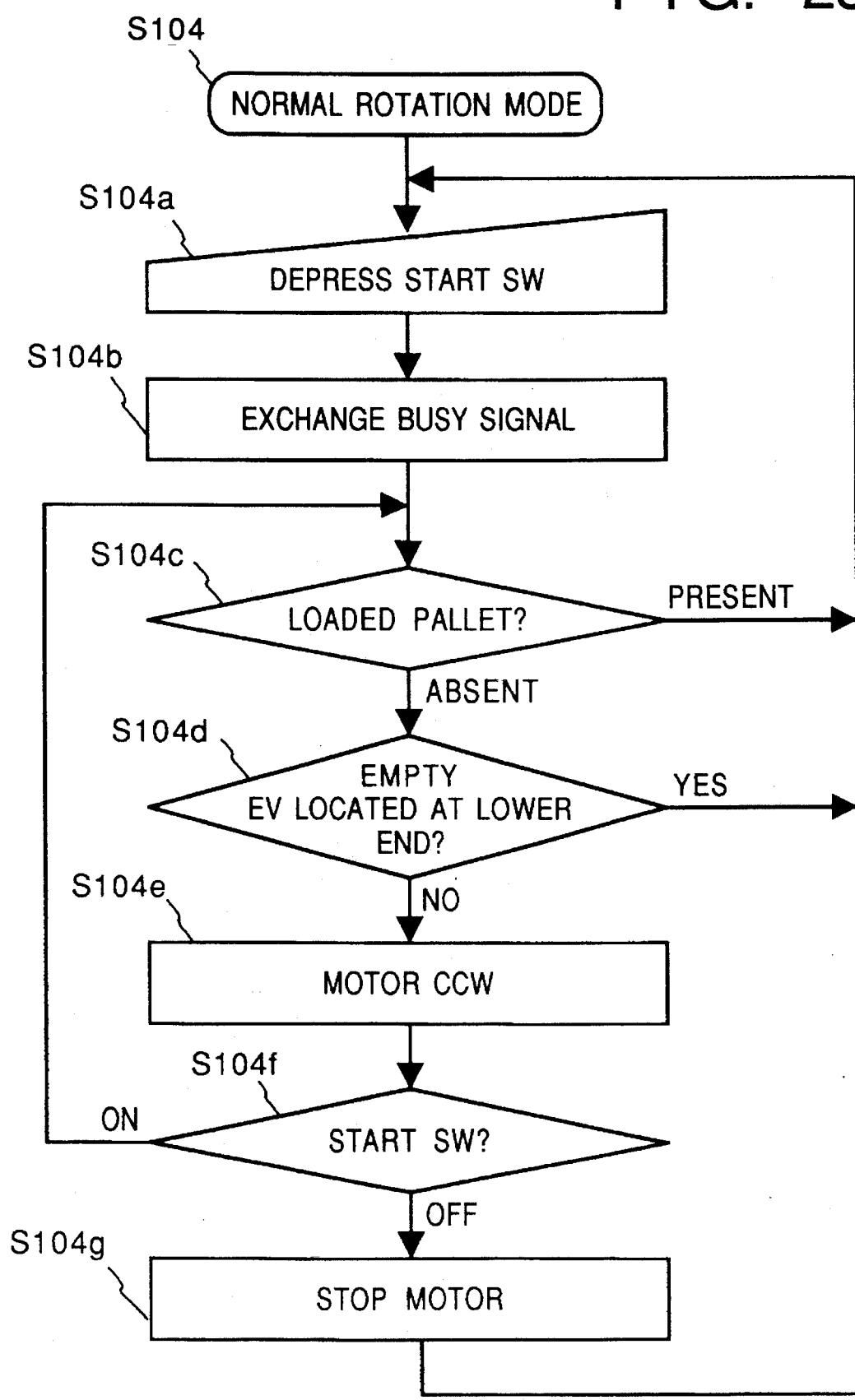
FIG. 25 is a flow chart showing an operation of the pallet supply apparatus in a normal rotation mode.
Figure 26:
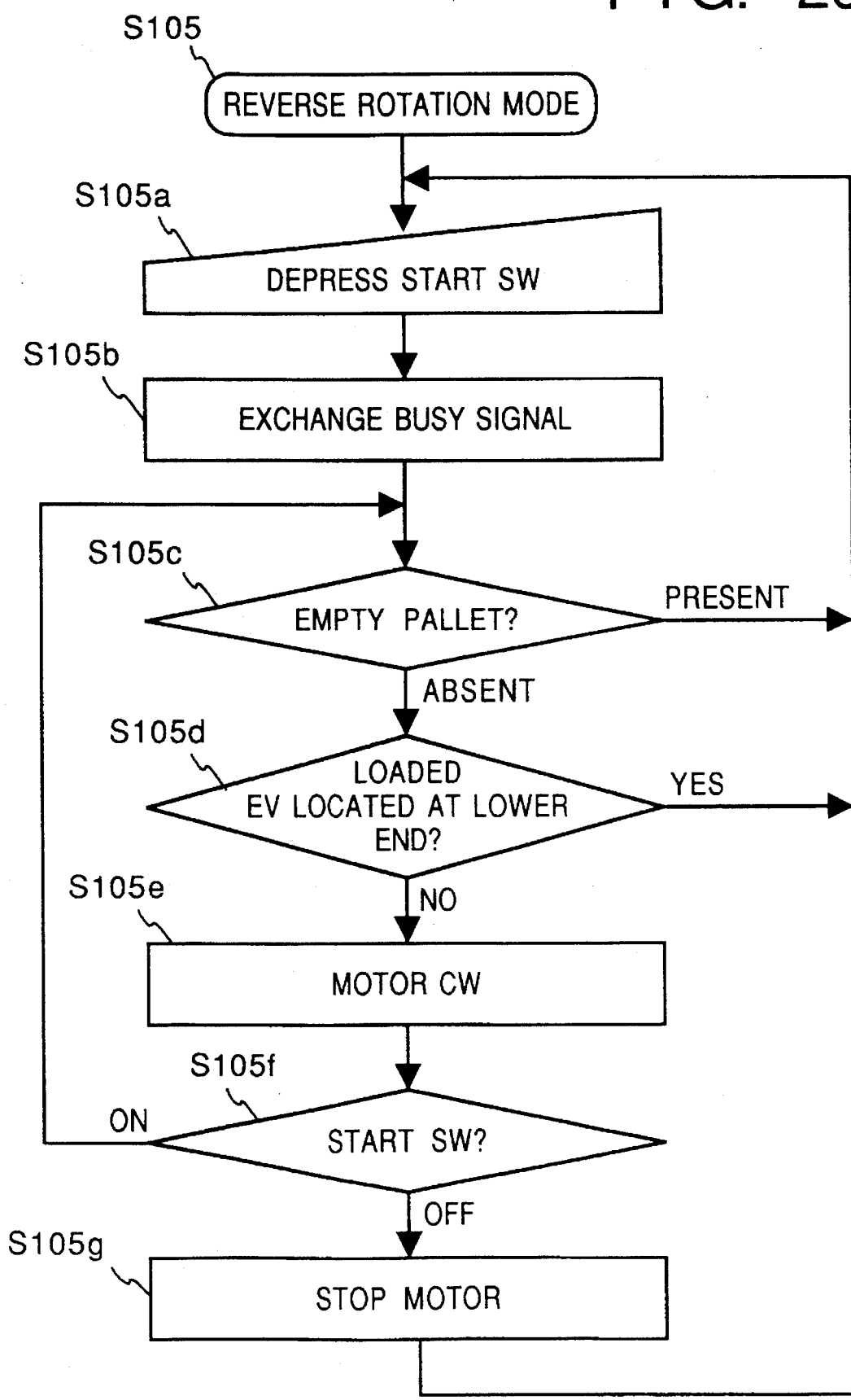
FIG. 26 is a flow chart showing an operation of the pallet supply apparatus in a reverse rotation mode.

First, in order to insert stacked pallets P storing works W shown in FIG. 15 into the supply apparatus 10, the insertion mode is selected in step S101 in FIG. 21. More specifically, the mode selection switch 88 of the controller 84 is turned to a position "insertion". It is checked using the loaded pallet sensor 76 in step S101a if a pallet P is present on the shutters 54a and 54b.

In the current stated since no pallet P is present in the supply apparatus 10, the flow advances to step S101b to output an exchange busy signal. In step S101d, an empty pallet is removed. However, in this case, since no pallet P is present in the supply apparatus 10, and the flow advances to step S101e to wait until the start push switch 90 is depressed.

If the start push switch 90 is depressed in step S101e, the flow advances to step S101f to check using the empty pallet sensor 34 if an empty pallet P' is placed on the second EV 16. If an empty pallet P' is placed on the second EV 16, the flow returns to step S101e. This is to prevent damage to the supply apparatus main body 12 occurring when an operator forgets to remove the empty pallet P' in step S101d, and the control advances to the next step in such a state.

Since no pallet is currently present in the supply apparatus 10, the flow advances to step S101g. In step S101g, the level position of the first EV 14 is checked. If the first EV 14 is located at the lower end position, i.e., when the lower end sensor 50 is ON, since the first EV 14 is ready to receive stacked pallets P, the motor 46 is not rotated, and the flow advances to step S101j. However, if it is determined in step S101g that the first EV 14 is not located at the lower end position, the motor 46 is rotated in the CW (clockwise) direction to move the first EV 14 downward until the lower end sensor 50 is turned on. In step S101i, the motor 46 is stopped. At this time, the second EV 16 is moved upward to the upper end position.

Figure 18A:
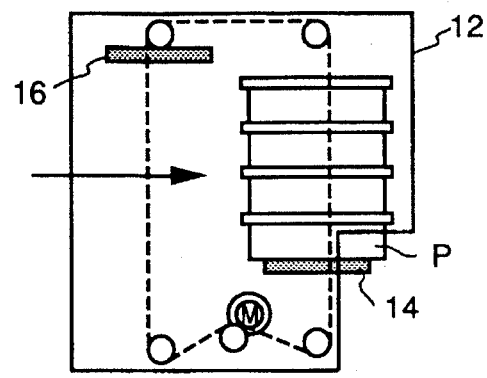
FIGS. 18A to 18C are views for explaining a pallet replenishing operation of the pallet supply apparatus.
Figure 18B:
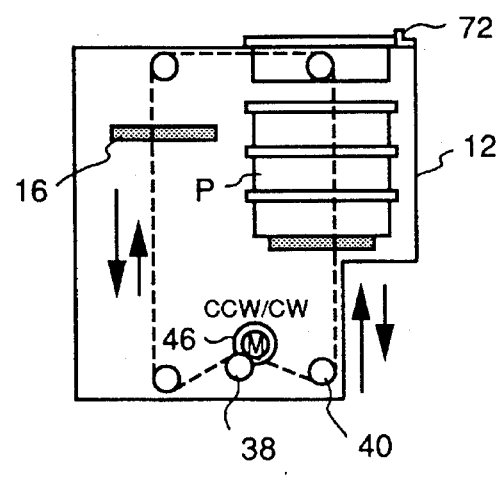

In step S101j, stacked loaded pallets P are manually inserted from the direction of an arrow in FIG. 18A. More specifically, an operator places stacked pallets P on the pallet guide plate 18, and pushes them to a position on the first EV 14. At this time, when the stacked loaded pallets P abut against a frame 13, the insertion operation of the loaded pallets P is completed. Thus, the insertion mode is ended.

[Separation Mode]

This mode is executed when no pallet is present on the shutters 54a and 54b. In step S102 in FIG. 22, the separation mode is selected. More specifically, the mode selection switch 88 of the controller 84 is turned to a position "separation". In step S102a, an exchange busy signal is output, and the flow advances to step S102b. In step S102b, it is checked using the loaded pallet sensor 76 if a loaded pallet P is present on the shutters 54a and 54b. This is to prevent a loaded pallet present on the shutters 54a and 54b from being dropped when the shutters 54a and 54b are opened to execute the separation operation of a loaded pallet P (that is, a pallet P must not be present on the shutters 54a and 54b upon execution of the separation operation). In the current state, since the pallets P are placed on only the first EV 14, and no pallet P is present on the shutters 54a and 54b, the flow advances to step S102c.

In step S102c, the level position of the first EV 14 is checked. More specifically, it is checked whether or not the second EV 16 is located at the lower end position, and the first EV 14 is located at the upper end position. If the first EV 14 is located at the upper end position, i.e., if the lower end sensor 52 at the side of the second EV 16 is ON, since this means that there is no pallet P to be separated on the first EV 14, the motor 46 is not rotated, and the flow returns to step S102a. In the current state, since the first EV 14 is located at the lower end position, the flow advances to step S102d. In step S102d, it is checked using the loaded pallet sensor 32 if loaded pallets P are placed on the first EV 14. If no loaded pallet P is placed on the first EV 14, the flow returns to step S102*a*. In the current state, since the stacked pallets P are inserted on the first EV 14 by the insertion operation, the flow advances to step S102*e*. In step S102*e*, the start push switch 90 is manually depressed to start the separation operation.

In step S102*f*, the shutters 54*a* and 54*b* are opened, and the stacked loaded pallets P can be moved upward via a gap between the shutters 54*a* and 54*b*. In step S102*g*, it is checked using the shutter opening/closing sensor 58 if the shutters 54*a* and 54*b* are opened. Simultaneously with step S102*g*, a timer starts its operation in step S102*v*. When a signal from the shutter opening/closing sensor 58 is not detected in several seconds, an abnormal signal is output in step S102*w*, and the operation of the supply apparatus 10 is ended in this step.

In a normal state, the shutters 54*a* and 54*b* are opened, and the flow advances to step S102*h*.

In step S102*h*, the motor 46 is rotated in the CCW (counterclockwise) direction, and the first EV 14 is moved upward. The upward movement of the first EV 14 is stopped when the loaded pallet upper end sensor 74 detects a loaded pallet P. However, when no loaded pallet P is present on the first EV 14, or when the loaded pallet upper end sensor 74 malfunctions, a signal from the loaded pallet upper end sensor 74 cannot be obtained, and the first EV 14 may abnormally move upward. In order to prevent abnormal upward movement of the first EV 14, the position of the second EV 16, which is moved downward upon upward movement of the first EV 14, is detected by the lower end sensor 52 in step S102*i*, thereby preventing further downward movement of the second EV 16 (i.e., abnormal upward movement of the first EV 14). When the lower end sensor 52 is turned on, the motor 46 is stopped in step S102*x*, and the timer is started in step S102*v*. Thereafter, an abnormal signal is output in step S102*w*, thus ending this mode.

In a normal state since the uppermost pallet of the stacked pallets P reaches the position of the loaded pallet upper end sensor 74 before the second EV 16 reaches the lower end position, and the loaded pallet upper end sensor 74 is turned on in step S102*j*, the flow advances to step S102*k* to stop the motor.

In step S102 , the shutters 54*a* and 54*b* are closed. In this state, the uppermost pallet P is set in a separable state. In step S102*m*, the operation state of the shutters 54*a* and 54*b* is checked by the shutter opening/closing sensor 58. When the shutters 54*a* and 54*b* are left opened, the timer is started in step S102*v*, and thereafter, an abnormal signal is output in step S102*w*, thus ending this mode. On the other hand, if the shutter opening/closing sensor 58 detects that the shutters 54*a* and 54*b* are closed, the flow advances to step 102*n* to rotate the motor 46 in the CW (clockwise) direction.

In step S102*o*, the state of the lower end sensor 50 is checked to prevent the first EV 14 from abnormally moving downward upon CW (clockwise) rotation of the motor 46 when pallets exceeding a predetermined number are inserted in the supply apparatus 10. If the lower end sensor 50 is turned on in step S102*o*, the motor 46 is stopped in step S102*p*, the timer is started in step S102*v*, and thereafter, an abnormal signal is output in step S102*w*, thus ending this mode.

When a predetermined number of pallets or less are normally inserted, the timer is started in step S102*p*, and thereafter, the motor 46 is stopped in step S102*r*. Thus, the uppermost loaded pallet P is separated.

Figure 20A:
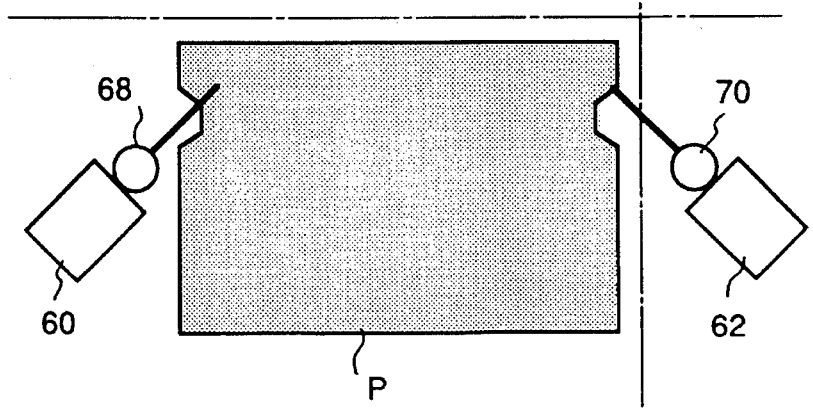
FIGS. 20A to 20C are views for explaining a positioning operation of a loaded pallet.

The positioning operation of the pallet P is then performed. The separated state of the uppermost pallet P is shown in FIG. 20A.

Figure 20B:
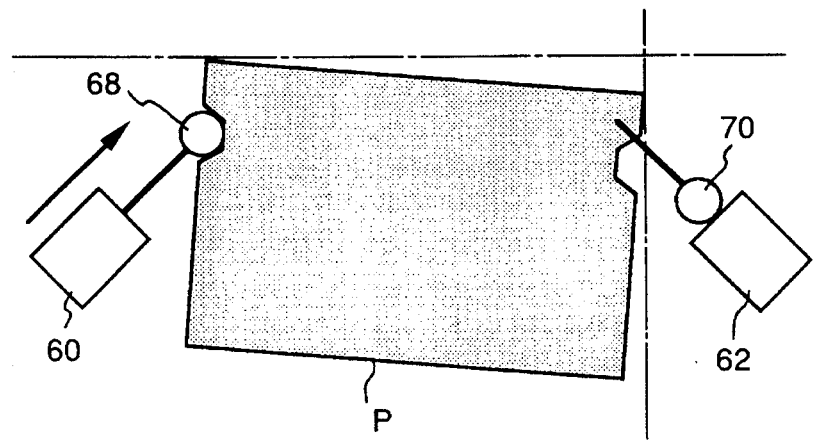

In step S102*s*, the left positioning operation of the pallet P is performed. As shown in FIG. 20B, when the cylinder of the left positioning unit 60 is pushed out, the pallet P on the shutters 54*a* and 54*b* is pushed by the positioning roller 68 attached to the distal end of the cylinder while being pivoted clockwise, and is brought into local contact with the abutting surfaces of the abutting angle 72 and the shutter 54*a*.

Figure 20C:
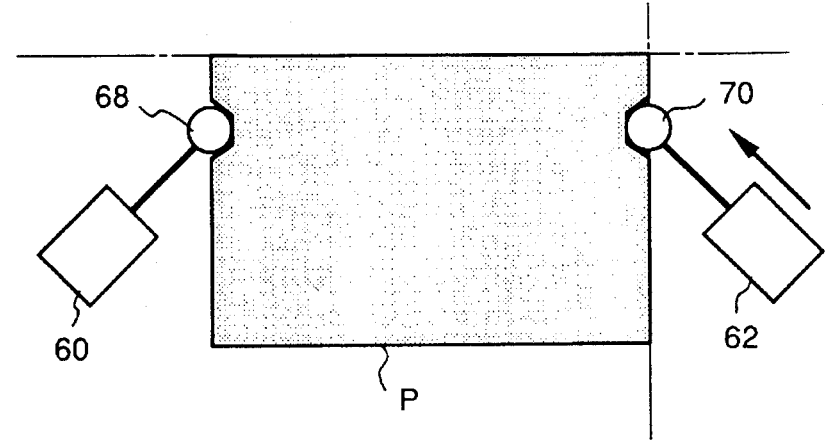

In step S102*u*, a setting operation by the right positioning unit 62 is executed. As shown in FIG. 20C, when the cylinder of the right positioning unit 62 is pushed out, the pallet P on the shutters 54*a* and 54*b* is pushed by the positioning roller 70 attached to the distal end of the cylinder while being pivoted counterclockwise, and is brought into perfect contact with the abutting surfaces of the abutting angle 72 and the shutter 54*a*, thus completing the positioning operation of the pallet P. Thus, this mode is ended (a state shown in FIG. 18B).

[Automatic Mode]

In this mode, the supply apparatus 10 makes an access to a robot. In step S103, the automatic mode is selected. More specifically, the mode selection switch 88 of the controller 84 is turned to a position "automatic". In step S103*a*, the control waits for manual depression of the start push switch 90 so as to confirm the start of the operation. When the start push switch 90 is depressed, the flow advances to step S103*b* to check using the loaded pallet sensor 76 if a loaded pallet P is set on the shutters 54*a* and 54*b*. If no loaded pallet P is set, the timer is started in step S103*an*, and thereafter, an abnormal signal is output in step S103*ao*, thus ending this mode. In the current state, since a pallet P is separated and positioned in the above-mentioned separation mode, it is determined in step S103*b* that a loaded pallet P is set, and the flow advances to step S103*c*. In step S103*c*, it is detected using the lower end sensor 50 if the first EV 14 is located at the lower end position. In the current state, since the insertion and separation operations of the pallet P have been completed from a state wherein no pallet P was present in the supply apparatus 10, the first EV 14 is not located at the lower end position due to the separation operation of the uppermost pallet P, and the flow advances to step S103*g*.

If the first EV 14 is located at the lower end position, the flow advances to step S103*d* (steps S103*d*, S103*e*, and S103*f* will be described later in the paragraph of the insertion operation executed when a pallet P is present in the supply apparatus 10).

In step S103*g*, it is checked using the loaded pallet sensor 32 if a pallet P is present on the first EV 14. This is to urge an operator to insert pallets into the supply apparatus 10 after all pallets storing works W are separated from the first EV 14 upon repetition of accesses to the robot.

More specifically, if at least one pallet P is present on the first EV 14, the supply apparatus 10 outputs a normal signal in step S103*i*; if no pallet P is present on the first EV 14, the supply apparatus 10 outputs a run-short signal in step S103*h* to urge an operator to insert new pallets.

In the current state, since the insertion and separation operations of pallets have been completed, a normal signal is output in step S103*i*, and the flow advances to step S103*j*. In step S103*j*, the control waits for input of a push end signal. An access to the robot is made in this state. When works W are picked by, e.g., the robot from a pallet P, the robot counts the number of picked-up works W (the number of works in the pallet P is input in advance to the robot), and when the robot determines that the pallet P on the shutters 54*a* and 54*b* becomes empty, the robot supplies a push end signal to the supply apparatus 10 (the flow may be manually caused to advance to step S103 by depressing the start push switch 90 in step S103k). Upon reception of the push end signal, the supply apparatus 10 releases the positioning state of the right and left positioning units 62 and 60 in step S103, and outputs an exchange preparation signal in step S103m.

Figure 18C:
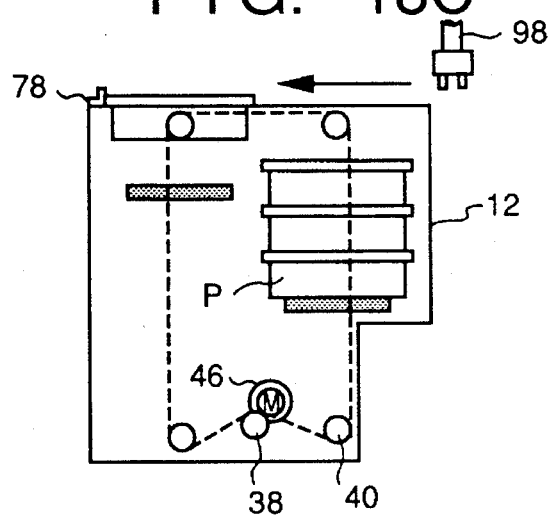

Upon reception of the exchange preparation signal, the robot confirms that the positioning state of the right and left positioning units 62 and 60 is released, and pushes the empty pallet P' on the shutters 54a and 54b until the empty pallet P' slid along the shutters 54a and 54b abuts against the stopper angle 78 above the second EV 16 (step S103n), as shown in FIG. 18C. This push operation may be performed by, e.g., a pusher in place of the robot.

In step S103o, it is checked using the empty pallet sensor 82 if the empty pallet P' on the shutters 54a and 54b, which is slidably pushed by, e.g., the robot, normally abuts against the stopper angle 78 so as to prevent a stacking error upon stacking of empty pallets P'. After the exchange preparation signal is output in step S103m, if the empty pallet sensor 82 does not detect the presence of an empty pallet P' even after the timer operation in step S103an is completed, it is considered that the stacking operation of the pallet P' may be unsuccessful, and an abnormal signal is output in step S103ao, thus ending this mode.

When the pallet P' on the shutters 54a and 54b is slidably pushed by, e.g., the robot, and the robot escapes from the operation area of the supply apparatus 10, the robot supplies another push end signal to the supply apparatus 10 (the flow may be manually caused to advance to step S103r by depressing the start push switch 90 in step S103q). Upon reception of the push end signal, the supply apparatus 10 outputs an exchange busy signal in step S103r, and starts the exchange operation of the pallet P'. In step S103s, the measurement operation of an operation timer is started. The measurement operation of the operation timer is performed to detect an operation error during a pallet exchange operation by comparing the measured time with a pre-measured pallet exchange time input to the controller 84 arranged in the supply apparatus 10.

For example, the operation timer is reset in step S103am. In this case, if an abnormality occurs during the pallet exchange operation (for example, a pallet is undesirably caught by the EV), the operation program is stopped in that step, and the measured time exceeds the input exchange time. In this case, it is determined step S103v that the elapsed time is larger than a setting value, and the motor 46 is stopped in step S103ap. After the timer operation in step S103an is completed, an abnormal signal is output in step S103ao, and this mode is ended.

In step S103t, the motor 46 is rotated in the CW (clockwise) direction to move the second EV 16 upward so as to recover the empty pallet P' on the shutters 54a and 54b. In step S103u, the state of the lower end sensor 50 is monitored to prevent the first EV 14 from abnormally moving downward during the rotation of the motor 46, i.e., the upward movement of the second EV 16.

If the lower end sensor 50 is turned on in step S103u, the rotation of the motor 46 is stopped in step S103ap, and after the timer is started in step S103an, an abnormal signal is output in step S103ao, thus ending this mode.

In step S103w, the empty pallet upper end sensor 80 detects a timing at which the pallet P' on the shutters 54a and 54b is pushed up by the second EV 16, which is moved upward upon CW (clockwise) rotation of the motor 46 in step S103t to recover the pallet P', and is separated from the shutters 54a and 54b. When the empty pallet upper end sensor 80 is turned on, the rotation of the motor 46 is stopped in step S103x, and the empty pallet P' is recovered on the second EV 16 in this state (shown in FIG. 19A). In step S103y, the shutters 54a and 54b are opened to move the pallet P' recovered on the second EV 16 downward. If the shutter opening/closing sensor 58 detects in step S103z that the shutters 54a and 54b are opened, the flow advances to step S103aa. If the sensor 58 does not detect that the shutters 54a and 54b are opened, the timer is started in step S103an, and thereafter, an abnormal signal is output in step S103ao, thus ending this mode.

Figure 19A:
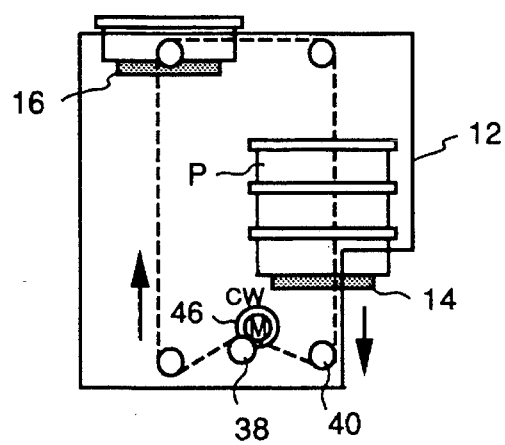
FIGS. 19A to 19C are views for explaining the pallet replenishing operation of the pallet supply apparatus.
Figure 19B:
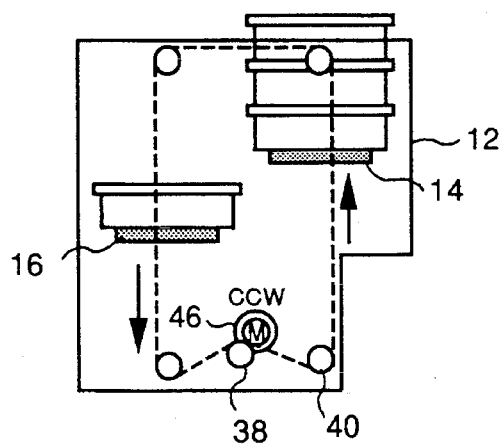
Figure 19C:
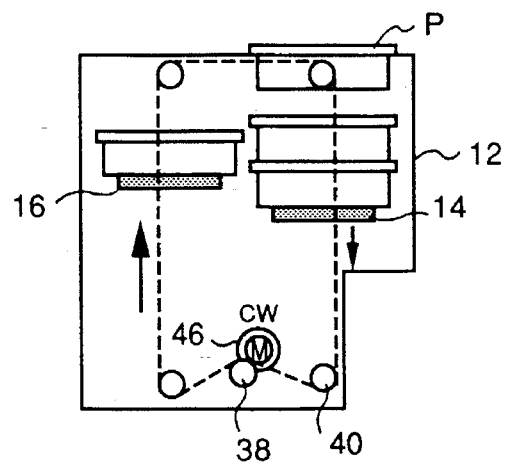

In step S103aa, the motor 46 is rotated in the CCW (counterclockwise) direction to move the first EV 14 upward so as to separate the next loaded pallet P storing works W (a state shown in FIG. 19B). The upward movement of the first EV 14 is stopped when the loaded pallet upper end sensor 74 detects a loaded pallet P. However, when no loaded pallet P is present on the first EV 14, or when the loaded pallet upper end sensor 74 malfunctions, no signal is obtained from the loaded pallet upper end sensor 74, and the first EV 14 may be abnormally moved upward. In order to prevent such abnormal upward movement of the first EV 14, in step S103ab, the position of the second EV 16, which is moved downward upon upward movement of the first EV 14, is detected by the lower end sensor 52, thereby preventing the second EV 16 from being moved downward below the sensor 52 (i.e., preventing the first EV 14 from being abnormally moved upward). When the lower end sensor 52 is turned on, the motor 46 is stopped in step S103ap, the timer is started in step S103an, and thereafter, an abnormal signal is output in step S103ao, thus ending this mode.

In a normal state, since the uppermost pallet of stacked pallets P reaches the position of the loaded pallet upper end sensor 74 before the second EV 16 reaches the lower end position, and the loaded pallet upper end sensor 74 is turned on in step S103ac, the flow advances to step S103ae to stop the motor 46.

In step S103af, the shutters 54a and 54b are closed. In this state, the uppermost pallet P is set in a separable state. In step S103ag, the operation state of the shutters 54a and 54b is checked by the shutter opening/closing sensor 58. When the shutters 54a and 54b are left opened, the timer is started in step S103an, and thereafter, an abnormal signal is output in step S103ao, thus ending this mode. If the shutter opening/closing sensor 58 detects that the shutters 54a and 54b are closed, the flow advances to step S103ah to rotate the motor 46 in the CW (clockwise) direction.

In step S103ar, the state of the lower end sensor 50 is checked to prevent the first EV 14 from being abnormally moved downward upon CW (clockwise) rotation of the motor 46. When the lower end sensor 50 is turned on in step S103ar, the motor 46 is stopped in step S103ap, the timer is started in step S103an, and thereafter, an abnormal signal is output in step S103ao, thus ending this mode.

If the lower end sensor 50 does not detect any abnormal downward movement of the first EV 14, the timer is started in step S103ai, and the motor 46 is stopped in step S103aj. In this state, the uppermost loaded pallet is separated.

In steps S103ak to S103a, the separated pallet P on the shutters is positioned as in steps S102s to S102u in the separation mode (FIGS. 20A to 20C).

In step S103am, the operation timer, which started measurement in step S103s, is reset. However, if any abnormal state occurs from step S103s to step S103am, the pallet exchange operation is not completed, and the timer is not reset. For this reason, the count value of the operation timer is increased, and it is determined in step S103v that the count value is larger than the setting value. Thus, the flow advances to step S103ap step S103an step S103ao to output an abnormal signal, and this mode is ended.

In a normal state, the flow returns to step S103*b* and then advances up to step S103*j* to allow supply of works to the robot. In addition, the supply apparatus 10 waits for input of another push end signal from the robot (a state shown in FIG. 19C). Thereafter, steps S103*b* to S103*am* are repetitively executed to have step S103*j* as the start step. When all pallets P on the first EV 14 are separated upon repetition of this operation, the loaded pallet sensor 32 determines in step S103*g* that no pallet P is present on the first EV 14, and a run-short signal is output in step S103*h*. In response to this signal, an operator knows that he or she must insert new loaded pallets to the supply apparatus 10 so as to continuously operate the apparatus.

[Pallet Insertion Operation When Pallet P is Present in Supply Apparatus 10]

A method of inserting new loaded pallets P in the automatic mode (a state wherein the last loaded pallet P is present on the shutters 54*a* and 54*b*) will be described below.

At this time, the last loaded pallet P is positioned on the shutters 54*a* and 54*b* of the supply apparatus 10. In order to insert stacked pallets P storing works W shown in FIG. 15, the insertion mode is selected in step S101. More specifically, the mode selection switch 88 of the controller 84 is turned from the position "automatic" to the position "insertion". In step S101*a*, the presence/absence of a pallet P on the shutters 54*a* and 54*b* is checked by the loaded pallet sensor 76. In the current state, the pallet P is present on the shutters 54*a* and 54*b* of the supply apparatus 10, and empty pallets P' are stacked on the second EV 16. The flow advances to step S101*c*, and an insertion busy signal is output (the robot can access the supply apparatus when the normal signal and the insertion busy signal are output). However, while the insertion busy signal is output, an interlock mode for inhibiting the sliding operation of the pallet is set.

In step S101*d*, empty pallets P' stacked on the second EV 16 are manually removed. When the start push switch 90 is depressed in this state, the empty pallet sensor 34 checks if empty pallets P' are completely removed from the second EV 16 (step S101*f*). At this time, if an empty pallet P' remains, the flow returns to step S101*e*. This is to prevent damage to the supply apparatus 10 even when an operator forgets to remove empty pallets in step S101*d*. In the current state, since empty pallets P' are removed, and there is no empty pallet P' on the second EV 16, the flow advances to step S101*g*.

In step S101*g*, the level position of the first EV 14 is checked. When the first EV 14 is located at the lower end position, i.e., when the lower end sensor 50 is ON, the motor 46 is not rotated, and the flow advances to step S101*j*. However, when the first EV 14 is not located at the lower end position, the motor 46 is rotated in the CW (clockwise) direction to move the first EV 14 downward until the lower end sensor 50 is turned on. At this time, the second EV 16 is moved upward to the upper end position.

In step S101*j*, stacked loaded pallets P are manually inserted in the supply apparatus 10 from the direction of the arrow as in FIG. 18A. More specifically, an operator places stacked loaded pallets P on the pallet guide plate 18, and pushes it to the position on the first EV 14 until the stacked pallets P abut against the frame 13.

Then, the mode selection switch 88 of the controller 84 is turned from the position "insertion" to the position "automatic" to select the automatic mode in step S103. In step S103*a*, the control waits for manual depression of the start push switch 90 so as to confirm the start of the operation. When the start push switch 90 is depressed, the flow advances to step S103*b* to check using the loaded pallet sensor 76 if a loaded pallet P is set on the shutters 54*a* and 54*b*.

In the current state, since the robot is accessing the loaded pallet P on the shutters 54*a* and 54*b*, and the loaded pallet P is present, the flow advances to step S103*c*.

In step S103*c*, it is checked using the lower end sensor 50 if the first EV 14 is located at the lower end position. In the current state, since the insertion operation has been completed from a state wherein a pallet P remains in the supply apparatus 10, the first EV 14, which is full of loaded pallets P storing works W, is located at the lower end position. For this reason, the flow advances to step S103*d*. In step S103*d*, the motor 46 is rotated in the CCW (counterclockwise) direction to move the second EV 16 downward, so that the pallet P in access on the shutters 54*a* and 54*b* is to be slidably pushed by, e.g., a robot finger. More specifically, immediately after the pallets are inserted, the first EV 14 is located at the lower end position, and hence, the second EV 16 is located at the upper end position. In this state, if the pallet P on the shutters is slid, since it interferes with the second EV 16, the second EV 16 must be moved downward to escape from the pallet path. The above-mentioned operation is executed for this purpose.

In step S103*e*, the timer is started to measure the CCW (counterclockwise) rotation time of the motor 46 in step S103*d*, and after an elapse of a predetermined period of time, the motor is stopped in step S103*f*.

In step S103*g*, a normal signal is output on the basis of the detection result of the loaded pallet sensor 32. In a normal state, the flow returns to step S103*d* and then advances up to step S103*j* to allow supply of works to the robot. In addition, the supply apparatus 10 waits for input of another push end signal from the robot.

Thereafter, steps S103*b* to S103*am* are repetitively executed to have step S103*j* as the start step.

[Normal Rotation Mode]

In this mode, the EVs are manually moved upward or downward. In step S104, the normal rotation mode is selected. More specifically, the mode selection switch 88 of the controller 84 is turned to a position "normal rotation".

When an operator depresses the start push switch 90 of the controller 84 in step S104*a*, an exchange busy signal is output in step S104*b*. If it is determined in step S104*c* no loaded pallet P is present on the first EV 14 to be moved upward, and it is determined in step S104*d* that the second EV 16 is not located at the lower end position, the motor 46 is rotated in the CCW (counterclockwise) direction. If it is determined in step S104*f* that the start push switch 90 is depressed, the flow returns to step S104*c* to continuously rotate the motor 46. However, if the start push switch 90 is not depressed, the flow advances to step S104*g* to stop the motor 46.

[Reverse Rotation Mode]

In this mode, the EVs are manually moved upward or downward. In step S105, the reverse rotation mode is selected. More specifically, the mode selection switch 88 of the controller 84 is turned to a position "reverse rotation".

When an operator depresses the start push switch 90 of the controller 84 in step S105*a*, an exchange busy signal is output in step S105*b*. If it is determined in step S105*c* no empty pallet P' is present on the second EV 16 to be moved upward, and it is determined in step S105*d* that the first EV 14 is not located at the lower end position, the motor 46 is rotated in the CW (clockwise) direction. If it is determined in step S105*f* that the start push switch 90 is depressed, the flow returns to step S105*c* to continuously rotate the motor 46. However, if the start push switch 90 is not depressed, the flow advances to step S105g to stop the motor 46.

(Third Embodiment)

The reference numerals of the drawings in the third embodiment may denote different parts from those in the first and second embodiments even if they are the same as those in the first and second embodiments.

Figure 27:
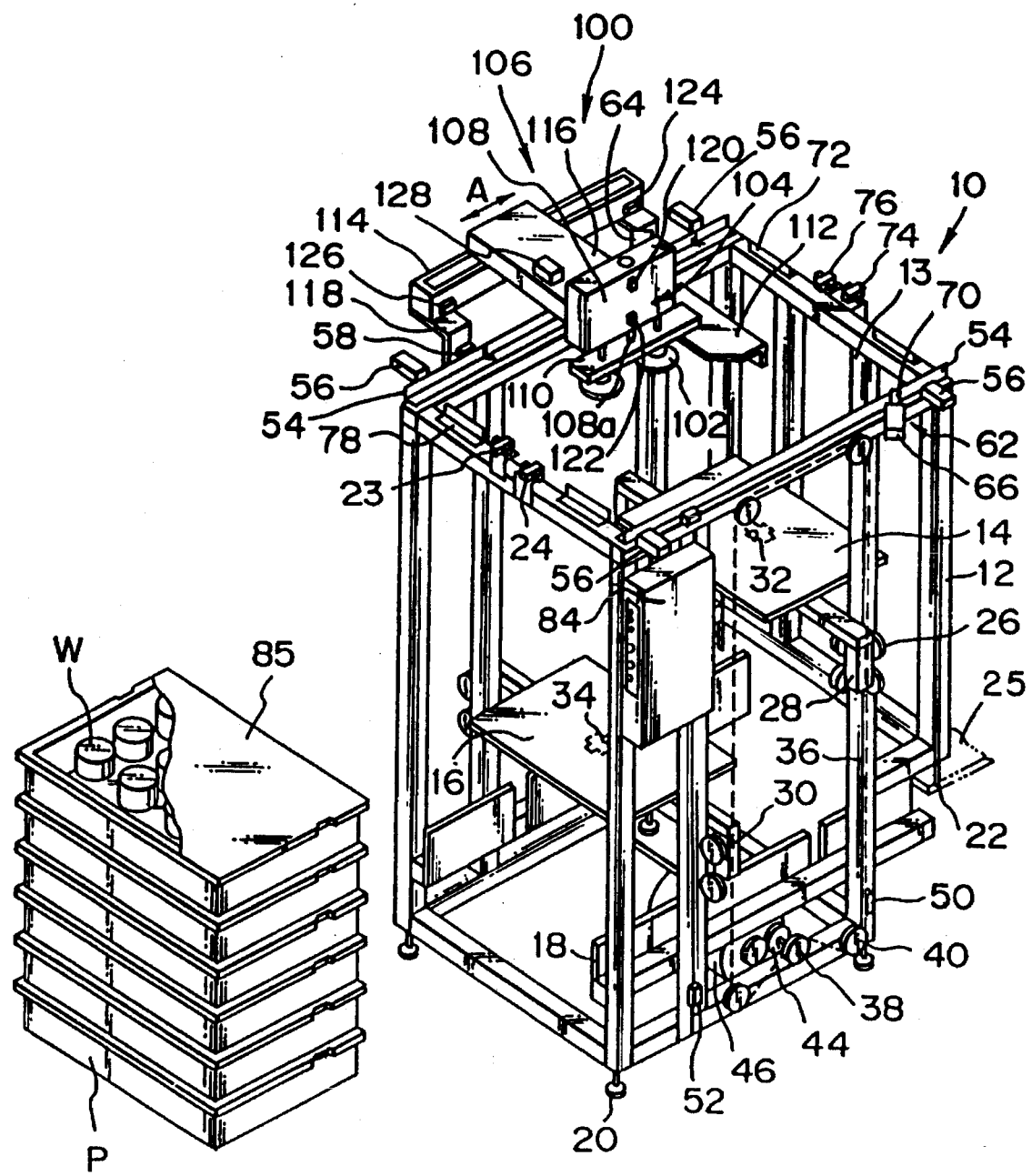
FIG. 27 is a perspective view showing a structure of a pallet supply apparatus according to an embodiment of the present invention.

FIG. 27 is a perspective view showing an outer appearance of a structure of a pallet supply apparatus to which a control method according to the present invention is applied.

In FIG. 27, a pallet supply apparatus 10 has a supply apparatus main body 12 fixed on the floor surface of, e.g., a factory, and first and second elevators (to be referred to as EVs hereinafter) 14 and 16 which are vertically moved with respect to the supply apparatus main body 12. On the first EV 14, a stack of a plurality of pallets P each of which stores assembling works to be assembled or non-processed works to be processed are placed. The first EV 14 supplies the uppermost pallet P to an access position located at the upper end of the supply apparatus main body 12 by its vertical movement. A robot arranged in a processing system or an assembling system picks up works from the pallet P supplied to the access position, and performs predetermined processing or assembling.

On the other hand, the second EV 16 detaches an empty pallet P' from which all works have been picked up from the position at the upper end of the supply apparatus main body by its vertical movement, and stocks the detached pallet.

As described above, a stack of one or more pallets P are placed on the first EV 14, and each pallet P stores assembling works or non-processed works W. A pallet which stores works W will be referred to as a loaded pallet P hereinafter, and a pallet which stores no works W will be referred to as an empty pallet P' hereinafter. Stacked pallets P are manually inserted onto the first EV 14 while; being placed on a pallet guide plate 18 of the supply apparatus main body 12. The inserted loaded pallets P are pushed up to the access position located at the upper end portion of the supply apparatus main body 12 in turn from the uppermost one, thus allowing an access by a robot in the processing or assembling system.

[Arrangement of Supply Apparatus Main Body 12]

The supply apparatus main body 12 is placed on the floor surface of, e.g., a factory via level adjusters 20, and is fixed to a bracket 25 projecting from a frame of the processing or assembling system (not shown) by a supply apparatus fixing bolt 22.

The second EV 16 for placing empty pallets P' and the first EV 14 for placing stacked loaded pallets P are respectively arranged at the right and left sides of the supply apparatus main body 12. EV guides 28 and 30 attached with EV guide rollers 26 for vertically moving the EVs are respectively provided to the EVs 14 and 16. A loaded pallet sensor 32 for detecting the presence/absence of loaded pallets P is arranged on the first EV 14, and an empty pallet sensor 34 for detecting the presence/absence of empty pallets P' is arranged on the second EV 16.

An endless chain 36 is partially engaged with the EV guide 28 of the first EV 14 and the EV guide 30 of the second EV 16, and the first and second EVs 14 and 16 are held by the supply apparatus main body 12 to be suspended from the chain 36. The chain 36 is looped around a driving sprocket 38 for pivoting the chain 36, and a plurality of idler sprockets 40. The driving sprockets 38 are attached to two side surfaces of the supply apparatus main body 12, and are synchronously rotated by a rotation shaft (unshown) attached with an intermediate gear 44. The intermediate gear 44 is meshed with a driving gear 48 fixed to a shaft of a motor 46. Therefore, the driving sprockets 38 are rotated by the motor 46, and when the motor 46 is rotated in the normal or reverse direction, the first and second EVs 14 and 16 are vertically moved in a seesaw manner.

The supply apparatus main body 12 has lower end sensors 50 and 52 for respectively detecting the lower end positions of the first and second EVs 14 and 16.

Shutters 54a and 54b for locking a pallet P or releasing the locked pallet P are arranged on the upper surface of the supply apparatus main body 12, and are opened/closed by an air cylinder 56. An opening/closing sensor 58 for detecting the opening/closing state of these shutters is arranged at a position near the shutters 54a and 54b, and is used for checking the opening/closing operation of the shutters 54a and 54b. A left positioning unit 60 and a right positioning unit 62 for positioning a pallet P are arranged on the shutters 54a and 54b. These positioning units 60 and 62 are constituted by adding positioning rollers 68 and 70 to cylinders 64 and 66, respectively. A pallet P is positioned in such a manner that its reference surfaces are urged against an abutting angle 72 and the reference-side shutter 54a by the two positioning units 60 and 62.

A loaded pallet upper end sensor 74 for detecting a pallet P which is moved upward upon upward movement of the first EV 14 and a loaded pallet sensor 76 for detecting the presence/absence of a loaded pallet on the shutters 54a and 54b are arranged on the upper surface of the supply apparatus main body 12.

A stopper angle 78 serving as a stopper used when an empty pallet P' is slid from a position above the first EV 14 to a position above the second EV 16 is arranged at a position opposing the abutting angle 72, and an empty pallet upper end sensor 80 and an empty pallet sensor 82 for detecting an empty pallet on the shutters are arranged aside the stopper angle 78. A controller 84 for controlling the operation of the entire supply apparatus 10 is arranged on one side surface of the supply apparatus main body 12.

A detaching device 100 for detaching a pallet cover 85 fitted on a pallet P is arranged on the upper portion of the supply apparatus main body 12. The detaching device 100 is constituted by chucking pads 102 for chucking the pallet cover 85, a lift unit 104 for vertically moving the chucking pads 102, and a moving unit 106 for moving the lift unit 104 between a position above the first EV 14 and a position above the second EV 16. The lift unit 104 comprises a lift cylinder 108, and a lift plate 110 attached to the lower end of a piston rod 108a of the cylinder 108. The two chucking pads 102 are attached to the lower surface of the lift plate 110. A slide hook 112 for locking and slidably moving a pallet P is also attached to the end portion of the lift plate 110.

The moving unit 106 comprises a guide cylinder 114, and a movable member 116 slidably moved by the guide cylinder 114 in a direction of an arrow A in FIG. 27. The lift cylinder 108 is attached to the distal end portion of the movable member 116. Therefore, the chucking pads 102 and the slide hook 112 are moved together with the lift cylinder 108 between the position above the first EV 14 and the position above the second EV 16 by the guide cylinder 114. The moving unit 106 is fixed to the supply apparatus main body 12 via a mounting bracket 118.

The slide hook 112 is engaged with a pallet when the lift plate 110 is moved downward. In this state, when the slide hook 112 is moved by the moving unit 106, it moves an empty pallet, from which all works W have been picked up by a robot (to be described later), from the position above the first EV 14 to the position above the second EV 16.

Note that upper and lower end sensors 120 and 122 for respectively detecting the upper and lower end positions of the lift plate 110 are attached to the lift cylinder 108. Also, front and rear end sensors 124 and 126 for respectively detecting the front and rear end positions of the movable member 116 are attached to the guide cylinder 114. Furthermore, a vacuum sensor 128 for detecting the chucking state of the chucking pads 102 is attached on the movable member 116.

Figure 28:
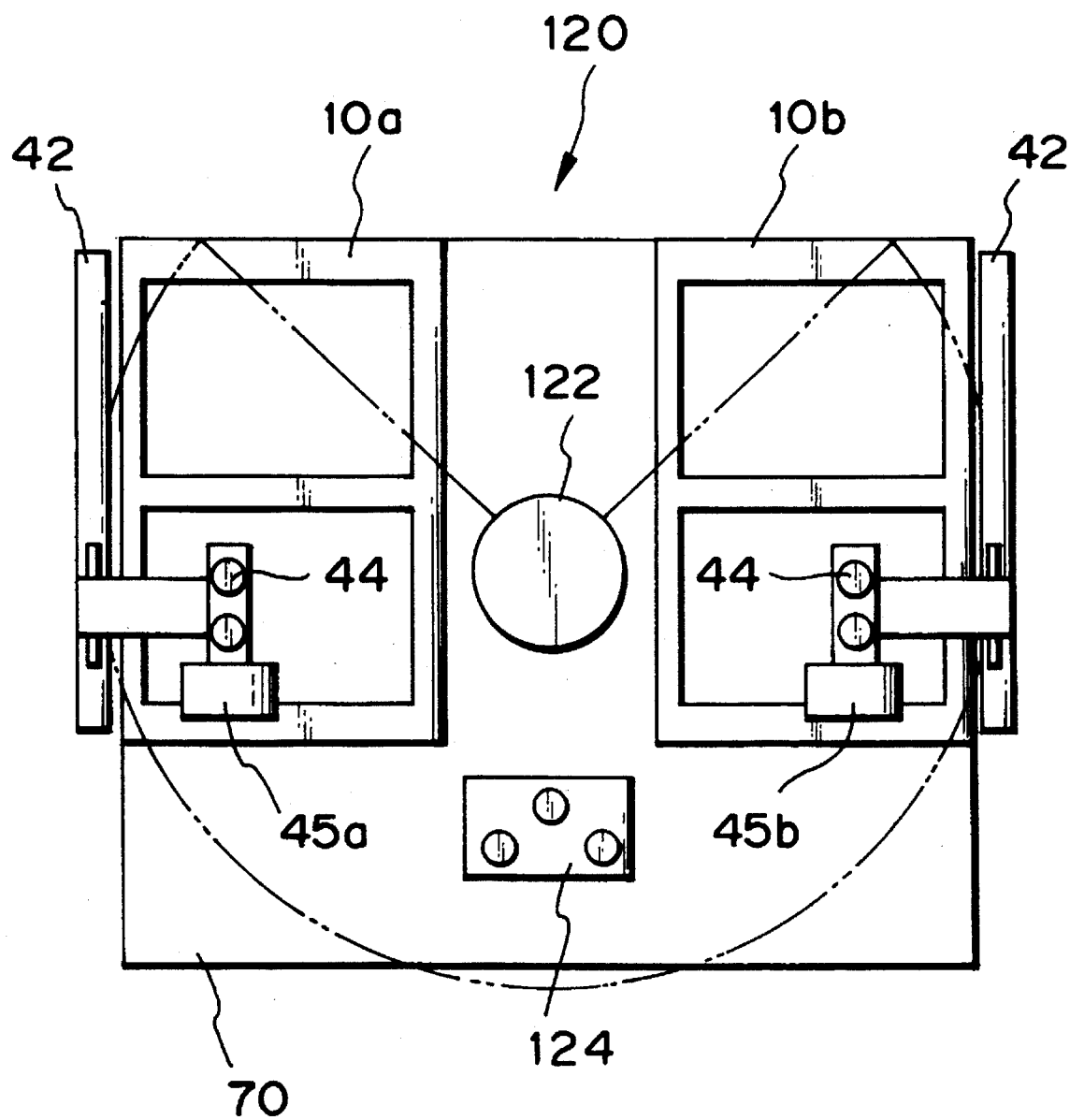
FIG. 28 is a view showing an example wherein the pallet supply apparatus is applied to an actual assembling station.

FIG. 28 shows an example wherein the pallet supply apparatus of this embodiment is applied to an actual assembling station.

Figure 29:
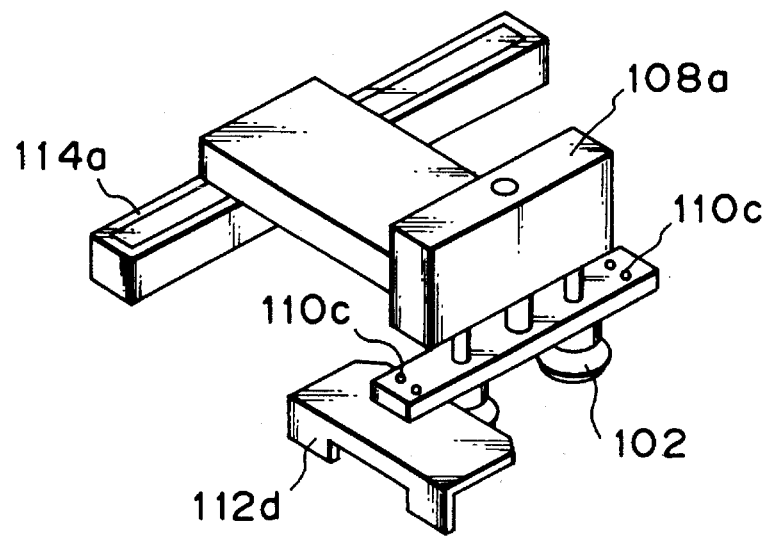
FIG. 29 is a perspective view of a detaching device for a left pallet supply apparatus.
Figure 30:
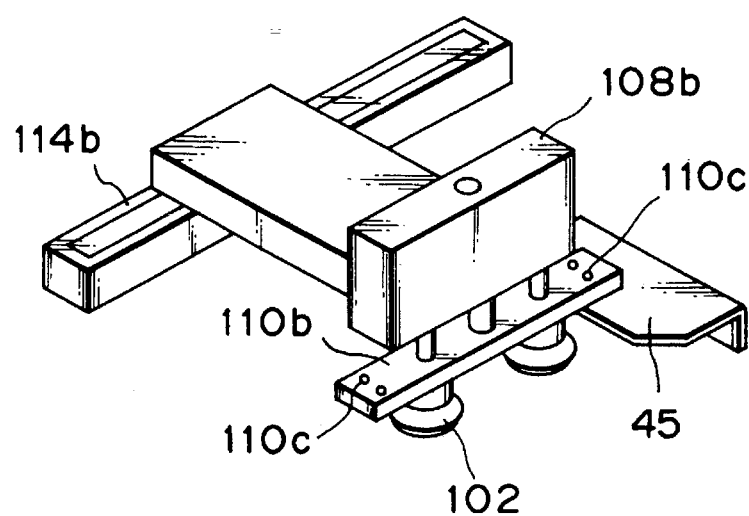
FIG. 30 is a perspective view of a detaching device for a right pallet supply apparatus.

An assembling station 120 is constituted by two pallet supply apparatuses 10b and 10a arranged at the right and left sides of a robot 122, and an assembling jig 124 arranged in a movable range of the robot 122. Since the left pallet supply apparatus 10a must move an empty pallet from a lower position to an upper position in FIG. 28, a slide hook 112a is attached at the left side of a lift plate 110a, as shown in FIG. 29. On the other hand, since the right pallet supply apparatus 10b is arranged to be symmetrical about the robot 122 with the left pallet supply apparatus 10a, a slide hook 112b is attached at the right side of a lift plate 110b, as shown in FIG. 30. Since the lift plate 110 is formed with mounting holes 110c at both the right end and left end portions, the slide hook 112 can be easily attached to either the right or left position. Thus, the right and left pallet supply apparatuses 10b and 10a can use the same arrangement by only changing the mounting direction of the slide hook 112.

[Controller 84]

Figure 31:
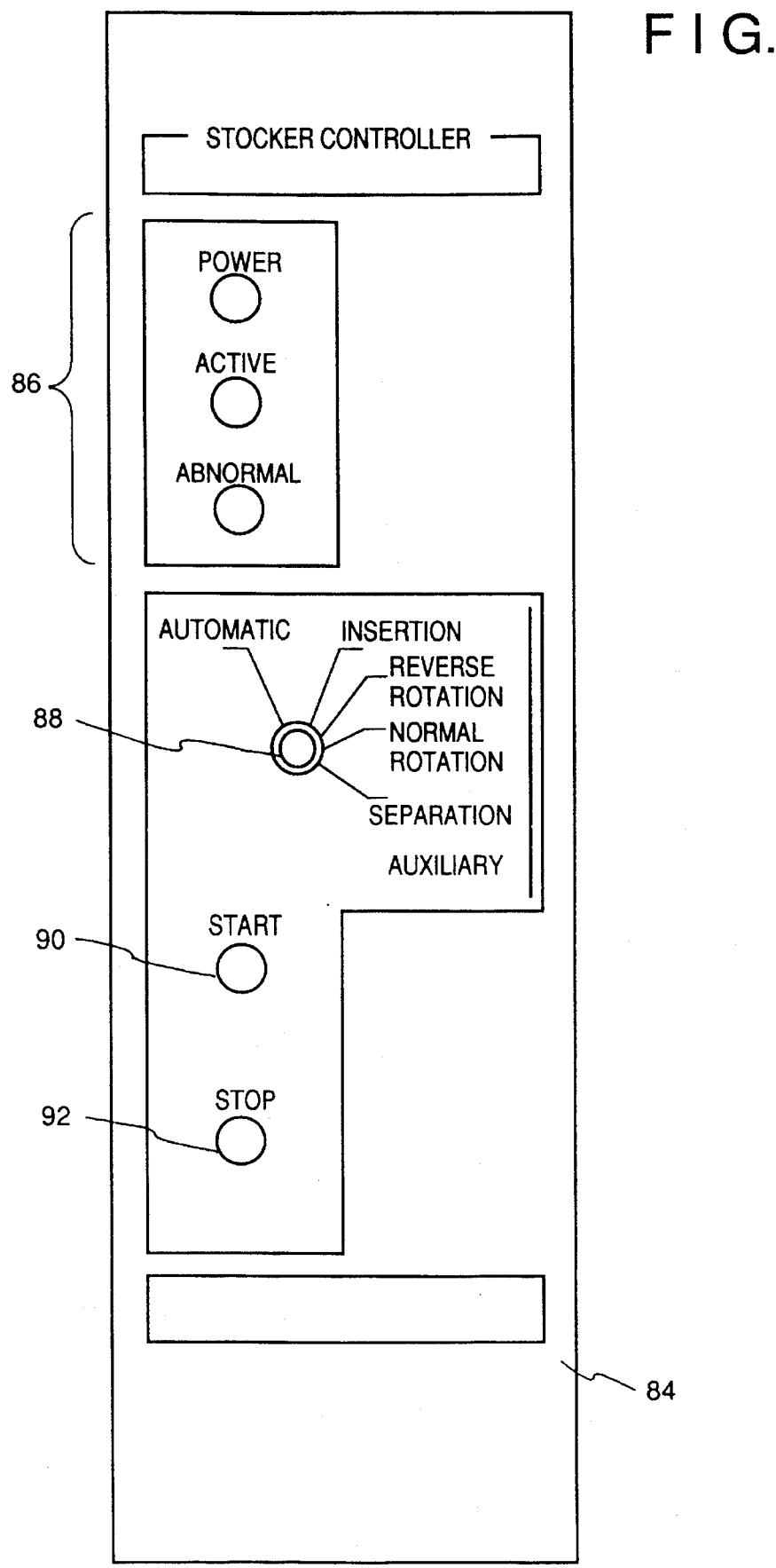
FIG. 31 is a front view showing an arrangement of a console panel arranged on the front surface of a controller.

FIG. 31 is a front view showing an arrangement of an operation console arranged on the front surface of the controller 84.

Indication lamps 86 indicating the operation state of the supply apparatus 10 include three kinds of lamps, i.e., a power lamp indicating a power supply state, an active lamp indicating an access enable state to a robot, and an abnormal indication lamp indicating an abnormal state. A mode selection switch 88 for selecting an operation to be executed by the supply apparatus 10 is arranged below the indication lamps 86, and has five modes, i.e., automatic, insertion, normal rotation, reverse rotation, and separation modes, as will be described in detail later. A start push switch 90 for starting a selected operation mode and a stop push button 92 for interrupting an operation are further arranged on the operation console.

Figure 32:
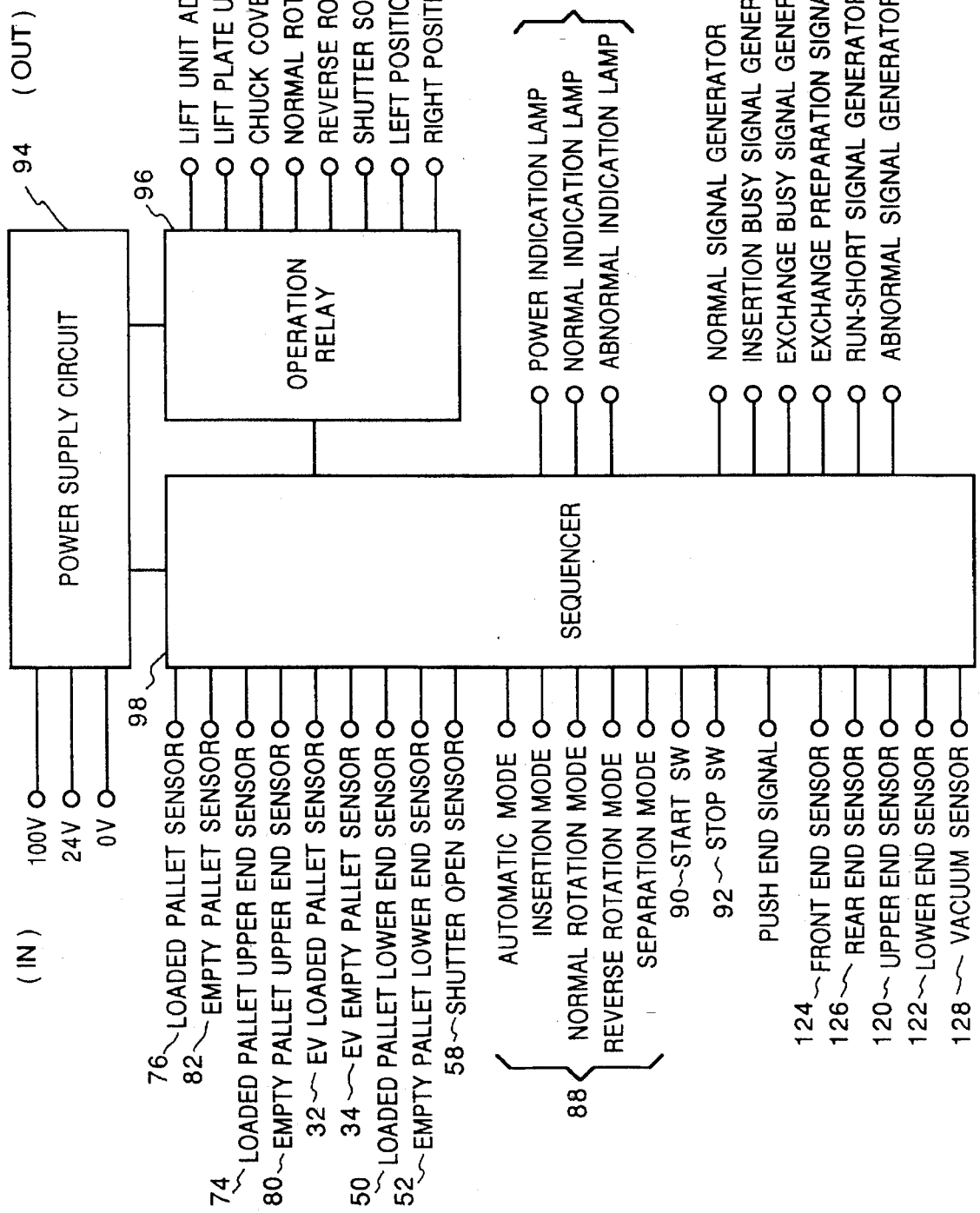
FIG. 32 is a block diagram showing a circuit arrangement of the controller.

FIG. 32 is a block diagram showing a circuit arrangement of the controller. A power supply 94 supplies a power supply voltage of 100 V for driving the motor, and a power supply voltage of 24 V for driving a sequencer 98 and the sensors.

The sequencer 98 has 22 input (IN) terminals and 17 output (OUT) terminals for operating the supply apparatus 10. At the IN side, input terminals for receiving signals from the sensors (32, 34, 74, 76, 80, 82, 58, 50, 52) for detecting the operation state of the supply apparatus 10 and the sensors (120, 122, 124, 126, 128) for detecting the operation state of the detaching device 100, input terminals for receiving signals from operation switches (88, 90, 92), and an input terminal for receiving an externally input push end signal for allowing an access from a robot are arranged.

At the OUT side, output terminals connected to a relay for rotating the motor 46 in the normal/reverse direction, a relay of a solenoid valve for opening/closing the shutters 54a and 54b, a relay of a solenoid valve for driving the cylinder of the left positioning unit 60, a relay of a solenoid valve for driving the cylinder of the right positioning unit 62, a relay of a solenoid valve for driving the guide cylinder 114 of the detaching device 100, a relay of a solenoid valve for driving the lift cylinder 108 of the detaching device 100, and relays of negative pressure generation valves of the chucking pads 102, output terminals connected to the operation indication lamps 86, and output terminals used for informing the state of the supply apparatus 10 to e.g., a robot are arranged.

Figure 33A:
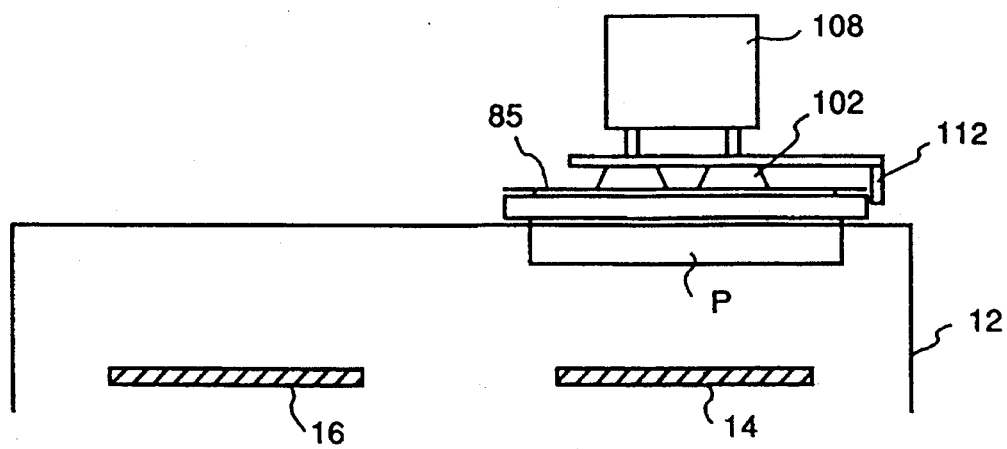
FIGS. 33A to 33C are views showing an operation for detaching a cover from a pallet.

FIGS. 33A to 34 are views for explaining the operation of the supply apparatus 10.

A description will be started from a state immediately after the power switch of the supply apparatus 10 is turned on, i.e., a state wherein neither loaded pallets P nor empty pallets P' are present on the first and second EVs 14 and 16.

[Insertion Mode . . . When no Pallets P are present in Supply Apparatus 10]

Figure 38:
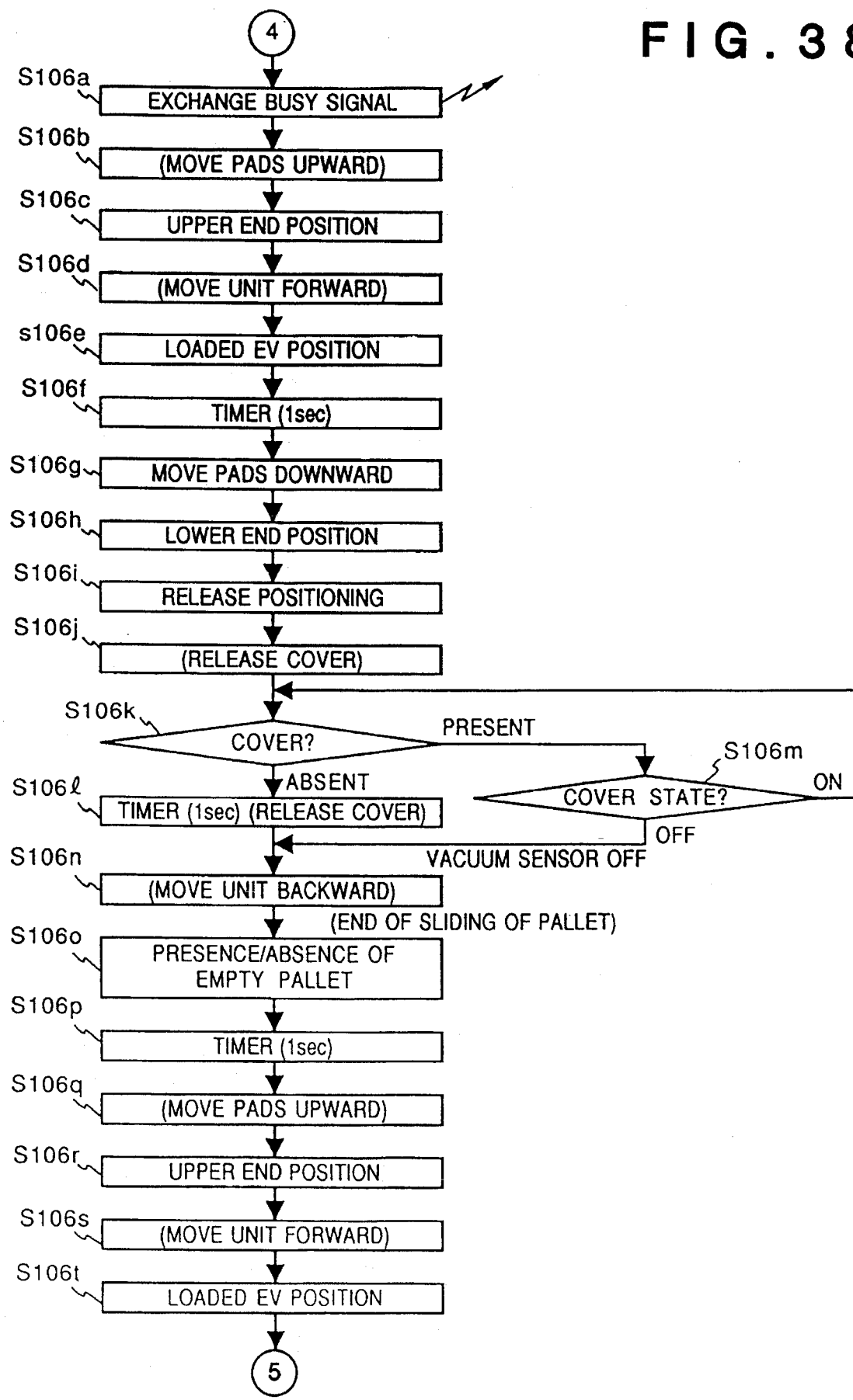
FIG. 38 is a flow chart showing an operation of the pallet supply apparatus in the automatic mode.
Figure 39:
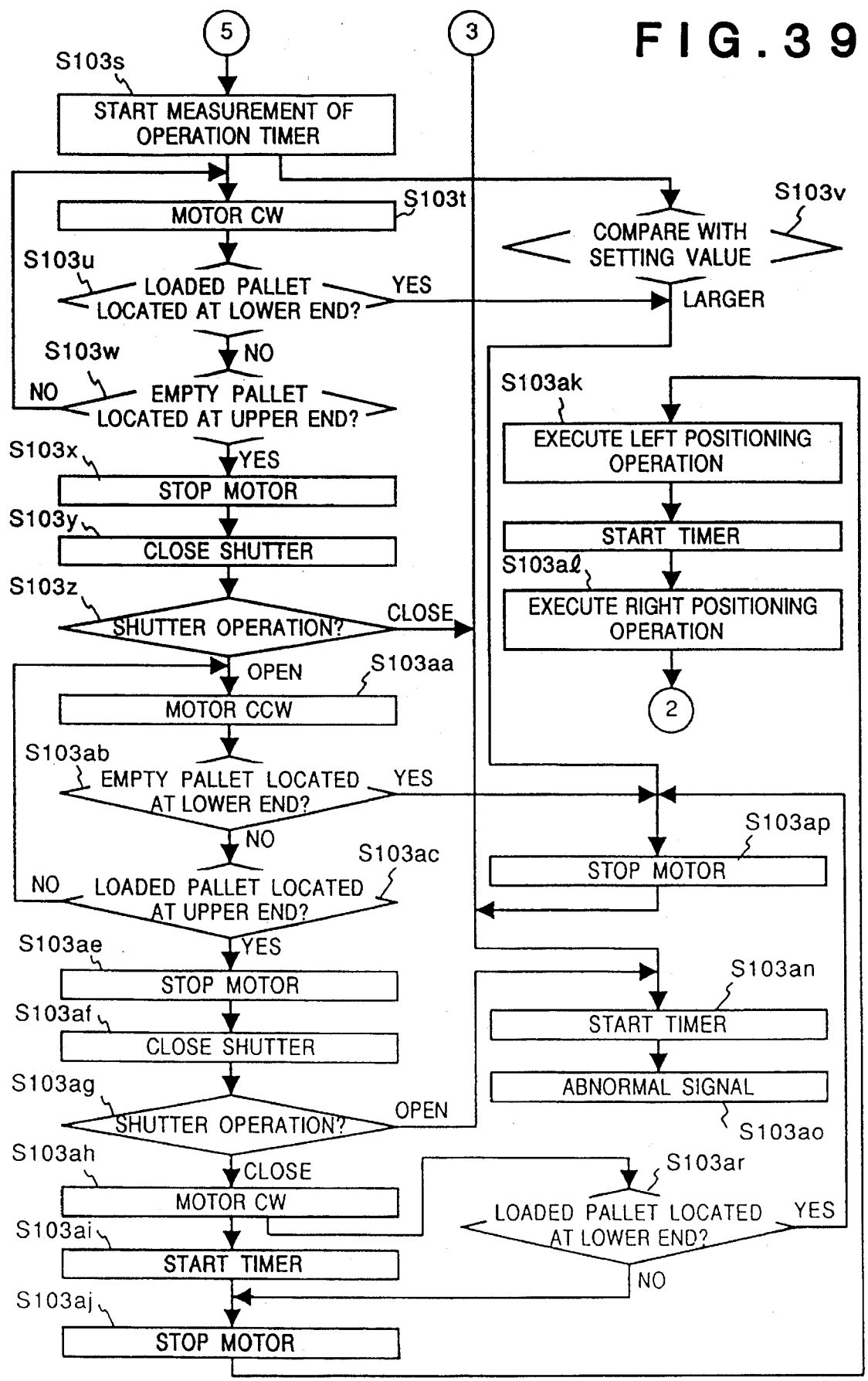
FIG. 39 is a flow chart showing an operation of the pallet supply apparatus in the automatic mode.

First, in order to insert stacked pallets P storing works W shown in FIG. 27 into the supply apparatus 10, the insertion mode is selected in step S101 in the flowchart shown in FIG. 38. More specifically, the mode selection switch 88 of the controller 84 is turned to a position "insertion". It is checked using the loaded pallet sensor 76 in step S101a if a pallet P is present on the shutters 54a and 54b.

In the current state, since no pallet P is present in the supply apparatus 10, the flow advances to step S101b to output an exchange busy signal. In step S101d, an empty pallet is removed. However, in this case, since no pallet P is present in the supply apparatus 10, and the flow advances to step S101e to wait until the start push switch 90 is depressed.

If the start push switch 90 is depressed in step S101e, the flow advances to step S101f to check using the empty pallet sensor 34 if an empty pallet P' is placed on the second EV 16. If an empty pallet P' is placed on the second EV 16, the flow returns to step S101e. This is to prevent damage to the supply apparatus main body 12 occurring when an operator forgets to remove the empty pallet P' in step S101d, and the control advances to the next step in such a state.

Since no pallet is currently present in the supply apparatus 10, the flow advances to step S101g. In step S101g, the level position of the first EV 14 is checked. If the first EV 14 is located at the lower end position, i.e., when the lower end sensor 50 is ON, since the first EV 14 is ready to receive stacked pallets P, the motor 46 is not rotated, and the flow advances to step S101j. However, if it is determined in step S101g that the first EV 14 is not located at the lower end position, the motor 46 is rotated in the CW (clockwise) direction to move the first EV 14 downward until the lower end sensor 50 is turned on. In step S101i, the motor 46 is stopped. At this time, the second EV 16 is moved upward to the upper end position.

In step S101j, stacked loaded pallets P are manually inserted in the same manner disclosed above and shown in FIG. 18A with respect to the first embodiment of the invention. More specifically, an operator places stacked pallets P on the pallet guide plate 18, and pushes them to a position on the first EV 14. At this time, when the stacked loaded pallets P abut against a frame 13, the insertion operation of the loaded pallets P is completed. Thus, the insertion mode is ended.

[Separation Mode]

This mode is executed when no pallet is present on the shutters 54a and 54b. In the flow chart shown step S102 in FIG. 22, the separation mode is selected. More specifically, the mode selection switch 88 of the controller 84 is turned to a position "separation". In step S102a, an exchange busy signal is output, and the flow advances to step S102b. In step S102b, it is checked using the loaded pallet sensor 76 if a loaded pallet P is present on the shutters 54a and 54b. This is to prevent a loaded pallet present on the shutters 54a and 54b from being dropped when the shutters 54a and 54b are opened to execute the separation operation of a loaded pallet P (that is, a pallet P must not be present on the shutters 54a and 54b upon execution of the separation operation). In the current state, since the pallets P are placed on only the first EV 14, and no pallet P is present on the shutters 54a and 54b, the flow advances to step S102c.

In step S102c, the level position of the first EV 14 is checked. More specifically, it is checked whether or not the second EV 16 is located at the lower end position, and the first EV 14 is located at the upper end position. If the first EV 14 is located at the upper end position, i.e., if the lower end sensor 52 at the side of the second EV 16 is ON, since this means that there is no pallet P to be separated on the first EV 14, the motor 46 is not rotated, and the flow returns to step S102a. In the current state, since the first EV 14 is located at the lower end position, the flow advances to step S102d. In step S102d, it is checked using the loaded pallet sensor 32 if loaded pallets P are placed on the first EV 14. If no loaded pallet P is placed on the first EV 14, the flow returns to step S102a. In the current state, since the stacked pallets P are inserted on the first EV 14 by the insertion operation, the flow advances to step S102e. In step S102e, the start push switch 90 is manually depressed to start the separation operation.

In step S102f, the shutters 54a and 54b are opened, and the stacked loaded pallets P can be moved upward via a gap between the shutters 54a and 54b. In step S102g, it is checked using the shutter opening/closing sensor 58 if the shutters 54a and 54b are opened. Simultaneously with step S102g, a timer starts its operation in step S102v. When a signal from the shutter opening/closing sensor 58 is not detected in several seconds, an abnormal signal is output in step S102w, and the operation of the supply apparatus 10 is ended in this step.

In a normal state, the shutters 54a and 54b are opened, and the flow advances to step S102h.

In step S102h, the motor 46 is rotated in the CCW (counterclockwise) direction, and the first EV 14 is moved upward. The upward movement of the first EV 14 is stopped when a loaded pallet upper end sensor 74 detects the loaded pallet P. However, when no loaded pallet P is present on the first EV 14, or when the loaded pallet upper end sensor 74 malfunctions, a signal from the loaded pallet upper end sensor 74 cannot be obtained, and the first EV 14 may abnormally move upward. In order to prevent abnormal upward movement of the first EV 14, the position of the second EV 16, which is moved downward upon upward movement of the first EV 14, is detected by the lower end sensor 52 in step S102i, thereby preventing further downward movement of the second EV 16 i.e., abnormal upward movement of the first EV 14). When the lower end sensor 52 is turned on, the motor 46 is stopped in step S102x, and the timer is started in step S102v. Thereafter, an abnormal signal is output in step S102w, thus ending this mode.

In a normal state since the uppermost pallet of the stacked pallets P reaches the position of the loaded pallet upper end sensor 74 before the second EV 16 reaches the lower end position, and the loaded pallet upper end sensor 74 is turned on in step S102j, the flow advances to step S102k to stop the motor.

In step S102 , the shutters 54a and 54b are closed. In this state, the uppermost pallet P is set in a separable state. In step S102m, the operation state of the shutters 54a and 54b is checked by the shutter opening/closing sensor 58. When the shutters 54a and 54b are left opened, the timer is started in step S102v, and thereafter, an abnormal signal is output in step S102w, thus ending this mode. On the other hand, if the shutter opening/closing sensor 58 detects that the shutters 54a and 54b are closed, the flow advances to step 102n to rotate the motor 46 in the CW (clockwise) direction.

In step S102o, the state of the lower end sensor 50 is checked to prevent the first EV 14 from abnormally moving downward upon CW (clockwise) rotation of the motor 46 when pallets exceeding a predetermined number are inserted in the supply apparatus 10. If the lower end sensor 50 is turned on in step S102o, the motor 46 is stopped in step S102p, the timer is started in step S102v, and thereafter, an abnormal signal is output in step S102w, thus ending this mode.

When a predetermined number of pallets or less are normally inserted, the timer is started in step S102p, and thereafter, the motor 46 is stopped in step S102r. Thus, the uppermost loaded pallet P is separated.

Figure 34A:
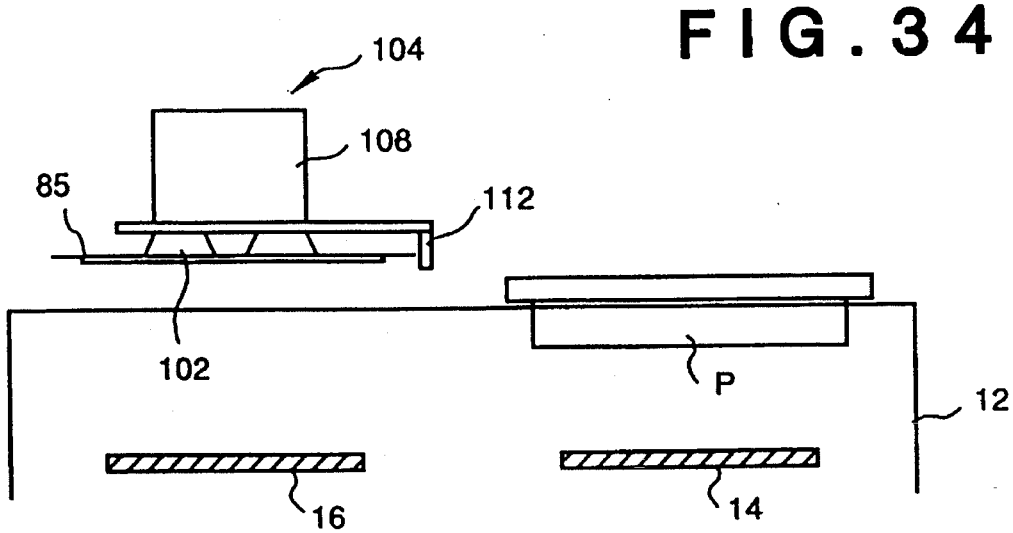
FIGS. 34A to 34C are views showing an operation for fitting a cover on a pallet, and delivering the pallet to a delivery position.

The positioning operation of the pallet P is then performed. The separated state of the uppermost pallet P is the same as shown in FIG. 34A.

In step S102s, the left positioning operation of the pallet P is performed. As shown in FIG. 20B, when the cylinder of the left positioning unit 60 is pushed out, the pallet P on the shutters 54a and 54b is pushed by the positioning roller 68 attached to the distal end of the cylinder while being pivoted clockwise, and is brought into local contact; with the abutting surfaces of the abutting angle 72 and the shutter 54a.

In step S102u, a setting operation by the right positioning unit 62 is executed. With reference back to FIG. 20C, when the cylinder of the right positioning unit 62 is pushed out, the pallet P on the shutters 54a and 54b is pushed by the positioning roller 70 attached to the distal end of the cylinder while being pivoted counterclockwise, and is brought into perfect contact with the abutting surfaces of the abutting angle 72 and the shutter 54a, thus completing the positioning operation of the pallet P. Thus, this mode is ended in the same state shown in FIG. 18B).

[Automatic Mode]

In this mode, the supply apparatus 10 accesses to a robot. In step S103, the automatic mode is selected. More specifically, the mode selection switch 88 of the controller 84 is turned to a position "automatic". In step S103a, the control waits for manual depression of the start push switch 90 so as to confirm the start of the operation. When the start push switch 90 is depressed, the flow advances to step S103b to check using the loaded pallet sensor 76 if a loaded pallet P is set on the shutters 54a and 54b. If no loaded pallet P is set, the timer is started in step S103an, and thereafter, an abnormal signal is output in step S103ao, thus ending this mode. In the current state, since a pallet P is separated and positioned in the above-mentioned separation mode, it is determined in step S103b that a loaded pallet P is set, and the flow advances to step S103c. In step S103c, it is detected using the lower end sensor 50 if the first EV 14 is located at the lower end position. In the current state, since the insertion and separation operations of the pallet P have been completed from a state wherein no pallet P was present in the supply apparatus 10, the first EV 14 is not located at the lower end position due to the separation operation of the uppermost pallet P, and the flow advances to step S103g.

If the first EV 14 is located at the lower end position, the flow advances to step S103d (steps S103d, S103e, and S103f will be described later in the paragraph of the insertion operation executed when a pallet P is present in the supply apparatus 10).

In step S103g, it is checked using the loaded pallet sensor 32 if a pallet P is present on the first EV 14. This is to urge an operator to insert pallets into the supply apparatus 10 after all pallets storing works W are separated from the first EV 14 upon repetition of accesses to the robot.

More specifically, if at least one pallet P is present on the first EV 14, the supply apparatus 10 outputs a normal signal in step S103i; if no pallet P is present on the first EV 14, the supply apparatus 10 outputs a run-short signal in step S103h to urge an operator to insert new pallets.

In the current state, since the insertion and separation operations of pallets have been completed, the pallet P with the cover 85 is set on the shutters 54a and 54b above the first EV 14 In step S103g', it is checked if the detaching device 100 detaches the cover 85 from the pallet P. If the cover 85 is chucked by the chucking pads 102, the flow advances to step S103i. In the current state, since the cover 85 is not chucked yet, the flow advances to step S107b.

Figure 33B:
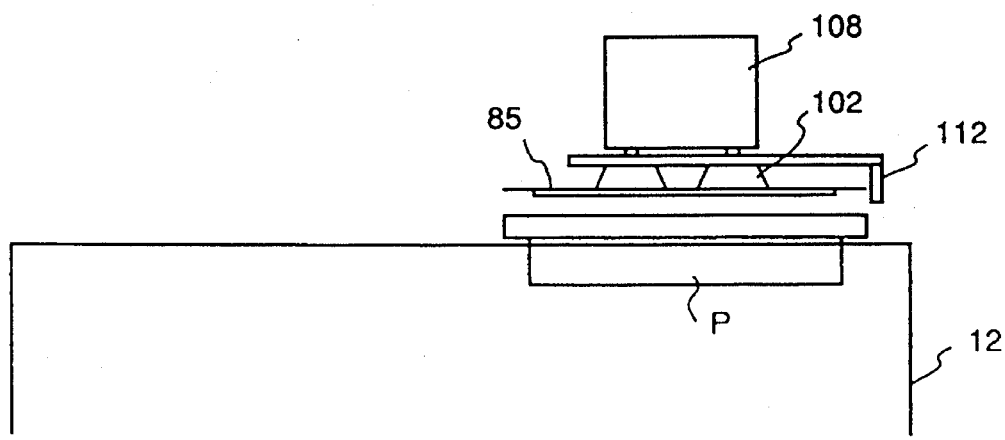
Figure 33C:
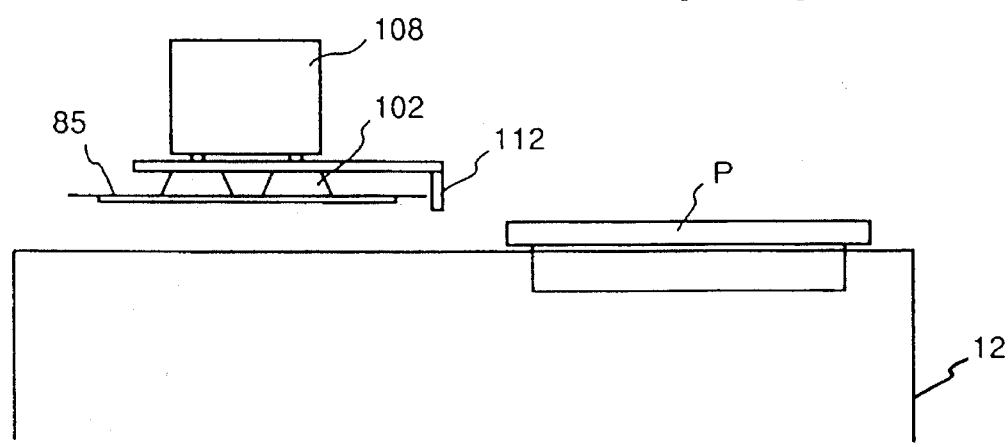

In step S107b, in order to execute the detaching operation of the cover 85, the chucking pads 102 are moved upward. If the upper end position of the chucking pads 102 is detected by the upper end sensor 120 in step S107c, the guide cylinder 114 is operated to move the chucking pads 102 to the position above the first EV 14 (step S107d). If the front end sensor 124 detects that the chucking pads 102 have reached the position above the first EV 14 (step S107e), after a timer measures a predetermined period of time in step S107f, the chucking pads 102 are moved downward to chuck the cover 85, as shown in FIG. 33A. As shown in FIG. 33B, if the vacuum sensor 128 detects that the cover 85 is chucked by the chucking pads 102, the chucking pads 102 are moved upward (steps S107g to steps S107p). If the upper end sensor 120 detects that the chucking pads 102, which are chucking the cover 85, have reached the upper end position (step S107q), the detaching device 100 is escaped to a position above the second EV 16, as shown in FIG. 33C, and the chucking pads 102, which are chucking the cover 85, are moved downward at that position. When the lower end sensor 122 detects that the chucking pads 102 have reached the lower end position, the pallet P located at the position above the first EV 14 is allowed to be accessed by the robot (steps S107r to S107v).

After the detaching operation of the cover 85, a normal signal is output in step S103i, and the flow advances to step S103j. In step S103j, the control waits for input of a push end signal. An access to the robot is made in this state. When works W are picked by, e.g., the robot from the pallet P, the robot counts the number of picked-up works W (the number of works in the pallet P is input in advance to the robot), and when the robot determines that the pallet P on the shutters 54a and 54b becomes empty, the robot supplies a push end signal to the supply apparatus 10 (the flow may be manually caused to advance to step S103 by depressing the start push switch 90 in step S103k). Upon reception of the push end signal, the supply apparatus 10 outputs an exchange preparation signal in step S106a.

Thereafter, an operation for fitting the cover 85 on an empty pallet, and an operation for slidably discharging the pallet are executed in the following steps.

Figure 34B:
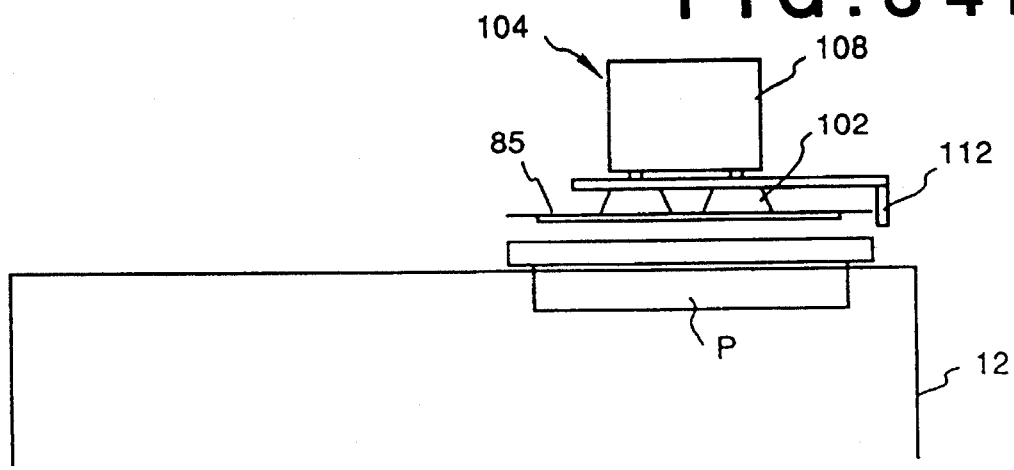
Figure 34C:
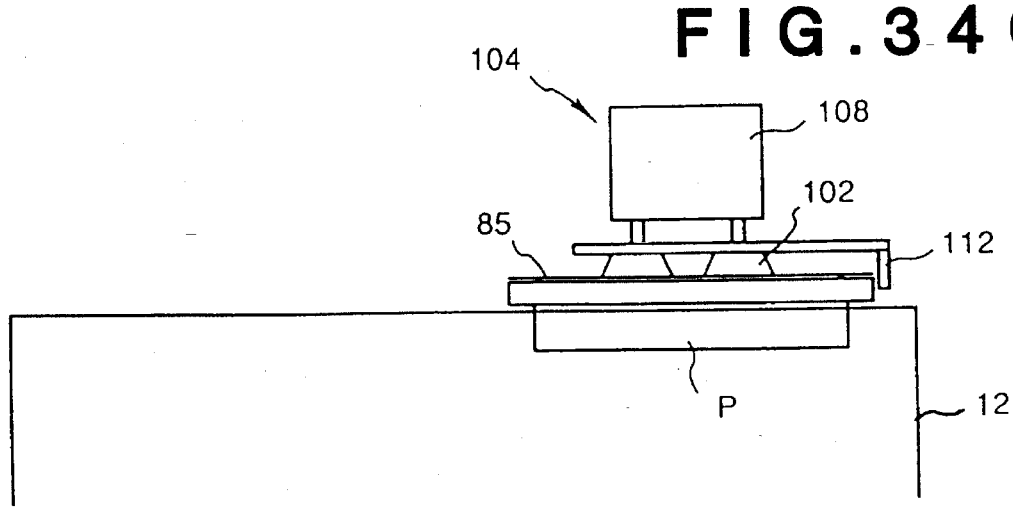
Figure 35A:
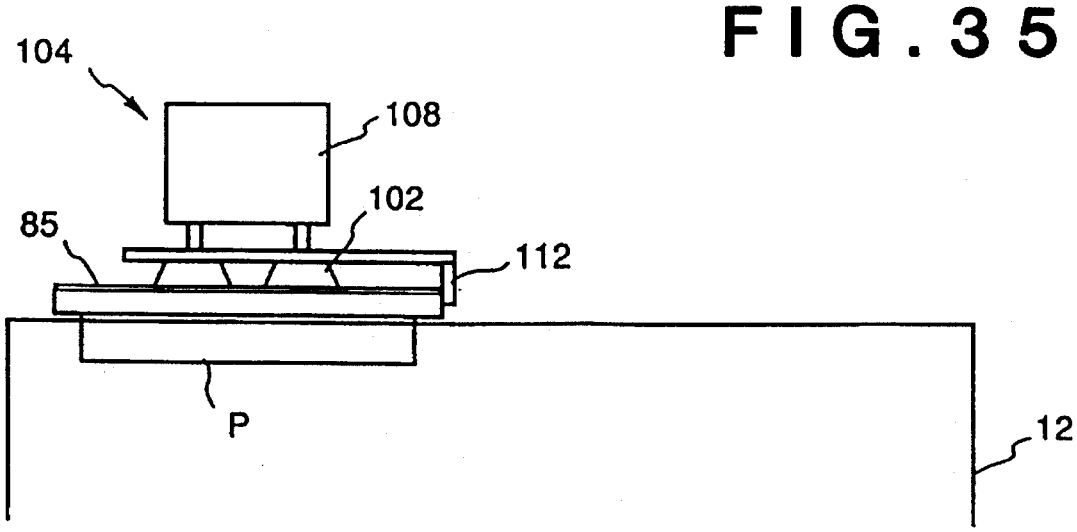
FIGS. 35A and 35B are views showing the operation for fitting a cover on a pallet, and delivering the pallet to a delivery position.
Figure 35B:
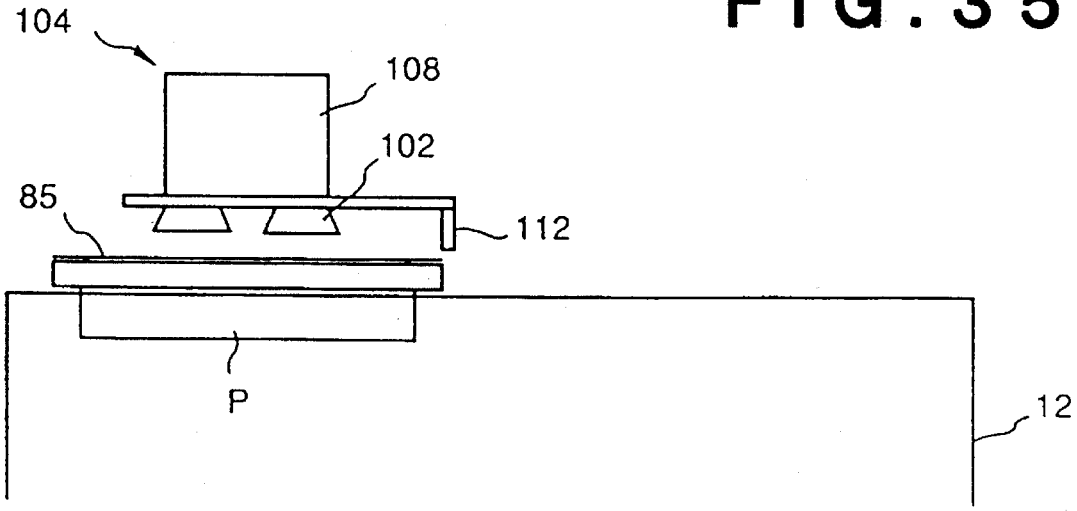
Figure 36:
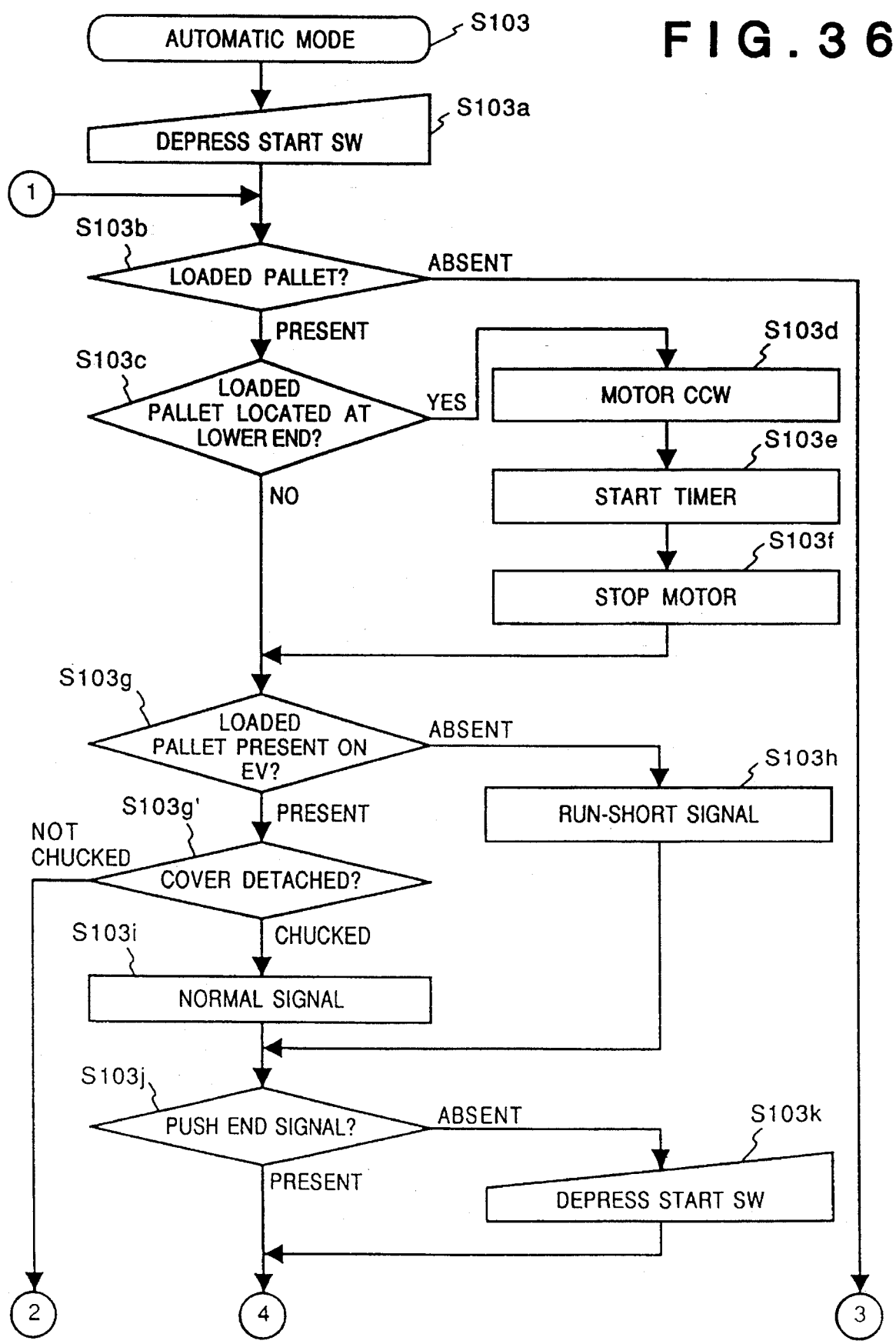
FIG. 36 is a flow chart showing an operation of the pallet supply apparatus in an automatic mode.
Figure 37:
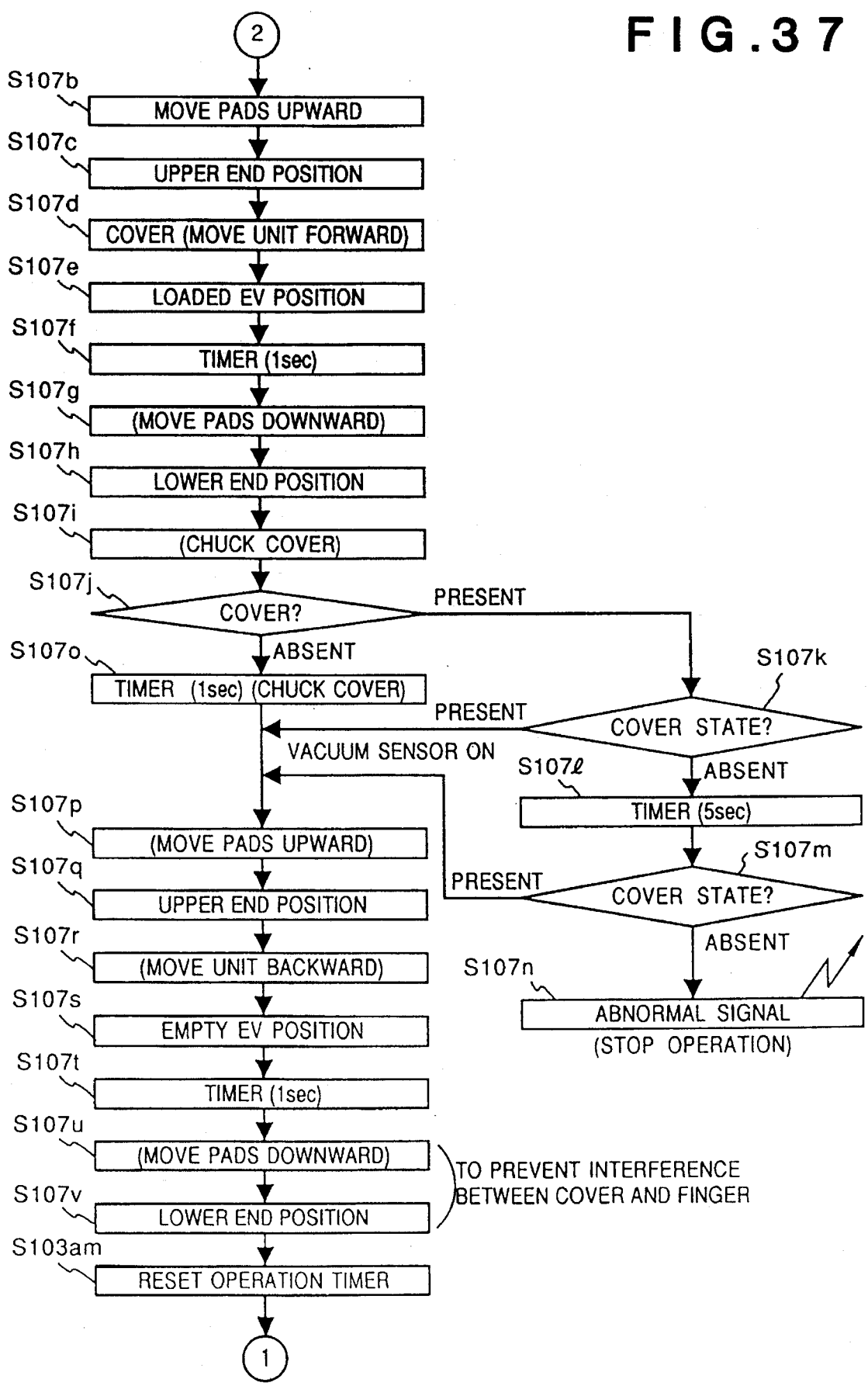
FIG. 37 is a flow chart showing an operation of the pallet supply apparatus in the automatic mode.

As shown in FIG. 34A, the chucking pads 102 are moved upward in step S106b. If the upper end sensor 120 detects in step S106c that the chucking pads 102 have reached the upper end position, the guide cylinder 114 is operated in step S106d to move the lift unit 104 to the position above the first EV 14 (whether or not the unit 104 has reached the position is checked by the front end sensor 124 in step S106e), as shown in FIG. 34B. After the end of the measurement of an operation stop timer, the chucking pads 102 are moved downward in step S106g. If the lower end sensor 122 detects in step S106h that the chucking pads 102 have reached the lower end position (FIG. 34C), the positioning state of the right and left positioning units 62 and 60 of the supply apparatus main body 12 is released (step S106i). In step S106j, the cover 85 is released from the chucking pads 102. If the vacuum sensor 128 confirms in steps S106k and S106 that the cover 85 is released, the flow advances to step S106n to escape the lift unit 104 to the position above the second EV 16 (FIG. 35A). At this time, an empty pallet P' which is located above the first EV 14 and is locked by the slide hook 112 attached to the lift plate 110, is slidably moved from the position above the first EV 14 to the position above the second EV 16. In order to prevent a stacking error upon stacking of empty pallets P' whether or not the empty pallet P' slidably moved by the detaching device 100 normally abuts against the stopper angle 78 is checked by the empty pallet sensor 82. If the empty pallet sensor 82 on the supply apparatus main body 12 detects that the empty pallet P' is present (step S106o), the lift plate 110 is moved upward to escape the chucking pads 102 and the slide hook 112 from the path of the empty pallet P' (FIG. 35B), and thereafter, the lift unit 104 is moved to the position above the first EV 14 to prepare for the detaching operation of the cover 85 of the next pallet (steps S106p to S106t). After the operation for fitting the cover 85 on the empty pallet P', and the operation for slidably moving the empty pallet P' are performed, an exchange operation of the next pallet is performed.

In step S103s, the measurement operation of an operation timer is started. The measurement operation of the operation timer is performed to detect an operation error during a pallet exchange operation by comparing the measured time with a pre-measured pallet exchange time input to the controller 84 arranged in the supply apparatus 10.

For example, the operation timer is reset in step S103am. In this case, if an abnormality occurs during the pallet exchange operation (for example, a pallet is undesirably caught by the EV), the operation program is stopped in that step, and the measured time exceeds the input exchange time. In this case, it is determined step S103v that the elapsed time is larger than a setting value, and the motor 46 is stopped in step S103ap. After the timer operation in step S103an is completed, an abnormal signal is output in step S103ao, and this mode is ended.

In step S103t, the motor 46 is rotated in the CW (clockwise) direction to move the second EV 16 upward so as to recover the empty pallet P' on the shutters 54a and 54b. In step S103u, the state of the lower end sensor 50 is monitored to prevent the first EV 14 from abnormally moving downward during the rotation of the motor 46, i.e., the upward movement of the second EV 16.

If the lower end sensor 50 is turned on in step S103u, the rotation of the motor 46 is stopped in step S103ap, and after the timer is started in step S103an, an abnormal signal is output in step S103ao, thus ending this mode.

In step S103w, the empty pallet upper end sensor 80 detects a timing at which the pallet P' on the shutters 54a and 54b is pushed up by the second EV 16, which is moved upward upon CW (clockwise) rotation of the motor 46 in step S103t to recover the pallet P' and is separated from the shutters 54a and 54b. When the empty pallet upper end sensor 80 is turned on, the rotation of the motor 46 is stopped in step S103x, and the empty pallet P' is recovered on the second EV 16 in this state (shown in FIG. 19A). In step S103y, the shutters 54a and 54b are opened to move the pallet P' recovered on the second EV 16 downward. If the shutter opening/closing sensor 58 detects in step S103z that the shutters 54a and 54b are opened, the flow advances to step S103aa. If the sensor 58 does not detect that the shutters 54a and 54b are opened, the timer is started in step S103an, and thereafter, an abnormal signal is output in step S103ao, thus ending this mode.

In step S103aa, the motor 46 is rotated in the CCW (counterclockwise) direction to move the first EV 14 upward so as to separate the next loaded pallet P storing works W (a state shown in FIG. 19B). The upward movement of the first EV 14 is stopped when the loaded pallet upper end sensor 74 detects a loaded pallet P. However, when no loaded pallet P is present on the first EV 14, or when the loaded pallet upper end sensor 74 malfunctions, no signal is obtained from the loaded pallet upper end sensor 74, and the first EV 14 may be abnormally moved upward. In order to prevent such abnormal upward movement of the first EV 14, in step S103ab, the position of the second EV 16, which is moved downward upon upward movement of the first EV 14, is detected by the lower end sensor 52, thereby preventing the second EV 16 from being moved downward below the sensor 52 (i.e., preventing the first EV 14 from being abnormally moved upward). When the lower end sensor 52 is turned on, the motor 46 is stopped in step S103ap, the timer is started in step S103an, and thereafter, an abnormal signal is output in step S103ao, thus ending this mode.

In a normal state, since the uppermost pallet of stacked pallets P reaches the position of the loaded pallet upper end sensor 74 before the second EV reaches the lower end position, and the loaded pallet upper end sensor 74 is turned on in step S103ac, the flow advances to step S103ae to stop the motor 46.

In step S103af, the shutters 54a and 54b are closed. In this state, the uppermost pallet P is set in a separable state. In step S103ag, the operation state of the shutters 54a and 54b is checked by the shutter opening/closing sensor 58. When the shutters 54a and 54b are left opened, the timer is started in step S103an, and thereafter, an abnormal signal is output in step S103ao, thus ending this mode. If the shutter opening/closing sensor 58 detects that the shutters 54a and 54b are closed, the flow advances to step S103ah to rotate the motor 46 in the CW (clockwise) direction.

In step S103ar, the state of the lower end sensor 50 is checked to prevent the first EV 14 from being abnormally moved downward upon CW (clockwise) rotation of the motor 46. When the lower end sensor 50 is turned on in step S103ar, the motor 46 is stopped in step S103ap, the timer is started in step S103an, and thereafter, an abnormal signal is output in step S103ao, thus ending this mode.

If the lower end sensor 50 does not detect any abnormal downward movement of the first EV 14, the timer is started in step S103ai, and the motor 46 is stopped in step S103aj. In this state, the uppermost loaded pallet is separated.

In steps S103ak to S103a, the separated pallet P on the shutters is positioned as in steps S102s to S102u in the separation mode (FIGS. 20A to 20C).

Then, an operation for detaching the cover 85 of the positioned pallet P is performed as follows.

In the current state, since the positioning operation of the next pallet P has been completed, and the cover detaching operation is to be started, the chucking pads 102 are moved upward in step S107b. If the upper end sensor 120 detects, in step S107c that the chucking pads 102 have reached the upper end position, the lift unit 104 is moved to the position above the first EV 14 (step S107d). If the front end sensor 124 detects that the chucking pads 102 have reached the position above the first EV 14 (step S107e), after a timer measures a predetermined period of time in step S107f, the chucking pads 102 are moved downward to chuck the cover 85, as shown in FIG. 33A. As shown in FIG. 33B, if the vacuum sensor 128 detects that the chucking pads 102 chuck the cover 85, the chucking pads 102 are moved upward (steps S107g to S107p). If the upper end sensor 120 detects that the chucking pads 102, which are chucking the cover 85, have reached the upper end position (step S107q), the detaching device 100 is escaped to the position above the second EV 16, as shown in FIG. 33C, and the chucking pads 102, which are chucking the cover 85, are moved downward at that position. If the lower end sensor 122 detects that the chucking pads 102 have reached the lower end position, the pallet P located above the first EV 14 is allowed to be accessed by the robot (steps S107r to S107v).

In step S103am, the operation timer, which started measurement in step S103s, is reset. However, if any abnormal state occurs from step S103s to step S103am, the pallet exchange operation is not completed, and the timer is not reset. For this reason, the count value of the operation timer is increased, and it is determined in step S103v that the count value is larger than the setting value. Thus, the flow advances to step S103ap, step S103an and step S103ao to output an abnormal signal, and this mode is ended.

In a normal state, the flow returns to step S103b and then advances up to step S103j to allow supply of works to the robot. In addition, the supply apparatus 10 waits for input of another push end signal from the robot (a state shown in FIG. 19C). Thereafter, steps S103b to S103am are repeatedly executed to have step S103j as the start step. When all pallets P on the first EV 14 are separated upon repetition of this operation, the loaded pallet sensor 32 determines in step S103g that no pallet P is present on the first EV 14, and a run-short signal is output in step S103h. In response to this signal, an operator knows that he or she must insert new loaded pallets to the supply apparatus 10 so as to continuously operate the apparatus.

[Pallet Insertion Operation When Pallet P is Present in Supply Apparatus 10]

A method of inserting new loaded pallets P in the automatic mode (a state wherein the last loaded pallet P is present on the shutters 54a and 54b) will be described below.

At this time, the last loaded pallet P is positioned on the shutters 54a and 54b of the supply apparatus 10. In order to insert stacked pallets P storing works W shown in FIG. 27, the insertion mode is selected in step S101. More specifically, the mode selection switch 88 of the controller 84 is turned from the position "automatic" to the position "insertion". In step S101a, the presence/absence of a pallet P on the shutters 54a and 54b is checked by the loaded pallet sensor 76. In the current state, the pallet P is present on the shutters 54a and 54b of the supply apparatus 10, and empty pallets P' are stacked on the second EV 16. The flow advances to step S101c, and an insertion busy signal is output (the robot can access the supply apparatus when the normal signal and the insertion busy signal are output). However, while the insertion busy signal is output, an interlock mode for inhibiting the sliding operation of the pallet is set.

In step S101d, empty pallets P' stacked on the second EV 16 are manually removed. When the start push switch 90 is depressed in this state, the empty pallet sensor 34 checks if empty pallets P' are completely removed from the second EV 16 (step S101f). At this time, if an empty pallet P' remains, the flow returns to step S101e. This is to prevent damage to the supply apparatus 10 even when an operator forgets to remove empty pallets in step S101d. In the current state, since empty pallets P' are removed, and there is no empty pallet P' on the second EV 16, the flow advances to step S101g.

In step S101g, the level position of the first EV 14 is checked. When the first EV 14 is located at the lower end position, i.e., when the lower end sensor 50 is ON, the motor 46 is not rotated, and the flow advances to step S101j. However, when the first EV 14 is not located at the lower end position, the motor 46 is rotated in the CW (clockwise) direction to move the first EV 14 downward until the lower end sensor 50 is turned on. At this time, the second EV 16 is moved upward to the upper end position.

In step S101j, stacked loaded pallets P are manually inserted in the supply apparatus 10 from the direction of the arrow as in FIG. 18A. More specifically, an operator places stacked loaded pallets P on the pallet guide plate 18, and pushes it to the position on the first EV 14 until the stacked pallets P abut against the frame 13.

Then, the mode selection switch 88 of the controller 84 is turned from the position "insertion" to the position "automatic" to select the automatic mode in step S103. In step S103a, the control waits for manual depression of the start push switch 90 so as to confirm the start of the operation. When the start push switch 90 is depressed, the flow advances to step S103b to check using the loaded pallet sensor 76 if a loaded pallet P is set on the shutters 54a and 54b.

In the current state, since the robot is accessing the loaded pallet P on the shutters 54a and 54b, and the loaded pallet P is present, the flow advances to step S103c.

In step S103c, it is checked using the lower end sensor 50 if the first EV 14 is located at the lower end position. In the current state, since the insertion operation has been completed from a state wherein a pallet P remains in the supply apparatus 10, the first EV 14, which is full of loaded pallets P storing works W, is located at the lower end position. For this reason, the flow advances to step S103d. In step S103d, the motor 46 is rotated in the CCW (counterclockwise) direction to move the second EV 16 downward, so that the pallet P in access on the shutters 54a and 54b is to be slidably pushed by, e.g., a robot finger. More specifically, immediately after the pallets are inserted, the first EV 14 is located at the lower end position, and hence, the second EV 16 is located at the upper end position. In this state, if the pallet P on shutters is slid, since it interferes with the second EV 16, the second EV 16 must be moved downward to escape from the pallet path. The above-mentioned operation is executed for this purpose.

In step S103e, the timer is started to measure the CCW (counterclockwise) rotation time of the motor 46 in step S103d, and after an elapse of a predetermined period of time, the motor is stopped in step S103f.

In step S103g, a normal signal is output on the basis of the detection result of the loaded pallet sensor 32. In a normal state, the flow returns to step S103d and then advances up to step S103j to allow supply of works to the robot. In addition, the supply apparatus 10 waits for input of another push end signal from the robot.

Thereafter, steps S103b to S103am are repetitively executed to have step S103j as the start step.

[Normal Rotation Mode]

In this mode, the EVs are manually moved upward or downward. In step S104, the normal rotation mode is selected. More specifically, the mode selection switch 88 of the controller 84 is turned to a position "normal rotation".

When an operator depresses the start push switch 90 of the controller 84 in step S104a, an exchange busy signal is output in step S104b. If it is determined in step S104c no loaded pallet P is present on the first EV 14 to be moved upward, and it is determined in step S104d that the second EV 16 is not located at the lower end position, the motor 46 is rotated in the CCW (counterclockwise) direction. If it is determined in step S104f that the start push switch 90 is depressed, the flow returns to step S104c to continuously rotate the motor 46. However, if the start push switch 90 is not depressed, the flow advances to step S104g to stop the motor 46.

[Reverse Rotation Mode]

In this mode, the EVs are manually moved upward or downward. In step S105, the reverse rotation mode is selected. More specifically, the mode selection switch 88 of the controller 84 is turned to a position "reverse rotation".

When an operator depresses the start push switch 90 of the controller 84 in step S105a, an exchange busy signal is output in step S105b. If it is determined in step S105c no empty pallet P' is present on the second EV 16 to be moved upward, and it is determined in step S105d that the first EV 14 is not located at the lower end position, the motor 46 is rotated in the CW (clockwise) direction. If it is determined in step S105f that the start push switch 90 is depressed, the flow returns to step S105c to continuously rotate the motor 46. However, if the start push switch 90 is not depressed, the flow advances to step S105g to stop the motor 46.

Note that the present invention can be applied to changes or modifications of the above embodiments without departing from the spirit and scope of the invention.

For example, the present invention may be applied to a system consisting of a plurality of devices or an apparatus consisting of a single device. The present invention can also be applied to a case wherein the present invention is achieved by supplying a program to a system or apparatus, as a matter of course.

The present invention is not limited to the above embodiments and various changes and modifications can be made within the spirit and scope of the present invention. Therefore, to apprise the public of the scope of the present invention the following claims are made.

What is claimed is:

1. A pallet supply apparatus, comprising:

first pallet conveying means, including a first stage on which a stack of loaded pallets storing workpieces can be placed, for conveying the loaded pallets to an access position wherein an external robot apparatus can access an uppermost pallet in the stack;

second pallet conveying means, including a second stage on which a stack of empty pallets can be placed, for conveying the stack of empty pallets;

chucking means for chucking a cover of a pallet disposed at the uppermost position on either the first or second pallet conveying means;

moving means for moving said chucking means between a position above said first stage and a position above said second stage; and locking means, arranged integrally with said chucking means and engaged with the pallet when said chucking means is moved to a lower end position, for moving the pallet from the position above said first stage to the position above said second stage upon operation of said moving means.

2. The apparatus according to claim 1, wherein said chucking means comprises chucking pads for chucking the cover of the pallet by negative pressure.

3. The apparatus according to claim 1, further comprising vertical moving means for vertically moving said chucking means.

4. The apparatus according to Claim 3, wherein said vertical moving means and said moving means are driven by a cylinder.

5. A method of controlling a pallet supply apparatus for positioning a pallet which stores workpieces and is conveyed to a predetermined position so work supply means can process the workpieces, said method comprising the steps of:

conveying the pallet to a work supply position proximate to the work supply means where there are provided holding means defining first and second reference surfaces perpendicular to each other and first and second pallet pushing means provided proximate to first and second opposing sides of the pallet;

initially pushing the first side of the pallet disposed at the work supply position with the first pallet pushing means so that at least a part of the second side of the pallet is pushed toward the first and second reference surfaces; and secondly pushing the second side of the pallet with the second pallet pushing means while maintaining a pushing force on the first side with the first pallet pushing means such that the entire second side is pushed against the first reference surface.

6. A method of controlling a pallet supply apparatus according to claim 5, wherein the first and second pallet pushing means apply their respective pushing forces at an acute angle to the sides of the pallet in the initial and second pushing steps.

7. A pallet supply apparatus for positioning a covered pallet which stores workpieces and conveys it to a predetermined position for supplying the workpieces to work supply means for processing, comprising:

first conveyance means for conveying the covered pallet to a work supply position for supplying the workpieces to the work supply means;

holding means for holding the pallet at the work supply position, said holding means including positioning means containing information on an accessing position for the work supply means to access the pallet and on a discharging position for discharging an empty pallet; and cover opening means for opening the cover of the pallet when it is at the accessing position and for closing the cover when the pallet becomes empty and is conveyed to the discharging position.

8. The pallet supply apparatus according to claim 7, wherein said holding means includes second conveyance means for conveying the empty pallet from the accessing position to the discharging position.

* * * * *

UNITED STATES PATENT AND TRADEMARK OFFICE
CERTIFICATE OF CORRECTION

PATENT NO. : 5,470,193

DATED : November 28, 1995

INVENTOR(S) : Miura et al.

It is certified that error appears in the above-indentified patent and that said Letters Patent is hereby corrected as shown below:

On the title page, item

[56] REFERENCES CITED:

U.S. PATENT DOCUMENTS, "4,588,349 5/1988 Reuter" should read --4,588,349 5/1986 Reuter--.

COLUMN 1:

Line 13, "apparatus" (first occurrence) should read --apparatus shown in prior art Figures 1A-4-- and "shown" should be deleted.

Line 14, "in prior art FIGS. 1A-4" should be deleted.

COLUMN 8:

Line 27, "if" should read --1f--.

COLUMN 20:

Line 5, "stated" should read --state,--.

COLUMN 31:

Line 51, "EV 16 i.e." should read --EV 16 (i.e.--.

UNITED STATES PATENT AND TRADEMARK OFFICE
CERTIFICATE OF CORRECTION

PATENT NO. : 5,470,193

DATED : November 28, 1995

INVENTOR(S) : Miura et al.

It is certified that error appears in the above-indentified patent and that said Letters Patent is hereby corrected as shown below:

COLUMN 32:

Line 36, "ended in" should read --ended (in--.

Signed and Sealed this

Twenty-fifth Day of June, 1996

Attest:

BRUCE LEHMAN

*Attesting Officer*  *Commissioner of Patents and Trademarks*